United States Patent
Stover et al.

(10) Patent No.: US 12,465,609 B2
(45) Date of Patent: Nov. 11, 2025

(54) METHODS OF TREATING PATIENTS SUFFERING FROM A DISEASE CONDITION OR DISORDER THAT IS ASSOCIATED WITH AN INCREASED GLUTAMATE LEVEL

(71) Applicant: veriNOS operations GmbH, Würzburg (DE)

(72) Inventors: John Stover, Würzburg (DE); Frank Tegtmeier, Würzburg (DE)

(73) Assignee: veriNOS operations GmbH, Würzburg (DE)

( * ) Notice: Subject to any disclaimer, the term of this patent is extended or adjusted under 35 U.S.C. 154(b) by 0 days.

(21) Appl. No.: 18/313,920

(22) Filed: May 8, 2023

(65) Prior Publication Data

US 2023/0381184 A1     Nov. 30, 2023

(30) Foreign Application Priority Data

May 6, 2022 (EP) .................................... 22172171

(51) Int. Cl.
| | |
|---|---|
| *A61K 31/519* | (2006.01) |
| *A61P 25/00* | (2006.01) |
| *A61P 27/02* | (2006.01) |
| *A61P 35/00* | (2006.01) |

(52) U.S. Cl.
CPC ............ *A61K 31/519* (2013.01); *A61P 25/00* (2018.01); *A61P 27/02* (2018.01); *A61P 35/00* (2018.01)

(58) Field of Classification Search
CPC ........ A61K 31/519; A61P 25/00; A61P 27/02; A61P 35/00; A61P 9/10
See application file for complete search history.

(56) References Cited

U.S. PATENT DOCUMENTS

| | | | | |
|---|---|---|---|---|
| 10,016,431 | B2 * | 7/2018 | Scheurer | A61K 47/02 |
| 12,171,766 | B2 * | 12/2024 | Stover | A61P 25/00 |
| 2017/0296543 | A1 * | 10/2017 | Scheurer | A61P 9/00 |

FOREIGN PATENT DOCUMENTS

WO      2015150294 A1     10/2015

OTHER PUBLICATIONS

Dao, Vu Thao-Vi, et al. "Nitric Oxide Synthase Inhibitors into the Clinic at Last." Reactive Oxygen Species: Network Pharmacology and Therapeutic Applications, edited by Harald H. H. W. Schmidt et al., Springer International Publishing, 2021, pp. 169-204. Springer Link. (Year: 2021).*
Maccallini, Cristina, et al. "Targeting iNOS As a Valuable Strategy for the Therapy of Glioma." Chem MedChem, vol. 15, No. 4, Feb. 2020, pp. 339-344. DOI.org (Crossref). (Year: 2020).*
Kozlov et al., Alterations in nitric oxide homeostasis during traumatic brain injury. Biochim Biophys Acta Mol Basis Dis. Oct. 2017; 1863(10 Pt B):2627-2632.
Andrew et al., Questioning Glutamate Excitotoxicity in Acute Brain Damage: The Importance of Spreading Depolarization. Neurocrit Care. Jun. 2022;37(Suppl 1):11-30.
Nuzzo et al., High performance liquid chromatography determination of L-glutamate, L-glutamine and glycine content in brain, cerebrospinal fluid and blood serum of patients affected by Alzheimer's disease. Amino Acids. Mar. 2021;53(3):435-449.
Schwarzmaier et al., Endothelial Nitric Oxide Synthase Mediates Arteriolar Vasodilatation after Traumatic Brain Injury in Mice. J Neurotrauma. May 15, 2015;32(10):731-738.
Stefani et al., Elevated glutamate and lactate predict brain death after severe head trauma. Ann Clin Transl Neurol. May 4, 2017;4(6):392-402.
Stover et al., Nitric Oxide Synthase Inhibition with the Antipterin VAS203 Improves Outcome in Moderate and Severe Traumatic Brain Injury: A Placebo-Controlled Randomized Phase IIa Trial (NOSTRA). J Neurotrauma. Oct. 1, 2014;31(19):1599-1606.
Tegtmeier et al., Efficacy of Ronopterin (VAS203) in Patients with Moderate and Severe Traumatic Brain Injury (NOSTRA phase III trial): study protocol of a confirmatory, placebo-controlled, randomised, double blind, multi-centre study. Trials. Jan. 14, 2020;21(1):80.
Terpolilli et al., The novel nitric oxide synthase inhibitor 4-aminotetrahydro-L-biopterine prevents brain edema formation and intracranial hypertension following traumatic brain injury in mice. J Neurotrauma. Nov. 2009;26(11):1963-1975.
International Search Report and Written Opinion issued in PCT/EP2023/062122 dated Jul. 26, 2023 (19 pages).

* cited by examiner

*Primary Examiner* — Clinton A Brooks
*Assistant Examiner* — Kyle Nottingham
(74) *Attorney, Agent, or Firm* — Michael A. Whittaker

(57) ABSTRACT

The present invention relates to use of biopterin compounds such as 4-Amino-(6R,S)-5,6,7,8-tetrahydro-L-biopterin or 4-Amino-(6R,S)-7,8-dihydro-L-biopterin for treating a human patient suffering from a disease condition or disorder that is associated with an increased glutamate level. The invention also relates to the use of such biopterin compounds in a method of treating or preventing glutamate excitotoxicity (glutamate storm) in a patient suffering from a condition that has the potential to result in a pathologically high glutamate level in the brain.

6 Claims, 22 Drawing Sheets

Age-dependent effects in NOSTRA and NOSTRA III, Glutamate, 18-39/ 40-60 years, all times to infusion

| Patients of age of 18-39 years | | |
|---|---|---|
| Number of patients | Placebo | Ronopterin |
| NOSTRA | 3 | 5 |
| NOSTRA III | 10 | 13 |

Patients of age of 40-60 years

| Number of patients | Placebo | Ronopterin |
|---|---|---|
| NOSTRA | 0 | 4 |
| NOSTRA III | 7 | 5 |

Stronger reduction in brain microdialysate glutamate in patients 18-39 vs 40-60 years

Glutamate in NOSTRA and NOSTRA III 18-39 years, time to infusion ≤ 12 vs > 12 hours

| Number of patients | Placebo | Ronopterin |
|---|---|---|
| NOSTRA | 2 | 4 |
| NOSTRA III | 2 | 5 |

Fig. 5C
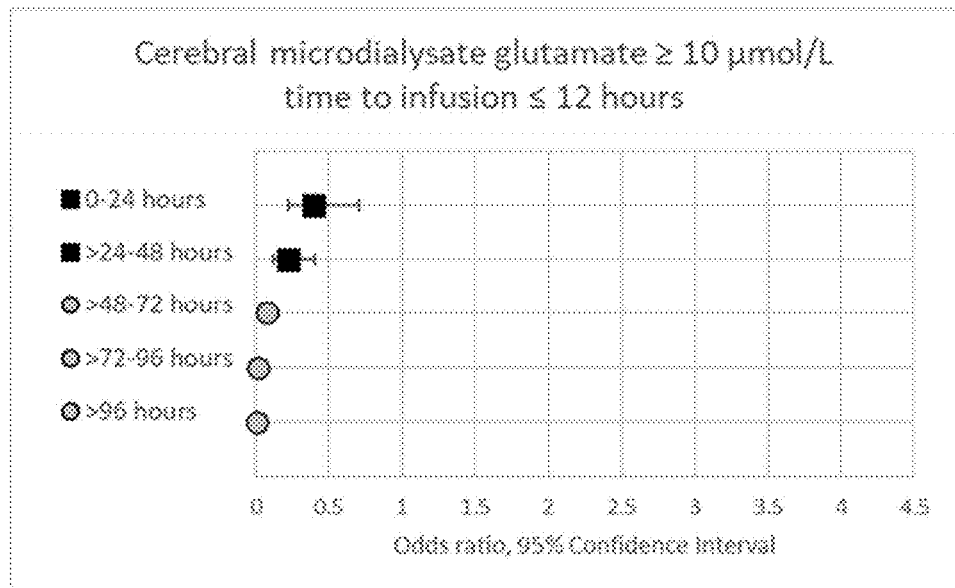
Fig. 5D
| Number of patients | Placebo | Ronopterin |
|---|---|---|
| NOSTRA | 1 | 1 |
| NOSTRA III | 8 | 8 |
Fig. 5E
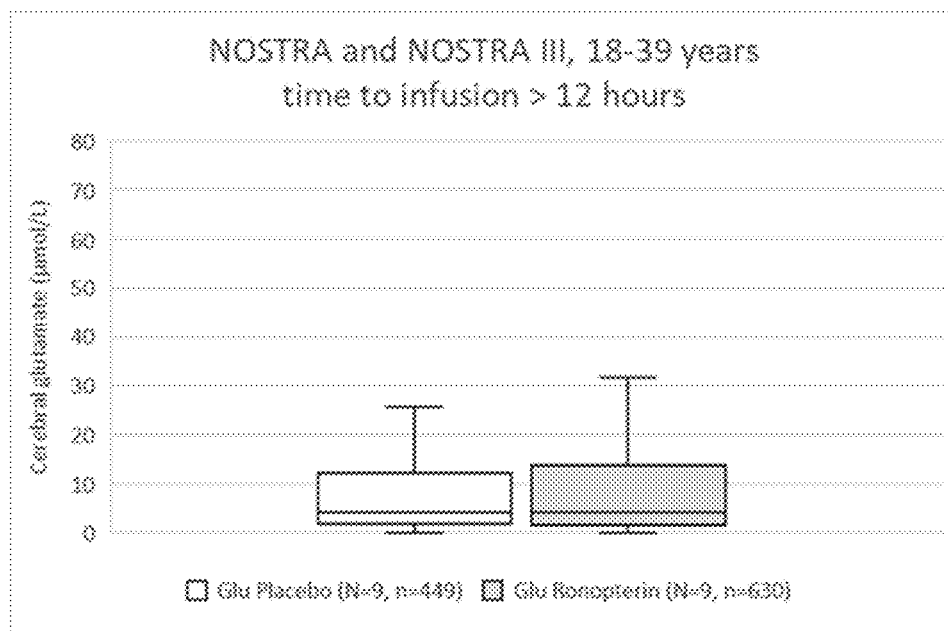

Stronger reduction in brain MD glutamate in patients 18-39 years with early infusion

Fig. 6
Glutamate in NOSTRA and NOSTRA III, 40-60 years, time to infusion ≤ 12 vs > 12 hours
Fig. 6A
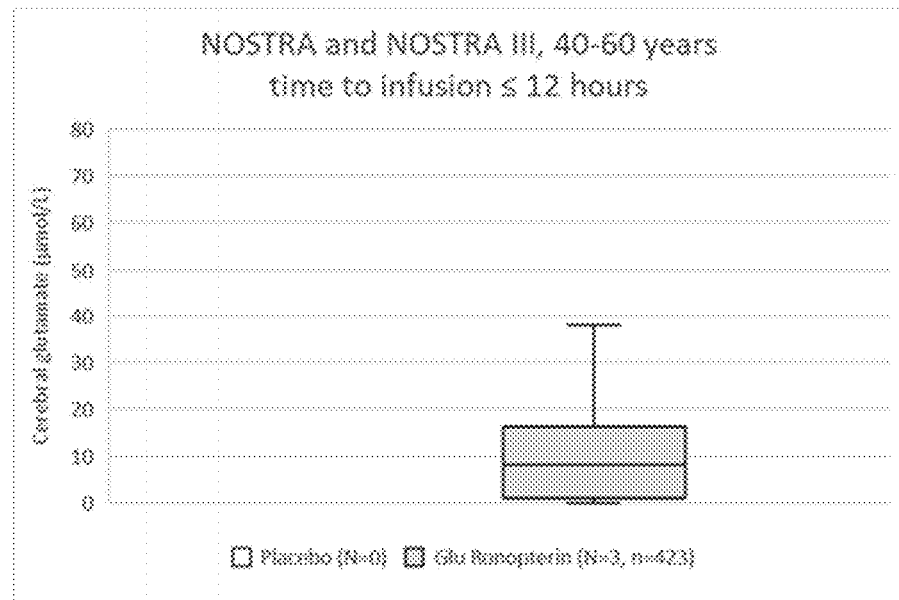
No microdialysis glutamate data for this specific Placebo group
Fig. 6B
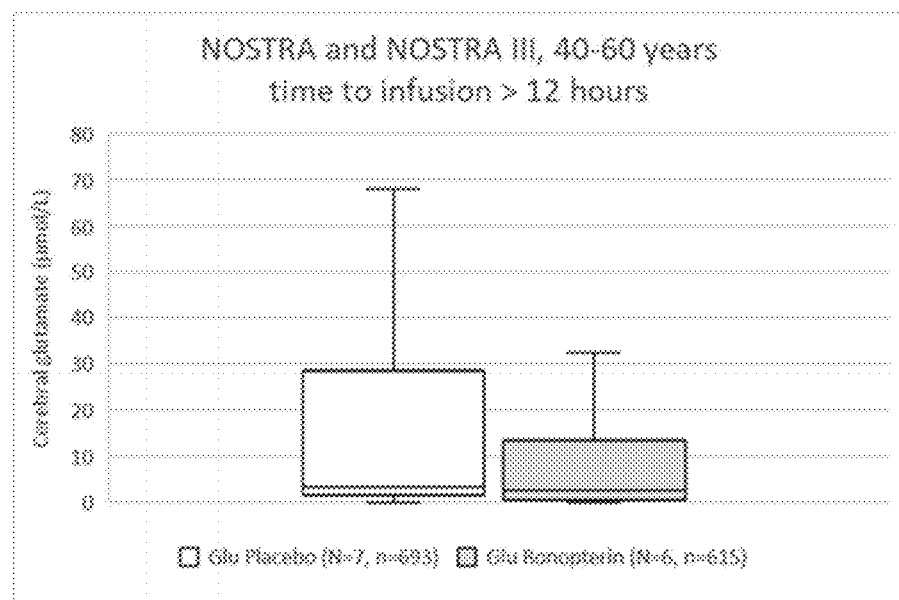

Strong decrease in brain MD glutamate in patients 40-60 years with late infusion

Fig. 7
Age-dependent effects in NOSTRA and NOSTRA III, Lactate, 18-39/ 40-60 years, all times to infusion
Fig. 7A
18-39 years
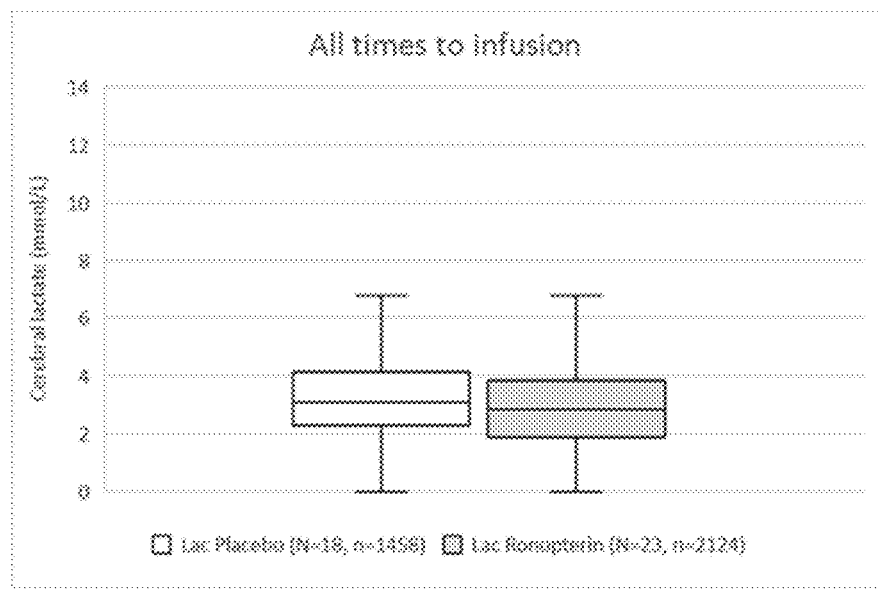
Fig. 7B
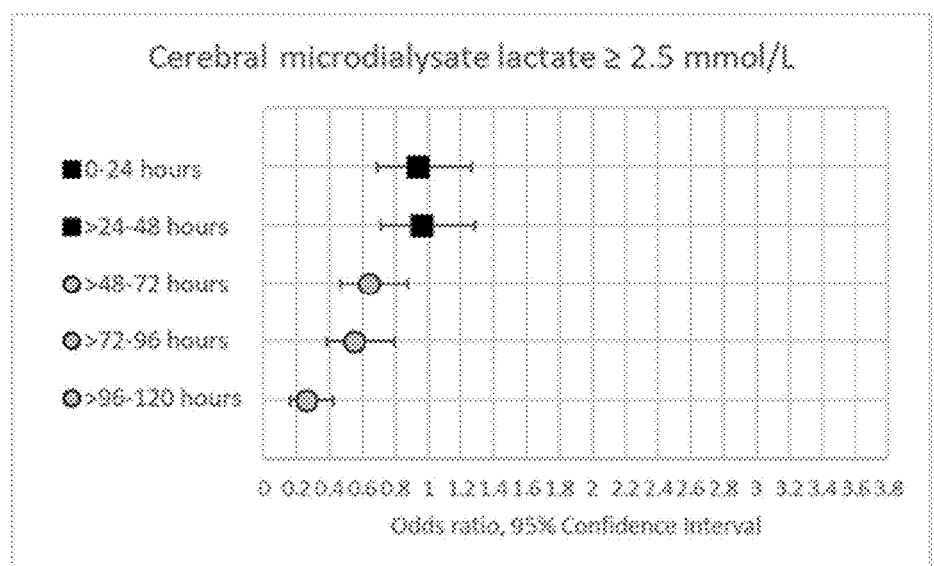

40-60 years

Stronger reduction in brain microdialysate lactate in patients 18-39 vs 40-60 years

Fig. 8
Lactate in NOSTRA and NOSTRA III, 18-39 years, time to infusion ≤ 12 vs > 12 hours
Fig. 8A
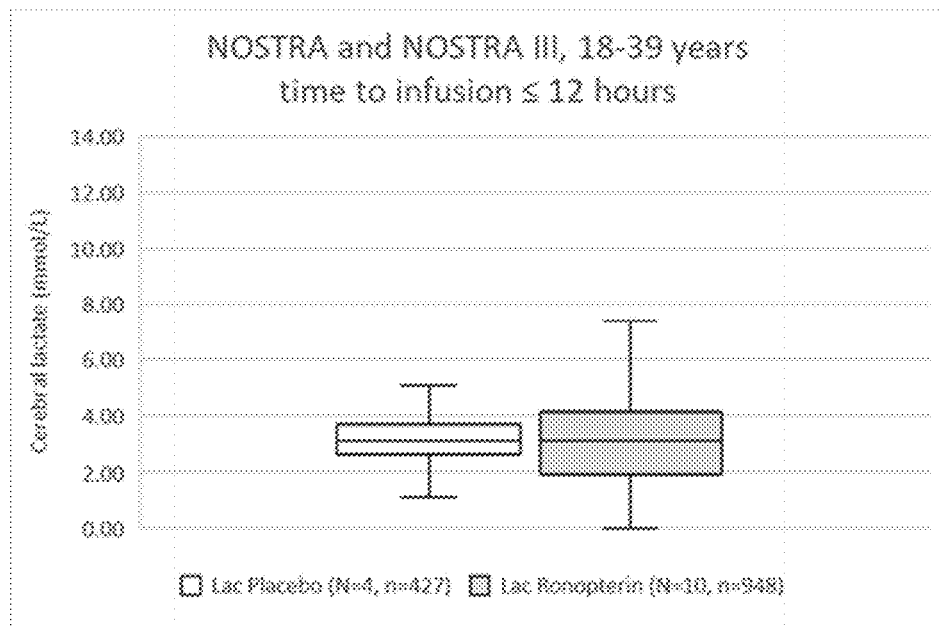
Fig. 8B
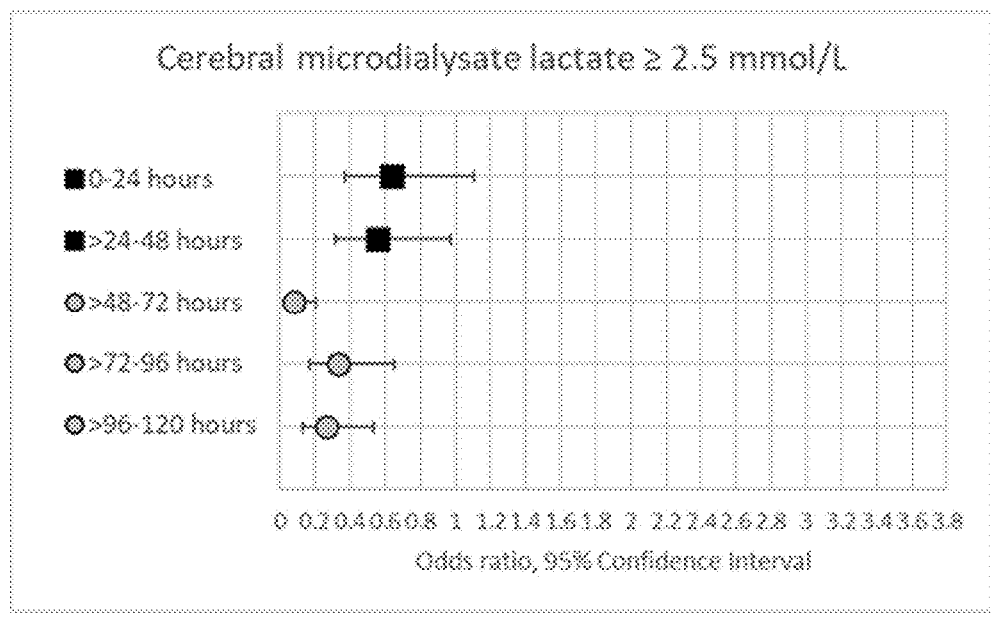

Stronger reduction in brain MD lactate in patients 18-39 years with early infusion

Fig. 9
Lactate in NOSTRA and NOSTRA III, 40-60 years, time to infusion ≤ 12 vs > 12 hours
Fig. 9A
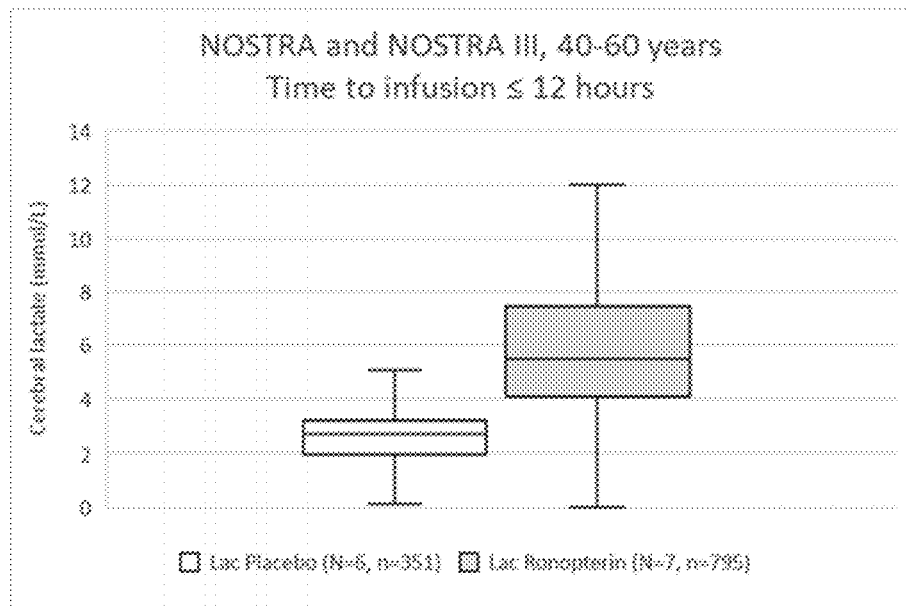
Fig. 9B
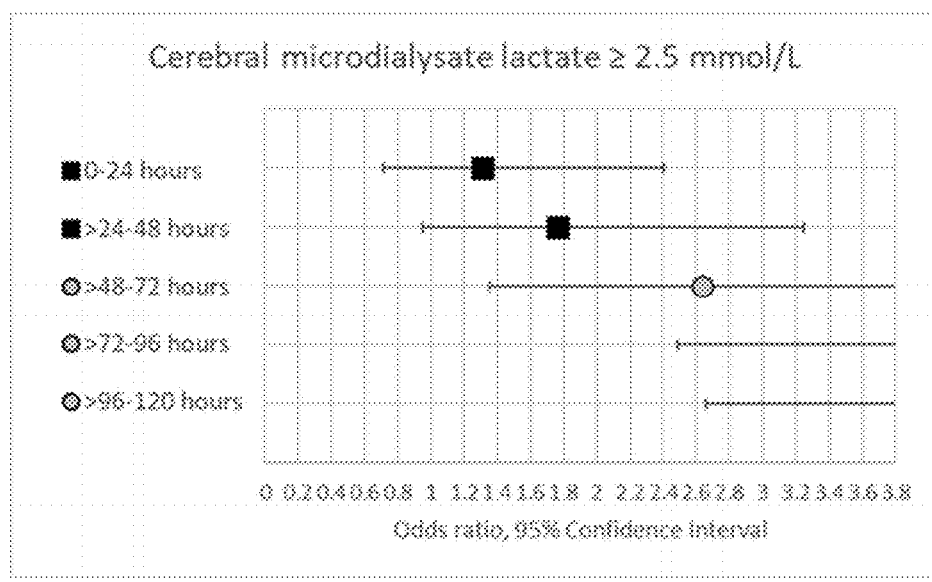

Stronger increase in brain MD lactate in patients 40-60 years with early infusion

Fig.10

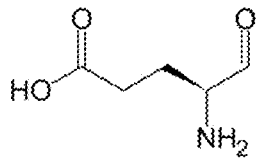

Glutamate- key physiology

- main amino acid transmitter promoting neuronal excitation
    - memory, emotions, sensory information, motor coordination
    - linked to excitatory transmitters (eg acetylcholine, dopamine, serotonin)
    - precursor of inhibitory neurotransmitter (GABA)
- binds to specific receptors
    - activates intracellular pathways in neurons and astrocytes
- regulated entry, release, and clearance
    - avoid excessive neuronal activity (excitotoxicity- 'glutamate storm')
- important influencer: energy, detoxification, gene expression, iNOS upregulations
    - glucose metabolism, citric acid cycle, urea cycle
    - synchronized mitochondrial activity
    - influenced gene transcription
    - dendritic remodelling
    - memory consolidation
    - neuronal survival/degeneration
    - metabolic plasticity
    - iNOS upregulation, NO synthesis for regulated glutamate release

Glutamate- key pathophysiology

- excessive glutamate release damages neurons, astrocytes, endothelial cells
    - leaky vessels, swelling, increased metabolism and oxygen consumption, impaired perfusion
    - ultimately cell death
- excessive glutamate massively activates iNOS with NO-induced mitochondrial damage and glutamate release from neurons and astrocytes Illustration of NO metabolism under traumatic brain injury

Elevated extracellular glutamate:
a common pathway in CNS diseases

Pál, B. Involvement of extrasynaptic glutamate in physiological and pathophysiological changes of neuronal excitability.

In vitro IC50

ABH2   12.0 µmol/L (first active metabolite)

ABH4   1.5 µmol/L (active parent substance)

METHODS OF TREATING PATIENTS SUFFERING FROM A DISEASE CONDITION OR DISORDER THAT IS ASSOCIATED WITH AN INCREASED GLUTAMATE LEVEL

CROSS-REFERENCE TO RELATED APPLICATIONS

The present application claims the benefit of priority of European Patent Application No. 22172171.5, filed with the European Patent Office on May 6, 2022, the content of which is hereby incorporated by reference it its entirety for all purposes.

FIELD OF THE INVENTION

The present invention relates to the use of biopterin compounds such as 4-Amino-(6R,S)-5,6,7,8-tetrahydro-L-biopterin or 4-Amino-(6R,S)-7,8-dihydro-L-biopterin for treating a human patient suffering from a disease condition or disorder that is associated with an increased glutamate level. The glutamate level may be an increased intracerebral glutamate level, an increased systemic glutamate level or a glutamate level that is increased both systemically and intracerebrally. The invention also relates to the use of such biopterin compounds in a method of treating or preventing glutamate excitotoxicity (glutamate storm) in a patient suffering from a condition that has the potential to result in a pathologically high glutamate level in the brain. When so doing, administering a therapeutically effective amount of a biopterin compound such as 4-Amino-(6R,S)-5,6,7,8-tetrahydro-L-biopterin reduces or prevents damage to brain cells caused by the pathologically high glutamate level in the brain.

BACKGROUND OF THE INVENTION

Advances in translational neuroscience research, coupled with increased attention from the medical community, have provided valuable insight into the mechanisms by which traumatic brain injury (TBI) leads to posttraumatic neurologic symptoms such as motor and cognitive deficits and post-traumatic epilepsy. While posttraumatic pathophysiology remains incompletely understood, much of the morbidity, particularly after moderate to severe TBI, may be attributable to a pathologic shift toward excess excitability of the normal cortical excitation:inhibition ratio (see the review of Guerriero et al, Glutamate and GABA imbalance following traumatic brain injury, Curr Neurol Neurosci Rep. 2015 May; 15(5): 27.).

Glutamate is the primary excitatory neurotransmitter in the brain, while γ-aminobutyric acid (GABA) is the principal inhibitory neurotransmitter. GABA is synthesized from glutamate. The balance of glutamatergic and GABAergic tone is crucial to normal neurologic function. The role of glutamate signalling in TBI pathophysiology is twofold. On one hand, acute posttraumatic glutamate release is responsible for excitotoxicity following brain injury that leads to neuronal injury, cell death and dysfunction of surviving neurons. On the other hand, delayed disruption of excitatory glutamate circuits leads to deficits in cognitive and motor function, and in experience dependent plasticity.

Pyramidal neurons, located in the cortex and hippocampus of mammals, as well as neurons of the midbrain, hypothalamus, and cerebellum produce glutamate that is central to excitatory signaling pathways. Alternatively, GABA is produced in interneurons that modulate cortical and thalamocortical circuits that relay sensory information and play a role in coordinating motor functions, attention, and memory.

GABA modulates excitatory pathways in the brain and, following injury, loss of GABA producing cells disrupts the balance of excitation and inhibition leading to further excitation-induced cell injury and apoptosis. The results of glutamate excitotoxicity share common elements from mild to severe TBI, as well as status epilepticus, ischemia, and neurodegenerative diseases (see Guerriero et al, vide, supra, Curr Neurol Neurosci Rep. 2015 May).

With respect to neuroprotection, Guerriero et al, vide, supra explain that the pathophysiology of mild TBI likely has similarities with more mildly affected perilesional tissue in severe TBI models. In these brain areas with reversible damage the opportunity to decrease acute glutamate excitotoxicity holds promise for neuroprotection. The authors continue that, for example, NMDA receptor blockade decreases epileptiform discharges, excitatory synaptic strength, and apoptosis. Removing glutamate from the synapse using scavengers, such as pyruvate and oxaloacetate an hour after weight-drop TBI, leads to an increase in surviving hippocampal neurons 30 days after injury. According to Guerriero et al, there is also evidence that by removing glutamate from the synapse more efficiently through up-regulation of glutamate transporters, either by ceftriaxone or with the steroid dehydroepiandrosterone, there is a decrease in post-traumatic seizure.

Thus, it would be desirable to have a drug that is able to lower glutamate levels in the brain and by so doing, has the potential to provide neuroprotection, for example, by decreasing acute glutamate excitotoxicity that leads to neuronal injury, cell death, and dysfunction of surviving neurons.

It is thus an object of the present invention to provide a drug and a respective treatment that is able to, for example, lower glutamate levels in the brain, in particular the pathologically altered brain.

SUMMARY OF THE INVENTION

This object is solved by the aspects of the invention as defined in the claims, described in the description, and illustrated in the Examples and Figures.

In a first aspect, the invention provides a method of treating a human patient suffering from a disease condition or disorder that is associated with an increased glutamate level, wherein the method comprises administering to the patient a therapeutically effective amount of a compound of formula (I):

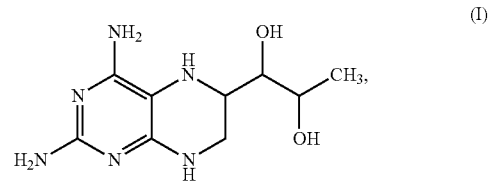 [SMILES: CC(O)C(O)C1CNc2nc(N)nc(N)c2N1]

and/or a compound of formula (II):

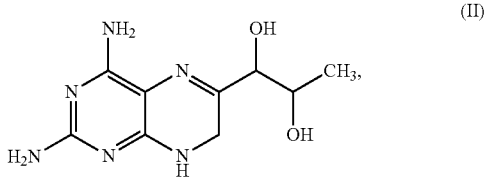 [SMILES: CC(O)C(O)C1=Nc2c(N)nc(N)nc2NC1]

wherein the increased glutamate level is decreased by administering the therapeutically effective amount of the compound of formula (I) and/or of formula (II).

In a second aspect, the invention provides a method of treating or preventing glutamate excitotoxicity (glutamate storm) in a patient suffering from a condition that has the potential to result in a pathologically high glutamate level in the brain, wherein the method comprises administering to the patient a therapeutically effective amount of a compound of formula (I):

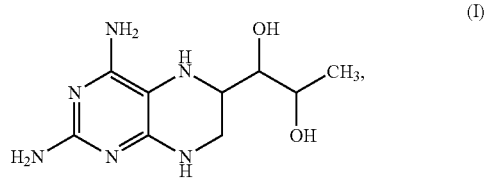 [SMILES: CC(O)C(O)C1CNc2nc(N)nc(N)c2N1]

and/or a compound of formula (II):

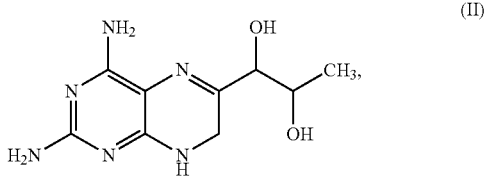 [SMILES: CC(O)C(O)C1=Nc2c(N)nc(N)nc2NC1]

wherein a pathologically high glutamate level in the brain is decreased or prevented by administering the therapeutically effective amount of the compound of formula (I) and/or of formula (II). In this second aspect, administering a therapeutically effective amount of the compound of formula (I) and/or of formula (II) reduces or prevents damage to nerve cells caused by the pathologically high glutamate level in the brain.

BRIEF DESCRIPTION OF THE DRAWINGS

The invention will be better understood with reference to the detailed description when considered in conjunction with the non-limiting examples and the drawings, in which:

FIG. 1A shows the intracranial pressure (ICP) of mice in a controlled cortical impact (CCI) model after CCI and treatment with 4-Amino-(6R,S)-7,8-dihydro-L-biopterin (also referred to VAS3384, with n=9/group and means±SD) over a time of 24 hours, while

FIG. 2A shows the plasma concentrations of 4-Amino-(6R,S)-7,8-dihydro-L-biopterin in mice after a single rectal administration in rabbits of a gel formulation of VAS203 (concentration of 450 mg VAS203/ml gel), while

FIG. 3A shows the glutamate levels measured over a period of 108 hours after the start of the administration of Ronopterin.

FIG. 3B shows the lactate levels measured over the same period of 108 hours after the start of the Ronopterin administration.

FIG. 4C shows that the odds ratio decreases to about 0.6 after 24 to 48 hours of administration of Ronopterin and approaches 0 (zero) 72 hours after administration of Ronopterin. Thus, it can be taken from FIG. 4C that the brain glutamate level will reach a physiologically normal level of less than 10 µmol/L in all TBI patients of age 18 to 39 years who receive Ronopterin. This result unambiguously demonstrates the efficacy of Ronopterin to lower elevated (pathologically high) glutamate levels in patients suffering from a disease or condition that is associated with an increased glutamate level.

FIG. 4F shows that the odds ratio decreases to below 1.0 after 72 hours of administration of Ronopterin. However, compared to the group of patients of an age of 18-39 years, the decrease in brain glutamate levels to a physiologically normal level of less than 10 µmol/L in less pronounced in TBI patients of an age of 40 to 60 years, or expressed differently, Ronopterin provides a stronger reduction in brain microdialysate glutamate levels in patients aged 18-39 vs. patients aged 40-60 years.

FIG. 5C shows the glutamate level of this patient group over the course of administration of Ronopterin expressed in terms of the odds ratio of patients having an extracellular brain glutamate level >10 µmol/L (exceeding 10 µmol). FIG. 5C shows that the odds ratio decreases to less than 0.5 after only 24 hours of administration of Ronopterin and reaches essentially 0 (zero) 48 hours after administration of Ronopterin. Thus, it can be taken from FIG. 5C that the brain glutamate level will reach a physiologically normal level of less than 10 µmol/L in all TBI patients of age 18 to 39 years who receive Ronopterin within a time of ≤12 hours after occurrence of trauma brain injury. Also this result demonstrates the efficacy of Ronopterin to lower elevated (pathologically high) glutamate levels in patients suffering from a disease or condition that is associated with an increased glutamate level.

FIG. 5D shows the number of patients aged 18-39 years who were treated (infused) with Ronopterin or placebo within a time of >12 hours after occurrence of trauma brain injury. FIG. 5E shows the extracellular cerebral glutamate levels (µmol/l) of this patient group after administration of Ronopterin within a time of >12 hours after occurrence of trauma brain injury (9 patients, 630 individual measurements taken in a time of up 108 hours after administration) compared to the placebo group (9 patients, 449 individual measurements). The brain glutamate levels were determined by microdialysis as described herein. As evident from FIG. 5E, patients receiving Ronopterin show essentially the same lower brain glutamate levels with the majority of patients reaching a glutamate level of <10 µmol/L, i.e. a physiologically "normal" glutamate level as the placebo group.

FIG. 5F shows that the odds ratio decreases to below 1.0 48 hours after administration of Ronopterin. However, compared to the group of patients of an age of 18-39 years receiving early infusion, the decrease in brain glutamate levels to a physiologically normal level of less than 10 µmol/L in less pronounced in TBI patients aged 18 to 39 years receiving late infusion. Or expressed differently, Ronopterin provides a stronger reduction in brain microdialysate glutamate levels in patients aged 18 to 39 years with early infusion.

FIG. 6 shows the results of the brain glutamate levels in the patient group of 40-60 years, depending on the time to infusion within 12 hours (early infusion) or after more than 12 hours (late infusion) after occurrence of traumatic brain injury.

FIG. 6A shows the extracellular cerebral glutamate levels (µmol/L) of patients aged 40 to 60 years who were administered with Ronopterin within a time of ≤12 after occurrence of trauma brain injury (3 patients, 423 individual measurements taken in a time of up 108 hours after administration). There was no placebo group for this patient group. As evident from FIG. 6A, the patients receiving Ronopterin within a time of ≤12 after occurrence of trauma brain injury show partially lowered brain glutamate levels, with not all patients reaching a glutamate level of <10 µmol/L.

FIG. 6B shows the extracellular cerebral glutamate levels (µmol/L) of patients aged 40 to 60 years who were administered with Ronopterin within a time of >12 hours after occurrence of trauma brain injury (6 patients, 615 individual measurements taken in a time of up 108 hours after administration) compared to the placebo group (7 patients, 693 individual measurements). As evident from FIG. 6B, the patients receiving Ronopterin within a time of >12 hours after occurrence of trauma brain injury show significantly lowered brain glutamate levels, with the majority of the patients reaching a glutamate level of <10 μmol/L.

FIG. 6C shows that the odds ratio decreases to about 0.7 after 72 hours of administration of Ronopterin and reaches a value of about 0.2 96 hours after administration of Ronopterin. Thus, it can be taken from FIG. 6C that the brain glutamate level will reach a physiologically normal level of less than 10 μmol/L in most TBI patients of age 40 to 60 years who receive Ronopterin within a time of >12 hours (late infusion) after occurrence of trauma brain injury. Also this result demonstrates the efficacy of Ronopterin to lower elevated (pathologically high) glutamate levels in patients suffering from a disease or condition that is associated with an increased glutamate level.

FIG. 7 shows the age-dependent effects of the Ronopterin administration (infusion) on the brain lactate levels for TBI patients of an age of either 18-39 years or 40-60 years with all times to infusion, i.e. for both early infusion (infusion within a time of 6 to ≤12 hours after occurrence of trauma) and late infusion (infusion within >12 to 18 hours after occurrence of the trauma).

FIG. 7A shows the extracellular cerebral lactate levels (millimol/L) of patients aged 18 to 39 years after administration of Ronopterin (23 patients, 2124 individual measurements taken in a time of up 108 hours after administration) compared to the placebo group (18 patients, 1458 individual measurements). The brain lactate levels were determined by microdialysis as described herein. In brain microdialysis and blood, lactate levels exceeding 2.5 millimol/L are considered pathologically elevated. As evident from FIG. 7A, the patients receiving Ronopterin show lower brain lactate levels compared to the placebo group, with patients reaching lactate levels of <2.5 millimol/L, i.e. a physiologically "normal" lactate levels.

FIG. 7B shows the lactate level of this patient group (age 18-39 years) over the course of administration of Ronopterin expressed in terms of the odds ratio of patients having an extracellular brain lactate level ≥2.5 millimol/L (exceeding 2.5 millimol/L). FIG. 7B shows that the odds ratio remains at about 1.0 for the first 48 hours after administration of Ronopterin and then continuously decreases to about 0.22 within 96 hours after Ronopterin administration. As explained herein, as increased extracellular glutamate and lactate levels reflect the extent of underlying tissue injury, a decrease in both glutamate and lactate levels upon administration of Ronopterin indicates the protective activity of Ronopterin against the effects of glutamate excitotoxicity, also known as "glutamate storm". Thus, FIG. 7B shows the ability of Ronopterin to provide protective activity against the effects of glutamate excitotoxicity.

FIG. 7D shows that the odds ratio remains over 1.0 for the entire time period after administration of Ronopterin and even continuously increases over the course of the time. Thus, the results of FIG. 7 show that a stronger reduction in brain microdialysate lactate occurs in patients of 18-39 years compared to patients of 40-60 years.

FIG. 8 shows the results of the brain lactate levels in the patient group of 18-39 years, depending on the time to infusion, i.e. infusion within 12 hours (early infusion) or after more than 12 hours (late infusion) after occurrence of traumatic brain injury.

FIG. 8A shows the extracellular cerebral lactate levels (millimol/l) of patients aged 18 to 39 years who were administered with Ronopterin within a time of ≤12 hours after occurrence of trauma brain injury (10 patients, 948 individual measurements taken in a time of up 120 hours after administration) compared to the placebo group (4 patients, 427 individual measurements). The brain lactate levels were determined by microdialysis as described herein. As evident from FIG. 8A, the patients receiving Ronopterin within a time of ≤12 after occurrence of trauma brain injury showed lower brain lactate levels than the placebo group, with a number of patients having a brain lactate level of <2.5 millimol/L, i.e. a physiologically "normal" lactate level.

FIG. 8B shows the lactate level of this patient group (age 18-39 years) over the course of administration of Ronopterin expressed in terms of the odds ratio of patients having an extracellular brain lactate level ≥2.5 millimol/L (exceeding 2.5 millimol/L). FIG. 8B shows that the odds ratio was below 0.6 for the entire 120 hours after administration of Ronopterin and even decreased within this time period. Thus, FIG. 8B shows the ability of Ronopterin to provide protective activity against the effects of glutamate excitotoxicity.

FIG. 8D shows that the odds ratio remained above 1.0 for the first 72 hours after administration of Ronopterin and then decreased to an value of about 0.22 after 120 hours. Thus, while also FIG. 8D shows the ability of Ronopterin to provide protective activity against the effects of glutamate excitotoxicity for this patient group after late infusion, FIG. 8D also demonstrate that Ronopterin provides a stronger reduction in brain microdialysis lactate levels in patients 18-39 years with early infusion.

FIG. 9 shows the results of the brain lactate levels in the patient group of 39-60 years, depending on the time to infusion, i.e. infusion within 12 hours (early infusion) or after more than 12 hours (late infusion) after occurrence of traumatic brain injury.

FIG. 9A shows the extracellular cerebral lactate levels (millimol/l) of patients aged 40 to 60 years who were administered with Ronopterin within a time of ≤12 hours after occurrence of trauma brain injury (7 patients, 795 individual measurements taken in a time of up 120 hours after administration) compared to the placebo group (6 patients, 351 individual measurements). The brain lactate levels were determined by microdialysis as described herein. As evident from FIG. 9A, the patients receiving Ronopterin within a time of ≤12 after occurrence of trauma brain injury show higher brain lactate levels compared to the placebo group, with all patients having lactate levels of ≥2.5 millimol/L.

FIG. 9B shows the lactate level of this patient group (age 40-60 years) over the course of administration of Ronopterin expressed in terms of the odds ratio of patients having an extracellular brain lactate level ≥2.5 millimol/L (exceeding 2.5 millimol/L). FIG. 9B shows that the odds ratio remains over 1.0 for the entire time period after administration of Ronopterin and even continuously increases over the course of the time.

FIG. 9D shows that the odds ratio decreased from about 1.6 to about 1.0 within 96 hours after administration of Ronopterin, before increasing again till the end of the observation period of 120 hours. Thus, the results of FIG. 9 show that a stronger increase in brain microdialysate lactate in patients of 40-60 years occurs with early infusion of Ronopterin.

FIG. 10 depicts the chemical structure of glutamate and summarizes the key physiology as well as the key pathophysiology of glutamate. As stated in FIG. 10, excessive glutamate release, i.e. levels that are increased (higher than the physiologically normal glutamate levels), damages neurons, astrocytes and endothelial cells. This leads to leaky vessels, swelling, increased metabolism and oxygen consumption, impaired perfusion, and ultimately cell death. Notably, excessive glutamate massively activates inducible NO synthase (iNOS) with NO-induced mitochondrial damage and glutamate release from neurons and astrocytes.

FIG. 13A shows a schematic of the in vitro microdialysis experimental setup as described in Zoerner et al, Peripheral endocannabinoid microdialysis: In vitro characterization and proof-of-concept in human subjects, Anal Bioanal Chem (2012) 402:2727-2735. The dots in FIG. 13A depict Ronopterin as the molecule of interest which, using a microdialysis catheter, is delivered in a perfusion fluid and put into contact with an immersion fluid/matrix fluid (as an organ model) and which exits the microdialysis catheter as microdialysate.

FIG. 13B shows the concentrations (mmol/l) of Ronopterin (ABH4), its first metabolite (ABH2, VAS3384, 7,8-dihydroaminobiopterin) and the second metabolite of Ronopterin (AB) in the perfusion solution at the end (after 180 minutes) of the experiment of Example 5.

FIG. 13C shows the concentrations (mmol/l) of Ronopterin (ABH4), its first metabolite (ABH2, VAS3384, 7,8-dihydroaminobiopterin) and the second metabolite of Ronopterin (AB) in the microdialysate after 120 to 180 minutes of the experiment of Example 5.

FIG. 13D shows the concentrations (μmol/l) of Ronopterin (ABH4), its first metabolite (ABH2, VAS3384, 7,8-dihydroaminobiopterin) and the second metabolite of Ronopterin (AB) in the immersion solution after 120 to 180 minutes of the experiment of Example 5. FIG. 13D also recites the in vitro IC50 value (μmol/l) of Ronopterin and 7,8-dihydroaminobiopterin for iNOS inhibition and illustrates these IC50 values also as a line (highlighted by the respective arrow) in the concentration of Ronopterin and its first metabolite measured in the immersion solution.

DETAILED DESCRIPTION OF THE INVENTION

Figure 3A:
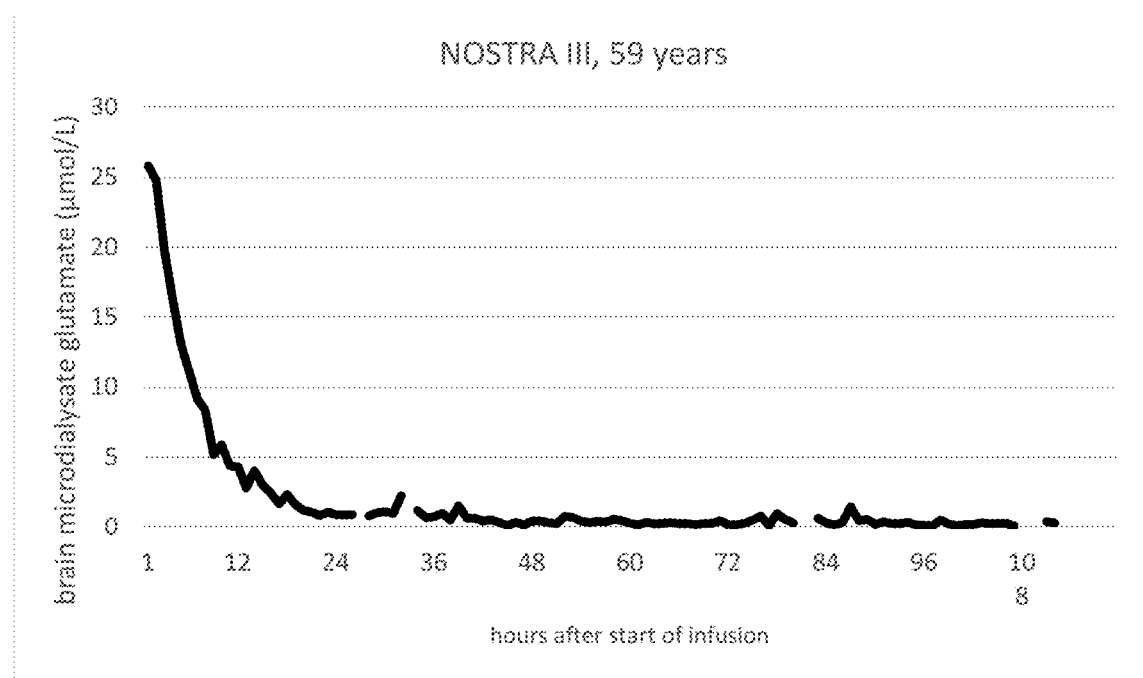
FIG. 3A shows the extracellular brain glutamate levels of a 59 year old male patient who was diagnosed with traumatic brain injury after starting administration of Ronopterin by infusion of a total daily dose of 17 mg/kg body weight over 48 hours. The extracellular brain glutamate levels were measured by microdialysis.
Figure 11:
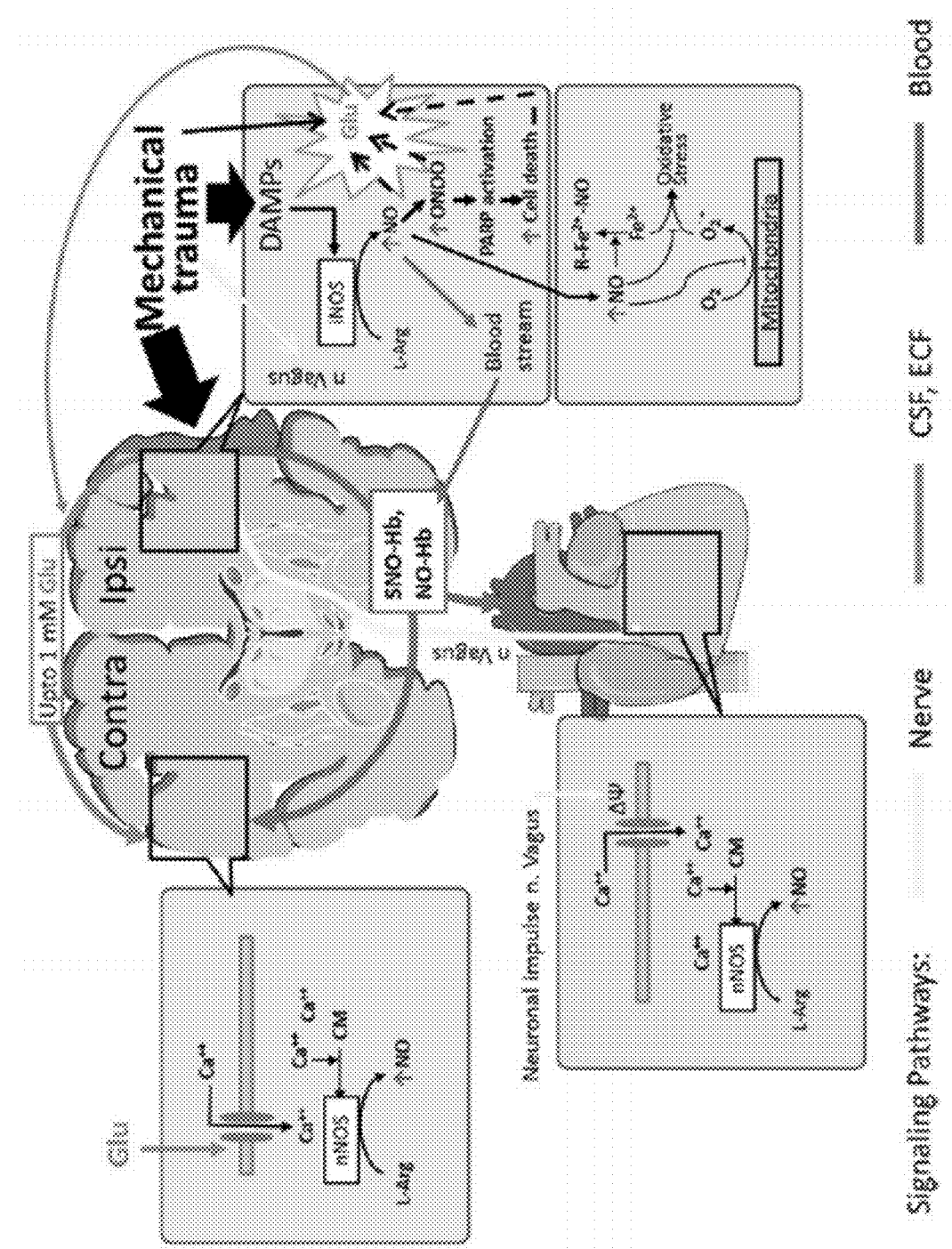
FIG. 11 depicts a scheme (taken from the review of Kozlov et al., Alterations in nitric oxide homeostasis during traumatic brain injury. Biochim Biophys Acta Mol Basis Dis. 2017 October; 1863(10 Pt B):2627-2632)) that illustrates NO metabolism under TBI. The mechanical damage in the ipsilateral cortex causes the release of glutamate and other damage associated molecular pattern molecules (DAMPs). DAMPs up-regulate a number of inflammatory genes including iNOS. Upregulation of iNOS can be deleterious and beneficial. Deleterious effect is based on increased ONOO— generation, activation of cell death mechanisms (including the activation of PARP) and further release of glutamate, resulting in the drastically increased concentration of glutamate in the extracellular fluid. The beneficial effects are likely due to reduction of oxidative stress via inhibition of ROS generation at mitochondria or/and deactivation of redox iron. The increased levels of glutamate activate glutamate receptors, which increase the $Ca^{2+}$ influx in cells activating nNOS by binding calmodulin (CM). The latter can be a reason for increased NO levels in contralateral brain. Alternatively, NO formed in the ipsilateral cortex can be transmitted with the blood to the contralateral brain as well as to distant organs such as heart. Another mechanism increasing NO levels in heart upon TBI is based on pathologic neurotransmission. It is shown, that TBI causes increased intracranial pressure, which stimulate the vagus nerve, which in turn activates $Ca^{2+}$ influx in heart cell via potential sensitive $Ca^{2+}$ channels. $Ca^{2+}$ influx activate nNOS/eNOS via binding CM and this results in increased NO levels in heart.

It has been surprisingly found in the present application that compounds of formula (I) or (II) such as 4-amino-tetrahydrobiopterin (also known by its international nonproprietary name (INN) Ronopterin, or as VAS203) are able, when administered to a patient, to lower increased glutamate levels, for example, both in the extracellular region of the brain of the patient, to physiologically acceptable ("normal") glutamate levels. See in this respect, Example 4 in which infusion of Ronopterin reduced within 12 hours after start of the administration (pathologically) increased extracellular brain glutamate levels in patients being diagnosed with traumatic brain injury to physiologically normal levels of less than 10 µmol/L (see, for example FIG. 3A, showing the decrease of elevated glutamate levels to normal levels in an individual patient after administration of Ronopterin, or FIG. 5C showing this decrease for a patient population). In this context, it has also been found herein that by inhibiting iNOS Ronopterin reduces nitric oxide synthesis and prevents the radical-mediated inhibition of glutamate uptake, thereby reducing elevated extracellular glutamate levels without the negative side effects of inhibiting glutamate receptor pathways (cf. also FIG. 11). Thus, the present invention provides for the first time, an approach, to treat patients suffering from (the adverse effects of) increased glutamate levels that can be caused not only by traumatic brain injury but by any disease condition or disorder that is associated with an increased glutamate level. This approach of lowering the increased glutamate level may include administering a therapeutically effective amount of Ronopterin (as an example of the compound of formula (I) and/or of formula (II) as described herein). Since Ronopterin has meanwhile been studied in a phase III clinical trial and the safety profile of Ronopterin is well known, the invention provides the added advantage of the possibility to develop in a speedy manner treatments for the multiple disease conditions or disorders that are known to be associated with an increased glutamate level.

Figure 3B:
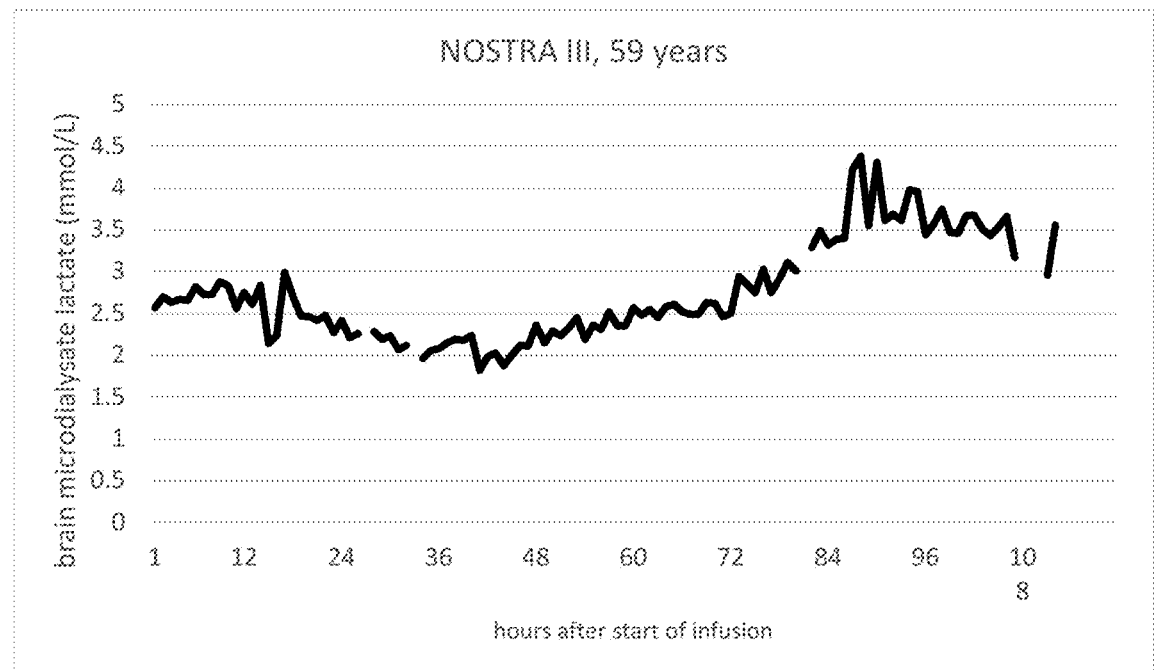
FIG. 3B shows the extracellular brain lactate levels of the same patient after start of the Ronopterin infusion. The extracellular brain lactate levels were also measured by microdialysis.

In addition, it has also been found herein that administration of Ronopterin in patients suffering from increased glutamate levels, not only decreases elevated glutamate levels but also avoids the increase of the level of glutamate-induced production of lactate. See in this respect again Example 4 showing that the administration of Ronopterin resulted in extracellular brain lactate levels that within a time period of 120 hours after administration stayed below the threshold value of 2.5 millimol/L or were only slightly elevated (see, for example FIG. 3B, showing the decrease of elevated lactate levels to normal levels in an individual patient after administration of Ronopterin, or FIG. 8B showing this decrease for a patient population). It is noted here that lactate levels that exceed 2.5 millimol/L in brain microdialysis and/or blood are considered pathologically elevated, reflecting insufficient metabolic/energetic stability which is further aggravated by insufficient oxygen supply. The physiological/therapeutic relevance of this finding is as follows.

Glutamate-mediated cell activation increases glucose consumption with increased production of lactate. Lactate, in turn, can be used to generate energy. Excessive glutamate-mediated activation of neurons and astrocytes may result in extensive production of lactate especially under conditions of mitochondrial damage induced by free oxygen radicals or nitrate radicals from activation of inducible NO synthase (iNOS). Mitochondrial dysfunction impairs lactate conversion to pyruvate, thereby hindering the generation of ATP via oxidative phosphorylation. Structural cell damage from, for example, traumatic brain injury, stroke, infection and/or functional cell damage as a consequence of impaired perfusion, oxygen, and nutrient supply may result in aggravated release of glutamate and lactate. Elevated lactate levels reflect the extent of metabolic impairment and can explain the increase in glutamate release as a consequence of increased membrane permeability. Lactate can thus reflect the extent and severity of the underlying glutamate storm that results from excessive cell activation. This means that lactate is a suitable indicator of the extent and severity of the underlying glutamate storm. Accordingly, as increased extracellular glutamate and lactate levels reflect the extent of underlying tissue injury, a decrease in both glutamate and lactate levels upon administration of a compound such as Ronopterin indicates the protective activity of Ronopterin against the effects of glutamate excitotoxicity, also known as "glutamate storm".

While Ronopterin has previously been known as an inhibitor of inducible NO synthase (iNOS), it has been absolutely surprising for the present inventors to find here that Ronopterin does not only decrease elevated brain glutamate levels of patients but also either decreases brain lactate levels (or at least avoids the increase of the level of glutamate-induced production of lactate) and can be thus used to treat or prevent glutamate excitotoxicity in a patient suffering from a condition that has the potential to result in a pathologically high glutamate level in the brain. This reduced glutamate excitotoxicity can also be seen from the improved recovery of patients from traumatic brain injury that is also described herein. As shown in Example 4, in the patients aged 18-39 years, early infusion of Ronopterin ≤12 hours was associated with a higher proportion of patients with Good Recovery (45% vs 32%); in the patients aged 40-60 years, early infusion of Ronopterin showed a higher proportion of patients with Good Recovery (27% vs 8%). The simultaneous decrease of both elevated glutamate and lactate levels by Ronopterin yields in a better protection of brain cells with less damaged cells. This better protection has meanwhile been found to result in a reduced therapy intensity level (TIL) in patients suffering from TBI. An analysis of the TIL in patients of 18-39 years (data not shown here) has revealed a significant increase in proportion of low TIL levels (3-10 points) (Ronopterin vs Placebo: 71% vs 62%, p=0.01), reflecting decreased aggressiveness of treatment measures required to reduce ICP. Ronopterin's TIL reducing effect is highest during the second week after TBI (81% vs 64%, p=0.0002). Based on these findings, the present invention provides for the first time a small molecule drug and thus a therapeutic approach to treat or prevent glutamate excitotoxicity (glutamate storm). It is believed that the present invention thus represents a real breakthrough in this respect.

It is finally noted here that the finding of the present invention that compounds of formula (I) such as Ronopterin provide protective activity against the effects of glutamate excitotoxicity (by decreasing both glutamate and lactate levels) are consistent with previous observations of Stefani et al, "Elevated glutamate and lactate predict brain death after severe head trauma" Ann Clin Transl Neurol. 2017 May 4; 4(6):392-402. These authors found that cerebrospinal fluid (CSF) levels of glutamate and lactate are both increased in TBI patients and proposed from the clinical perspective that short-term elevation of CSF glutamate and lactate levels after severe TBI has strong predictive value for unfavorable neurological outcome. In this context Stefani et al, also found that the elevated levels of lactate and glutamate are positively correlated with long-term disability grade scale when judged using the modified Rankin Scale (mRS). The mRS score is the commonly used outcome classification scale for disabilities and handicaps after cerebral stroke or other causes of neurological disability. On a molecular level, Stefani et al discussed that the acute increase in brain tissue lactate concentrations after severe TBI is associated to decreased neuronal uptake, probably leading to irreversible injury and pan-necrosis. Thus, also these observations of Stefani et al confirm the suitability of Ronopterin shown herein to treat or prevent glutamate excitotoxicity (glutamate storm) by decreasing pathologically high glutamate and lactate levels in the brain of patients to physiologically acceptable (normal) levels.

The invention will be further explained in the following making reference to either, several or all of these aspects. If reference is only made to one of these aspects, it is understood by the person skill in the art, that this reference nevertheless includes references to all other aspects of the invention, if applicable. In particular if reference is made in the following to the administration of or a formulation containing a compound of formula (I) such as Ronopterin, this reference is also meant to include a compound of formula (II), in particular 4-Amino-(6R,S)-7,8-dihydro-L-biopterin which is depicted in formula (IIa).

Starting with the first aspect, the invention provides a method of treating a human patient suffering from a disease condition or disorder that is associated with an increased glutamate level, wherein the method comprises administering to the patient a therapeutically effective amount of a compound of formula (I):

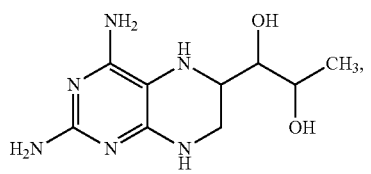

and/or a compound of formula (II):

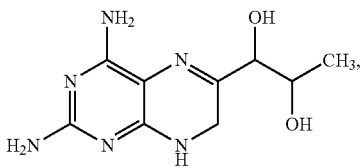

wherein the increased glutamate level is decreased by administering the therapeutically effective amount of the compound of formula (I) and/or of formula (II).

The glutamate level that is increased (elevated) can be any glutamate level of any bodily part or compartment in which glutamate is presented and can be elevated due to a disease condition or disorder that is associated with such an elevated glutamate level. The glutamate level may, for example, be an increased intracerebral glutamate level, an increased glutamate level in the cerebrospinal fluid, an increased glutamate level in an organ and/or an increased systemic glutamate level. In this context, the term "systemic" is used in its regular meaning herein to refer to the circulatory system that affects the whole body. For example, a systemic glutamate level is a glutamate level in the blood or another systemic body fluid.

In case the glutamate level is an increased intracerebral glutamate level, this level may be an increased extracellular intracerebral glutamate level such as a glutamate level in the cerebrospinal fluid (CSF) or in the brain extracellular fluid (ECF). The increased intracerebral glutamate level may, however also be an increased intracellular glutamate level, for example, in neuronal cells/structures of the brain such as neurons, astrocytes or synaptic vesicles. Examples of organs and cells thereof in which glutamate level can be increased include (apart from the brain) skeletal muscle, liver, kidney, and blood cells, to mentioned only a few.

The term "elevated glutamate level" or "increased glutamate level" is used herein in its regular meaning to refer to a glutamate level in a particular bodily part or compartment that is higher than the level under normal conditions, that means physiological (healthy) conditions without a disturbance. The person skilled in the art understands that different bodily parts or compartments have different glutamate levels and the reference value for an "elevated level" is also the normally occurring level (within its "normal deviations") in the particular bodily part or compartments. For example, under normal circumstances, the plasma glutamate level (concentration) is 5-100 µmol/L, more typically 50-100 µmol/L, the whole blood concentration is 150-300 µmol/L while in the extracellular fluid (ECF) of the brain the normal glutamate level is only 0.3-2 µmol/L (see, for example, the review article of Leibowitz et al. "Blood Glutamate Scavenging: Insight into Neuroprotection" Int. J. Mol. Sci. 2012, 13, 10041-10066). Within the different intracellular compartments glutamate is present in higher amounts (usually 5-15 millimolar). Under these normal conditions the respective glutamate level is maintained at these low levels (micromolar) in the extracellular space (<2 µmol/L) and plasma (50-100 µmol/L) to avoid excessive glutamate receptor activation. In one particular embodiment, namely, when the glutamate level (concentration) is an extracellular intracerebral glutamate level wherein the sample to be analyzed is obtained by brain microdialysis (MD), glutamate levels exceeding 10 µmol/L are considered elevated and pathologically high glutamate. See in this respect Chamoun et al, "Role of extracellular glutamate measured by cerebral microdialysis in severe traumatic brain injury" J Neurosurg. 2010 September; 113(3): 564-570, who report a clear trend of a higher mortality rate among TBI patients with an average brain glutamate level >20 µmol/L compared with patients having a brain glutamate level ≤20 µmol/L) and compared to patients with brain glutamate levels between 10 and 20 µmol/L. Thus, in the embodiment, the elevated glutamate level may be any glutamate concentration that is higher than 10 µmol/L (exceeding 10 µmol/L), for example 10.2 µmol/L, 15 µmol/L, 20 µmol/L, 25 µmol/L or 30 µmol/L as determined by microdialysis. Similar, the term "elevated lactate level" or "increased lactate level" is used herein in its regular meaning to refer to a lactate level in a particular bodily part or compartment that is higher than the level under normal conditions, that means physiological (healthy) conditions without a disturbance. The person skilled in the art understands that different bodily parts or compartments have different lactate levels and the reference value for an "elevated level" is also the normally occurring level (within its "normal deviations") in the particular bodily part or compartments. For example, under normal circumstances, the plasma lactate level (concentration) is 0.5-1.5 millimol/L; in patients higher lactate levels (less than 2 millimol/L) are generally accepted as normal (see Richard M. Pino, Jaskaran Singh; Appropriate Clinical Use of Lactate Measurements. Anesthesiology 2021; 134:637-644). In the brain lactate levels are within the range of 0.2-1 µmol/g, possibly doubling during activation (see Dienel G A. Brain lactate metabolism: the discoveries and the controversies. J Cereb Blood Flow Metab. 2012; 32(7):1107-1138. Doi: 10.1038/jcbfm.2011). In the extracellular space of the brain, for example, the cerebrospinal fluid (CSF) normal lactate level is <2.6 millimol/L, see Leen W G, Willemsen M A, Wevers R A, Verbeek M M. Cerebrospinal fluid glucose and lactate: age-specific reference values and implications for clinical practice. PLoS One. 2012; 7(8):e42745. In the extracellular fluid (ECF) of the brain lactate level determined by microdialysis can be higher in awake patients (median 3.41 millimol/L, range:1.56-5.62); see Sánchez-Guerrero A, Mur-Bonet G, Vidal-Jorge M, Gándara-Sabatini D, Chocrón I, Cordero E, Poca M A, Mullen K, Sahuquillo J. Reappraisal of the reference levels for energy metabolites in the extracellular fluid of the human brain. J Cereb Blood Flow Metab. 2017 August; 37(8):2742-2755.).

It is noted here that brain microdialysis which can be used to measure extracellular intracerebral glutamate levels of both glutamate and lactate is well-known to the person skilled in the art and can be carried out, for example, as described here, by Chamoun et al, J Neurosurg. 2010 September; 113(3): 564-570 or by Stefani et al, "Elevated glutamate and lactate predict brain death after severe head trauma" Ann Clin Transl Neurol. 2017 May 4; 4(6):392-402). The glutamate level (concentration) in the sample obtained from the microdialysis (the microdialysate) can then be determined by any known respective analytical method, for example, by a commercial analyzer such as the ISCUS$^{flex}$ Microdialysis Analyzer (available from M Dialysis A B, Stockholm, Sweden) or by a high-performance liquid chromatography (HPLC) glutamate assay as described in Stefani et al., supra or by Stover & Kempski, "Anesthesia increases circulating glutamate in neurosurgical patients", Acta Neurochir (Wien) (2005) 147: 847-853, for example. In this context, it is noted that the glutamate level of a sample obtained from any other bodily fluid or compartment, for example, blood or plasma, can of course also be measured by these analytical methods. See in this respect, for illustration, the HPLC glutamate assays described by Ferrari et al "Effective prophylactic treatments of migraine lower plasma glutamate levels", Cephalalgia, 2008, 29, 423-429 or by Shimmura et al "Alteration of Plasma Glutamate and Glutamine Levels in Children with High-Functioning Autism", PLoS One. 2011; 6(10): e25340. It is also possible to determine the glutamate levels by other well-established methods such as nuclear magnetic resonance (NMR) spectroscopy or magnetic resonance spectroscopy (MRS). See, for example, Zieminska et al "Glutamate, Glutamine and GABA Levels in Rat Brain Measured Using MRS, HPLC and NMR Methods in Study of Two Models of Autism" Front. Mol. Neurosci., 16 Nov. 2018. Likewise, lactate levels (concentration) in the sample obtained from the brain microdialysis (the microdialysate) or from another compartment (blood, serum etc.) can be determined by any known respective analytical method, for example, also by a commercial analyzer such as the ISCUSflex Microdialysis Analyzer or by HPLC.

In accordance with the above disclosure, in any the disease condition is associated with an increased brain glutamate level, administering to the patient a therapeutically effective amount of the compound of the formula (I) and/or formula (II) as described herein results in a decrease in the brain glutamate level. Upon administration, this decreased (extracellular) brain glutamate level may be ≤10 µmol/l as determined by microdialysis, meaning a physiologically normal glutamate level.

Addressing now in more detail the disease condition or disorder that is associated with an increased glutamate level, any disease that is (already) known or yet be found to be associated with an elevated glutamate level can be treated by a compound of formula (I) or formula (II) as described herein. As mentioned above, the disease can be a disease that is associated with, for example, an increased intracerebral glutamate level, an increased glutamate level in the cerebrospinal fluid, an increased glutamate level in an organ and/or an increased systemic glutamate level. This means, it is possible and also explained herein that the disease can be associated, for example with an increased systemic glutamate level and at the same time with an increased intracerebral glutamate level. It is also possible that the disease is a chronic disease or disease/condition that is caused by an acute injury (for example, an acute encephalopathy) such as traumatic brain injury or by a chronic encephalopathy (chronic inflammation). It is also possible that the chronic disease can have acute episodes or flare-ups that are associated with an elevated glutamate level and these episodes or flare-ups can therefore to be treated with a compound of formula (I) or formula (II)). Example of such chronic diseases with acute episode can be chronic inflammation, multiple sclerosis, headache, or seizures, to name only a few.

The disease that is associated with an increased glutamate level can, for example, be a disease of the central nervous system. Illustrative examples of such diseases include, but are not limited, brain trauma and/or the spinal cord trauma, headache, a degenerative process, a mood disorder, and a mental disorder, metabolic diseases (diabetes, copper accumulation, iron accumulation), drug/alcohol dependence and withdrawal.

Examples of brain trauma that can be treated include brain injury such as acute or chronic brain injury. The brain injury may also be blunt and/or penetrating traumatic brain injury. The brain injury may be traumatic brain injury, including, surgical brain injury (for example, the use of brain retractors during surgery causing local tissue compression), non-traumatic brain injury, elevated intracranial pressure, or secondary brain injury. In case of secondary brain injury, this secondary brain injury may comprise a condition selected from the group consisting of edema formation from local or global hypoxia, insufficient local or global perfusion leading to ischemia related to low perfusion pressure or vasoconstriction, excessive perfusion due to higher perfusion pressure or vasodilation with hyperemia, inflammation with and without infection, and neoplasms (which may be benign neoplasms or malignant neoplasms), or side effects of a therapeutic treatment.

As mentioned above, any type of brain injury can be treated by administration of the compound of formula (I) or formula (II) as described here. The brain injury may for example be traumatic brain injury, non-traumatic brain injury, elevated intracranial pressure, or secondary brain injury.

The term "traumatic brain injury" or "brain trauma" occurs when an external force traumatically injures the brain. TBI can be classified based on severity, mechanism (closed or penetrating head injury), or other features (e.g., occurring in a specific location or over a widespread area). A traumatic brain injury can occur as a consequence of a focal impact upon the head, by a sudden acceleration/deceleration within the cranium or by a complex combination of both movement and sudden impact, as well as blast waves, or penetration by a projectile or sharp, or dull object. The Glasgow Coma Scale (GCS), the most commonly used system for classifying TBI severity, grades a person's level of consciousness on a scale of 3-15 based on verbal, motor, and eye-opening reactions to stimuli. In general, it is agreed that a TBI with a GCS of 13 or above is mild, 9-12 is moderate, and 8 or below is severe. Similar systems exist for young children. From the diagnostic point of view, it is further distinguished between open and closed TBIs. An open TBI is considered to be an injury in which the protective barrier under the bone (cerebral meninges, dura mater) is mechanically destroyed and the brain is in contact with the external environment through this opening. Often, an open TBI is associated with the exit of liquor and brain tissue debris. In a closed TBI the skull or cranium remains intact, and the primary damage of the brain (trauma) is characterized by local lesions such as contusions or hematomas and/or diffuse cerebral tissue damage. The term "cranium" when referred to herein is the set of out of the neurocranium (braincase) and the viscerocranium (craniofacial) existing bony and cartilaginous head skeleton of vertebrates. "Intracranial" means within the cranium.

In accordance with the above, traumatic brain injury of any severity can be treated by the administration of the compound of formula (I) as described herein. Thus, the patient to be treated may, for example, have been diagnosed with complicated mild, moderate, or severe traumatic brain injury. In another illustrative example, patient to be treated may have been diagnosed with traumatic brain injury of a Glasgow Coma Score (GCS)≥3. The patient being assessed of having a Glasgow Coma Score (GCS)≥3 may require intracranial pressure (ICP) monitoring and thus may be taken care of in an intensive care unit (ICU). However, it is also possible that the patient does not require ICP monitoring and can, thus, be treated in a normal hospital ward. This may be in particular the case if the patient exhibits a TBI with a GCS of 9 or more, for example, a mild TBI (with a GCS above 13, see above) or a moderate TBI with a GCS of 9-12.

To the contrary, a "non-traumatic brain injury" does not involve external mechanical force to acquire a brain injury. Causes for non-traumatic brain injury may include lack of oxygen, glucose, or blood. Infections can cause encephalitis (brain swelling), meningitis (meningeal swelling), or cell toxicity as e.g. caused by fulminant hepatic failure, as can tumours or poisons. These injuries can occur through stroke, heart attack, near-drowning, strangulation or a diabetic coma, poisoning or other chemical causes such as alcohol abuse or drug overdose, infections or tumours and degenerative conditions such as Alzheimer's disease and Parkinson's disease. An acute neurodegenerative disease is represented by "stroke", which refers to the loss of brain function due to disturbances in the blood supply to the brain, especially when it occurs quickly, and is often associated with cerebrovascular disease. This can occur following ischemia (lack of blood flow) caused by blockage (thrombosis, arterial embolism), or a haemorrhage of central nervous system (CNS), or intracranial blood-vessels. As a result, the affected area of the brain cannot function normally. In accordance with the above, non-traumatic brain injury that can be treated with the invention as described here, may be ischemic/hypoxic/hemorrhagic brain injury (e.g., stroke), post-resuscitation (after e.g., cardiac arrest), subarachnoid haemorrhage, anticoagulation-induced haemorrhage or non-traumatic brain injury that is caused by inflammation and infection.

As an illustrative examples of a such an infection (disease) which can be treated is "meningitis", which is an acute inflammation of the membranes covering the brain and spinal cord, known collectively as the meninges. The inflammation may be caused by infection with viruses, bacteria, or other microorganisms, and less commonly by certain drugs. Encephalitis is another example of an infection that can be treated with the compound of formula (I) as described herein. In another example, the inflammation may be Systemic Inflammatory Response Syndrome (SIRS). In case the disease or disorder that is associated with an elevated glutamate level is non-traumatic brain injury, examples of such a disease or disorder include ischemic/hypoxic/hemorrhagic brain injury (e.g., stroke, hypertension, or vessel occlusion), post-resuscitation (after e.g., cardiac arrest), subarachnoid haemorrhage, anticoagulation-induced haemorrhage, or hydrocephalus.

In addition to the damage caused at the moment of injury, brain trauma (non-traumatic or traumatic brain injury) causes "secondary injury" or secondary brain injury", which refers to a variety of events that take place in the minutes and days following the injury. These processes, which include alterations in cerebral blood flow and the pressure within the skull, contribute substantially to the damage from the initial injury. Secondary injury events may include local changes for example damage to the blood-brain barrier, release of factors that cause inflammation, free radical overload, excessive release of the neurotransmitter glutamate (excitotoxicity), influx of calcium and sodium ions into neurons, and dysfunction of mitochondria. Injured axons in the brain's white matter may separate from their cell bodies as a result of secondary injury, potentially killing those neurons. Other factors in secondary injury are changes in the blood flow to the brain; repeated transient disintegrity of the blood brain barrier; ischemia (insufficient blood flow); cerebral hypoxia (insufficient oxygen in the brain); cerebral edema (swelling of the brain); and raised intracranial pressure (the pressure within the skull). In addition to local alterations, systemic influences from SIRS, infections, low or elevated blood glucose levels, low or very high blood pressure, low oxygen, or low or elevated carbon dioxide levels may also cause secondary and additional brain injury. Thus, a secondary brain injury that can treated as described herein may comprise a condition selected from the group consisting of edema formation from local or global hypoxia, ischemia, inflammation with and without infection, acute and chronic neuroinflammation after traumatic brain injury and neoplasms with both benign neoplasms and malignant neoplasms being treatable.

It can also be that the intracranial pressure may elevate due to swelling or a mass effect from a lesion, such as a haemorrhage. As a result, cerebral perfusion pressure (the pressure of blood flow in the brain) is reduced; ischemia results. When the pressure within the skull rises too high, it can cause brain death or herniation, in which parts of the brain are squeezed by structures in the skull. The term "intracranial pressure" (ICP) means the pressure inside the cranium and thus in the brain tissue and cerebrospinal fluid (CSF). The body has various mechanisms by which it keeps the ICP stable, with CSF pressures varying by about 1 mmHg in normal adults through shifts in production and absorption of CSF. ICP is measured in millimeters of mercury (mmHg) and, at rest, is normally 7-15 mmHg for a supine adult. Changes in ICP are attributed to volume changes in one or more of the compartments contained in the cranium. An "elevated pressure in the cranium" or "elevated intracranial pressure" means an increased pressure in the cranium of a subject in comparison to a normal, healthy subject. As the ICP is normally between 7-15 mm Hg; thus at 20-25 mm Hg, the upper limit of normal, is already considered an elevated ICP and a treatment to reduce this pressure may be needed. Thus, as an elevated ICP can be considered any pressure higher that 20 mm Hg in the cranium of a supine subject, preferably a pressure is higher than 25 mm Hg, higher than 26 mm Hg, higher than 27 mm Hg, higher than 28 mm Hg, higher than 29 mm Hg, higher than 30 mm Hg, higher than 31 mm Hg, higher than 32 mm Hg, higher than 33 mm Hg, higher than 34 mm Hg or higher than 35 mm Hg.

As explained above, the disease treated herein by administration of a compound of formula (II or (I) may be associated with an increased systemic glutamate level. Examples of diseases associated with an elevated system glutamate level are a disease of the central nervous system, a kidney disease, a liver disease, a lung disease, a cardiovascular disease, an endocrinology disease (metabolic disease), bone and joint-related disease (e.g. arthritis), cancer, neuropathy, pancreatitis, exercise-induced glutamate release, treatment-associated increase in systemic glutamate levels (due to chemotherapy, radiotherapy, or serotonin uptake inhibitors), addiction, or by nutrition intake-induced increase of glutamate levels (e.g., intake of mono sodium glutamate), toxic effects of pollutants (e.g. particulate matter, metals, black carbon and gases such as ozone ($O_3$), nitrogen dioxide ($NO_2$) and carbon monoxide (CO)), or trace elements (e.g., manganese, copper, iron) leading to increased systemic glutamate level.

Examples of a disease of the central nervous system that is associated with an increased systemic glutamate level and that can be treated by administration of a compound of formula (I) or formula (II) include stroke, trauma, glioma, multiple sclerosis, amyotrophic lateral sclerosis, depression, autism, chronic schizophrenia, psychosis, attention deficit hyperactivity disorder (ADHD), Alzheimer disease, Parkinson disease, Huntington's disease, Wilson disease, HIV dementia, chronic pain, neuropathy in spinal cord injury, infections, hyperthermia, or fever.

Examples of a lung disease that is associated with an increased systemic glutamate level and that can be treated by administration of a compound of formula (I) or formula (II) include lung fibrosis, liver fibrosis, lung cancer, lung inflammation, or lung infection. The kidney disease that is associated with an increased systemic glutamate level and that can be treated by administration of a compound of formula (I) or formula (II) may, for example, be renal failure or renal ischemia/reperfusion. The liver disease that is associated with an increased systemic glutamate level and that can be treated by administration of a compound of formula (I) or formula (II) may, for example, be liver fibrosis, liver cancer, liver inflammation, or liver infection. Examples of the corresponding endocrinology disease (metabolic disease) include but are not limited to diabetes type 1, diabetes type 2, gout, copper accumulation or iron accumulation. In case the metabolic disease is diabetes, either type 1 or type 2 diabetes, the disease that is associated with increased glutamate level in blood and the retina and that is to be treated with a compound of formula (I) or (II) may be diabetic retinopathy, including diabetic macular edema. Over time, about 1 in 15 people with diabetes will develop diabetic macular edema (DME). DME occurs when blood vessels in the retina leak fluid into the macula (a part of the retina needed for sharp, central vision) which inter alia impairs vision and may induce progressive vessel growth. Examples of cancers that can be treated with a compound of formula (I) or formula (II) are selected from the group consisting of acute myeloid leukemia, chronic myeloid leukemia, colorectal cancer, liver cancer, lung cancer, skin cancer, breast cancer, prostate cancer, head and neck squamous cell cancer, bladder urothelial cancer, and metastasis.

In case the disease that is associated with an increased systemic glutamate level and that can be treated by administration of a compound of formula (I) or formula (II) is a neuropathy, the neuropathy may be drug-induced neuropathy, diabetic neuropathy, neuropathy in cancer, or neuropathy in alcoholism.

In case the disorder or condition that is associated with an increased systemic glutamate level is therapeutic treatment, this treatment my be anesthesia leading to increased systemic glutamate levels, or side effects of drug therapy leading to increased systemic glutamate levels.

In another aspect of the invention the disease condition or disorder that is associated with an increased glutamate level may be selected from the group consisting of a condition with activated local inflammation within the central nervous system (CNS) (neuroinflammation), a vascular pathology, an infection of the brain, the spinal cord and/or the meninges, traumatic injury of the brain and/or the spinal cord, inflammation, seizures, a tumor, headache, degenerative processes, mood disorder, and mental disorder, metabolic changes (diabetes, trace element accumulation), radiotherapy, chemotherapy, and antidepressants.

Examples of a condition with activated inflammation (neuroinflammation) that can be treated by administration of a compound of formula (I) or formula (II) are acute inflammation or chronic inflammation.

The chronic inflammation itself can be associated with or caused by a disease or condition which may be a neuroimmune response, a peripheral immune response, a neurodegenerative disease, an autoimmune disease, traumatic brain injury, a viral infection, a bacterial infection, a fungal infection or a parasitic infection, for example, a parasitic infection by a protozoa, or a by single-celled protists.

The condition with activated local inflammation within the central nervous system (CNS) (neuroinflammation) mentioned above for this aspect may be an inflammation of the retina that leads to retinal degeneration, including retinitis, macular degeneration and/or IL-1β-induced rod degeneration (see in this respect Charles-Messance et al. Journal of Neuroinflammation (2020) 17:1 reporting that IL-1β leads to glutamate-induced rod photoreceptor cell death as it increases the extracellular glutamate concentrations in the retina through the inhibition of its conversion to glutamine in Müller cells, increased release from Müller cells, and diminished reuptake).

Alternatively, the condition with activated local inflammation within the central nervous system (CNS) (neuroinflammation) can be related to a systemic inflammation with a spillover effect on the brain that contributes to acute and progressive structural and functional impairment of the CNS.

The infection of the brain, the spinal cord and/or the meninges mentioned above for this aspect may be a viral infection, a bacterial infection, a fungal infection or an infection caused by a parasite (for example, by a protozoa, or a by single-celled protists).

Examples of the vascular pathology mentioned above for this aspect may be a thrombus, an embolus, a vasospasm, a vasodilation, a vasculitis or arteriosclerosis found in a condition selected from the group consisting of inflammation, infection, stroke, hemorrhages, and trauma.

Examples of the degenerative process mentioned above for this aspect may be a neuro-degenerative disease, an autoimmune reaction, or a metabolic disturbance (for example, hepatic encephalopathy, uremic encephalopathy). Such a neuro-degenerative disease may, for example, be Parkinson's disease, multiple sclerosis, amyotrophic lateral sclerosis, dementia, Huntington's disease, or Wilson disease, while the mood disorder may be depression, bipolar disorder, or a drug-induced disorder. Example of such a drug-induced disorder include alcohol addiction, opioid addiction, benzodiazepine addiction or treatment of attention deficit hyperactivity disorder (ADHD). An illustrative example of a depression may, for example, be depressive behavior induced by (unpredictable) chronic mild stress. See in this context Peng et al. Journal of Neuroinflammation 2012, 9:75 who used a depressive-like state mouse model induced by unpredictable chronic mild stress (UCMS) and evaluated depressive-like behaviors after 4 weeks of UCMS, in the presence and absence of the iNOS inhibitor N-(3-(aminomethyl)benzyl)acetamidine (1400 W).

In case the disease is a mental disorder, this mental disorder may be schizophrenia, bipolar disorder, psychosis, autism, or attention deficit hyperactivity disorder (ADHD).

In a further aspect of the invention the disease condition or disorder that is associated with an increased glutamate level and that be treated by administering a compound of formula (I) or formula (II) may be caused by an acute injury (acute encephalopathy) or by a chronic encephalopathy (chronic inflammation).

In examples of this aspect, the disease condition is trauma or seizure. The trauma may be brain injury.

Examples of brain injury are traumatic brain injury, surgical brain injury, non-traumatic brain injury, elevated intracranial pressure, or secondary brain injury. Such secondary brain injury comprises a condition selected from the group consisting of edema formation from local or global hypoxia, ischemia, inflammation with and without infection, and neoplasms. Such neoplasm may be a benign neoplasm, a malignant neoplasm such as glioma (for example glioblastoma, oligodendroglioma or ependymomas), including brain metastasis of primary cancers. In line with this, the invention includes in illustrative examples, the treatment of edema (formation) caused by glioblastoma or the treatment of peritumoral brain edema (formation) caused by brain metastases (see the clinical trials described in Example 6). In case the disease is non-traumatic brain injury, the non-traumatic brain injury may, for example, be ischemic/hypoxic/hemorrhagic brain injury (e.g. stroke), post-resuscitation (after e.g. cardiac arrest), subarachnoid haemorrhage, or anticoagulation-induced haemorrhage. The non-traumatic brain injury may alternatively be caused by inflammation and infection.

Turning now to the time point of administering the compound of formula (I) or formula (II), it is first discussed that the disease condition or disorder that is associated with an increased glutamate level (or that leads to increased glutamate level) is an acute injury or an acute (spontaneously occurring) event. For this case it can be of advantage to start administering to the patient a therapeutically effective amount of the compound of the formula (I) and/or formula (II) within a time period of ≤12 hours after the occurrence of the acute injury or acute (spontaneously occurring) event. This time period can, for example, be between 6 to 12 hours after the occurrence of the acute injury or acute (spontaneously occurring) event. This means, if, for example, the acute injury (spontaneously occurring event) is brain injury such as traumatic brain injury or stroke (in case of a non-traumatic brain injury), the compound of formula (I) or (II) can thus be advantageously administered within a time period of ≤12 hours after the occurrence of the brain injury. It is noted again in this context that this acute (spontaneously occurring) event or injury can also be an episode or flare-up of a chronic disease, for example spontaneously occurring seizures in case of epilepsy or a flare-up of a chronic inflammation or a condition such as multiple sclerosis.

In this context, "administering to the patient within a time period of ≤12 hours after the occurrence of the acute injury or acute (spontaneously occurring) event" means that the administration of the compound of formula (I) such as Ronopterin or of the compound of formula (II) starts within any time in between the time period of ≤12 hours after the occurrence of the injury and will continue as long as necessary. For example, the administration can start as early as 3 hours or 4.5 hours after the occurrence of the injury (for example, if a patient is hospitalized very shortly after, for example, the event that leads to the acute injury). The administration may, however, also start within a time period of between 6 to 12 hours after the occurrence of the brain injury, for example, 6, 7, or 10 hours after the occurrence of the brain injury. Regardless of whether the administration starts earlier or later than 6 hours after occurrence of the brain injury, the administration will in any case continue for a suitable time period as specified herein.

In this context, also aspects of the invention, in which the administration of the compound of formula (I) such as Ronopterin or of the compound of formula (II) starts within any time later than 12 hours after the occurrence of the acute injury or acute (spontaneously occurring) event is addressed. With respect to this aspect "administering to the patient within a time period of >12 hours after the occurrence of the acute injury" means that the administration of a compound described heron such as Ronopterin can start within any time later than 12 hours after the occurrence of the injury as long as the administration is considered therapeutically useful. In this aspect also the administration will continue as long as necessary. For example, the administration can start as early as 12 hours, for example, 12.1 hours after the occurrence of the acute injury (if such an accurate determination of the time that has lapsed since the acute injury can be made) but also, for example, only 13, 14, 15, 16, 17, 18, 19 or even 20 hours after the occurrence of the acute injury. In this context, it of course also possible to administer a compound of formula (I) or (II) at any desired point of time as long as administering such a compound is expected to have the therapeutic effect of decreasing elevated glutamate levels and the harmful effects of these elevated glutamate levels—the same applies if a compound as described herein is used prophylactically to prevent or avoid the increase of glutamate to a pathophysiological or harmful level.

As described now, the compound of formula (I) such as Ronopterin (4-Amino-5,6,7,8-tetrahydro-L-biopterin) or formula (II) such as 4-Amino-7,8-dihydro-L-biopterin can be administered by any suitable route of administration.

The compound of formula (I) or formula (I) may, for example, be administered by infusion. The term "infusion" is used herein its regular meaning to refer to a continuous administration that takes place over a certain period of time. The administration/infusion can be carried over any time that has been found suitable. For example, such an administration may take over a period of about 12 to about 96 hours, a period of about 24 to about 72 hours or over a period of about 24 to about 48 hours. Thus, the administration may take place for about 1, 2, 3, 4, 5, 6, 7, 8, 9, 10, 11, 12, 13, 14, 15, 16, 17, 18, 19, 20, 21, 22, 23, 24, 32, 40, 48, 56, 68, 72, 86, or 96 hours. However, the administration via injection or infusion can also take longer than the time periods given above, if considered advantageous or necessary. For example, if the body weight of the patient is very high (which can be case of an obese patient) and a total dose of, for example 30 mg/kg body weight, cannot be administered within 72 hours, the administration time may be extended to over 72 hours. As another example, a higher total dosage to be administered may also require a longer infusion time. It is also possible to stop/pause the administration/infusion for a certain period of time, for example to avoid unwanted side effects of the compound of formula (I) or (II) such as nephrotoxicity. Such a pause may thus prolong an intended administration time of, for example, 48 or 72 hours by several hours. Typically, intravenous administration is used herein for the infusion. Intravenous administration is used in its regular term to mean the infusion or injection of a liquid directly into a vein, typically with a syringe and a hollow needle which is pierced through the skin to a sufficient depth for the material to be administered into the body of the subject.

For administration of 4-Amino-5,6,7,8-tetrahydro-L-biopterin (Ronopterin) or 4-Amino-7,8-dihydro-L-biopterin by infusion any suitable pharmaceutical composition containing 4-Amino-5,6,7,8-tetrahydro-L-biopterin or 4-Amino-7,8-dihydro-L-biopterin can be used. Respective suitable formulations are described in International Patent Application WO 2004/084906, or the corresponding U.S. Pat. No. 8,222,828 as well as in European Patent 2 926 805, U.S. Pat. No. 10,016,431 or International Patent Application WO 2015/150294. The solid formulations described in U.S. Pat. No. 10,016,431 or WO 2015/150294 are particularly convenient for being used here for infusion since these solid formulations are stable for 36 months and provide a ready-to-use isotonic infusion solution with physiological pH (between 6.5 to 7.6) after reconstitution of a unit dosage with 50 mL water. The final concentration of Ronopterin in such a ready-to-use infusion solution is 20 mg/mL.

Accordingly, infusion or injection of a compound of formula (I) such as Ronopterin can be carried out with a reconstituted solid composition of the compound of formula (I), wherein a unit dosage of the solid composition contains, as described in U.S. Pat. No. 10,016,431 or WO 2015/150294, 650±60 mg of the free base of 4-Amino-(6R,S)-5,6,7,8-tetrahydro-L-biopterin, 140±30 mg of water of crystallization, 70±7 mg $Na_2HPO_4 \cdot 2\ H_2O$, 16.5±2 mg $NaH_2PO_4 \cdot 2\ H_2O$, and 350±30 mg NaCl. Alternatively, and as also described in U.S. Pat. No. 10,016,431 or WO 2015/150294, a unit dosage of the solid composition may contain 650±60 mg of the free base of 4-Amino-(6R,S)-5,6,7,8-tetrahydro-L-biopterin, 60±50 mg of water of crystallization, 70±7 mg $Na_2HPO_4 \cdot 2\ H_2O$, 12±2.5 mg $NaH_2PO_4 \cdot 2\ H_2O$, and 350±30 mg NaCl. In accordance with the above, the reconstitution then comprises providing a vial containing 1 g of the unit dosage and adding 50 ml water to 1 g of the unit dosage to yield a ready-to-use infusion solution with a concentration of Ronopterin of 20 mg/mL. Such an infusion solution can then be administered (infused) to a patient (population) as described here, for a suitable period of time (such as 12 to 96 hours) starting with the administration either within a time period of ≤12 hours or within a time period of >12 hours.

Turning now to other routes of administration than infusion, the compound of formula (I) or formula (II) can, for example, also be administered by oral administration, rectal administration, local intracerebral administration (for example, via microdialysis catheter) or topical administration. Accordingly, the compound of formula (I) or (II) can be formulated in solid form, for example, as a tablet or pill for such administration routes such as oral administration. The compound of formula (I) or (II) may also be formulated as a solid dosage form such as suppository for insertion into a body orifice. Such a solid dosage form (suppository) dissolves or melts to release the active compound such as Ronopterin (see Example 3A in this respect). With respect to suppositories, three types of suppositories exist, each to insert into a different section: rectal suppositories into the rectum, vaginal suppositories into the vagina, and urethral suppositories into the urethra of a male. All of these three types of suppositories can be used herein.

As already mentioned above, for oral administration, the compound of formula (I) or formula (II) can be formulated into any suitable form and can be administered, for example, as pills, tablets, film-coated tablets, sugar-coated tablets, granules, or hard or soft gelatine capsules but also as aqueous, alcoholic or oily solutions, syrups, emulsions or suspensions. The administration may also take place parenterally, for example subcutaneously, intramuscularly or, as mentioned above, intravenously in the form of injection solutions or infusion solutions. Further suitable administration forms are, for example, percutaneous or topical administration, for example in the form of ointments, tinctures, sprays or transdermal therapeutic systems, or inhalational administration in the form of nasal sprays or aerosol mixtures. It is also possible to a compound of formula (I) or formula (II) in form of, for example, microcapsules, micropumps, implants or rods.

It is also possible to administer the compound of formula (I) or (II) in a modified or controlled release formulation. Such a modified or controlled release formulation may, for example, be particularly suitable when the compound of formula (I) or formula (II) is used for the treatment of a chronic condition as described here. This modified or controlled release formulation can be solid oral formulation but also a formulation to be implanted subcutaneously, for example. A modified release or controlled release formulation used herein may be a sustained-release formulation, where the drug is released slowly at a rate governed by the delivery system. It may also be a controlled-release formulation, where the drug is released at a constant rate and plasma concentrations after administration do not vary with time. A modified release or controlled release formulation used herein may also be a delayed-release formulation, where the drug is released at a time other than immediately after administration, (i.e., the site of release is controlled). These dosage form may also be designed to deliver the compound of formula (I) or (II) in a controlled and predictable manner over a defined period of time or at a predetermined position in the gastrointestinal (GI) tract. Any suitable known formulation methodology can be used herein for such a modified release or controlled release formulation of the compound of formula (I) or formula (II). Examples of well-known technologies for modified-release drugs include, but are not limited to hydrophilic matrix tablets, osmotic systems, coated tablets, laser-drilled osmotic tablets, or matrix systems. Wurster coating is one of the most recognized methods for developing effective controlled-release formulations. The technology involves bottom-spray fluid bed coating of particles with appropriate actives, excipients, or polymers to modify the drug release. Compared to alternative approaches, Wurster coating is a preferred technology as it enables a highly consistent coating of powders, granules, pellets, or micro-tablets with the accuracy and reproducibility of the coating process resulting in superior product performance of the controlled-release dose form. Implants made from such modified release or controlled release formulations may particularly suited for the treatment of chronic conditions are described here (cf, for example, Weidenauer et al. J. Microencapsul. 2004 March; 21(2):137-49. Microencapsulation of hydrophilic drug substances using biodegradable polyesters. Part II: Implants allowing controlled drug release—a feasibility study using bisphosphonates, or Stewart et al., Poly(caprolactone)-Based Coatings on 3D-Printed Biodegradable Implants: A Novel Strategy to Prolong Delivery of Hydrophilic Drugs, Mol. Pharmaceutics 2020, 17, 9, 3487-3500).

Turning now to the dosage used herein, the compound of formula (I) such as Ronopterin or of formula (II) can be administrated in any dose that is therapeutically effective. The upper limit of the daily dose is usually a dose that is still safe to administer in terms of side effects such as nephrotoxicity. Typically, a compound of formula (I) such as Ronopterin or of formula (II) is administered at a total dose in the range of 2.5 mg/kg body weight to 30.0 mg/kg body weight. Illustrative examples of suitable total doses of the compound of formula (I) or (II) include 2.5, 5.0, 7.5, 8.5, 10.0, 12.5, 15.0, 17.5, 20.0, 22.5, 25.0 or 27.5 mg/kg body weight.

If a total dose of the compound of formula (I) or (II) of, for example, 17 mg/kg body weight of the patient is to be administered, the compound of formula (I) or (II) may be administered by infusion over 48 hours, corresponding to a daily dose of 8.5 mg/kg body weight. In yet another example, if a total dose of the compound of formula (I) of 20 mg/kg body weight is to be administered, the compound of formula (I) may be administered by infusion over 48 hours, corresponding to a daily dose of 10.0 mg/kg body weight. In yet another example, if a total dose of the compound of formula (I) of 30 mg/kg body weight is to be administered, the compound of formula (I) may be administered by infusion over 72 hours, corresponding (also) to a daily dose of 10.0 mg/kg body weight.

As described above, one aspect of the invention is directed to use the compound of formula (I) or formula (II) for treating an acute injury or an acute (spontaneously occurring) event as the disease condition or disorder that is associated with an increased glutamate level (or that leads to increased glutamate level). If such a disease condition is associated with an increased extracellular brain glutamate level, administering to the patient a therapeutically effective amount of the compound of the formula (I) and/or formula (II) results in a decrease in the extracellular brain glutamate levels. As a result of the administration the decreased (extracellular) brain glutamate level may be ≤10 μmol/l as determined by microdialysis.

In this aspect, it has been found that it is of advantage to consider the age of the patient that is to be treated and to determine whether the patient is up to 39 years old or is 40 years or older. If the patient is 39 years or younger, the patient may either be a child of an age between 1 year to 10 years, or a teenager or adolescent of an age of 11 to 17 or an adult that has an age in the range of 18 to 39 years. If the patient is 40 years of age or older, the patient can have any age above for 40 years. Such a patient may have an age in the range of 40 to 90 years, 40 to 80 years, 40 to 70 years or 40 to 65 years or 40 to 60 years. The patient may thus have an age of 40, 41, 42, 43, 44, 45, 46, 47, 48, 49, 50, 51, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89 or 90 years.

Figures 5, 5A, 5B:
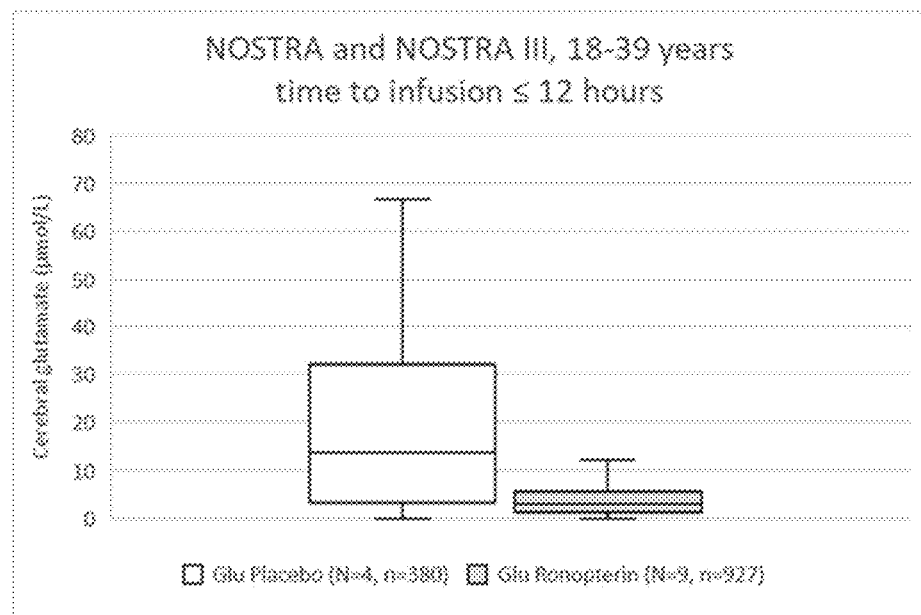
FIG. 5 shows the results of the brain glutamate levels in the patient group of 18-39 years, depending on the time to infusion, i.e. infusion within 12 hours (early infusion) or after more than 12 hours (late infusion) after occurrence of traumatic brain injury.
FIG. 5A shows the number of patients aged 18-39 years who were treated either with Ronopterin or placebo.
FIG. 5B shows the extracellular cerebral glutamate levels (µmol/l) of patients aged 18 to 39 years who were administered with Ronopterin within a time of ≤12 after occurrence of trauma brain injury (9 patients, 927 individual measurements taken in a time of up 108 hours after administration) compared to the placebo group (4 patients, 380 individual measurements). The brain glutamate levels were determined by microdialysis as described herein. As evident from FIG. 5B, the patients receiving Ronopterin within a time of ≤12 after occurrence of trauma brain injury show significantly lower brain glutamate levels, with all patients having a glutamate level of <10 µmol/L, i.e. a physiologically "normal" glutamate level.
Figure 6C:
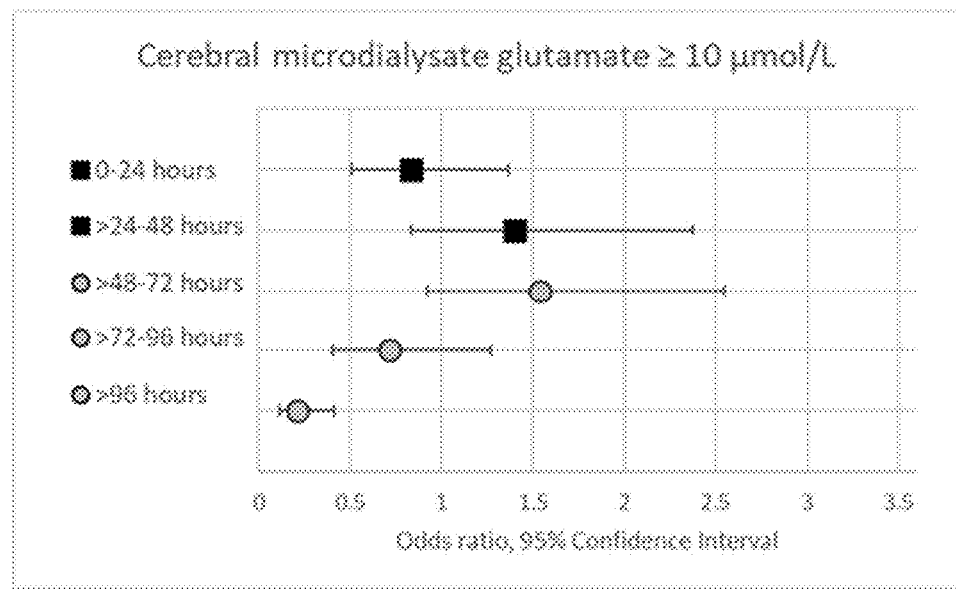
FIG. 6C shows the glutamate level of this patient group over the course of administration of Ronopterin expressed in terms of the odds ratio of patients having an extracellular brain glutamate level ≥10 μmol/L (exceeding 10 μmol).

In case the patient has an age in the range of 18 to 39 years, administering to the patient a therapeutically effective amount of the compound of the formula (I) and/or formula (II) is advantageously started within a time period of ≥12 hours, for example, within a time period between 6 to 12 hours after the occurrence of the acute injury or acute (spontaneously occurring) event. See in this respect, the results of FIG. 5 showing that Ronopterin provides a stronger reduction in brain microdialysate glutamate levels in patients aged 18 to 39 years with early infusion, i.e. within a time period of ≥12 hours after the occurrence of the acute injury or acute (spontaneously occurring) event In case the patient is 40 years or older, administering to the patient a therapeutically effective amount of the compound of the formula (I) and/or formula (II) is advantageously started within a time period of <12 hours after the occurrence of the acute injury or acute (spontaneously occurring) event. See in this respect, the results of FIG. 6C showing that the brain glutamate level will reach a physiologically normal level of less than 10 μmol/L in most TBI patients of age 40 to 60 years who receive Ronopterin within a time of >12 hours (late infusion) after occurrence of trauma brain injury. In accordance with the above disclosure, the patient may have an age in the range of 40 to 90 years, of 40 to 80 years, of 40 to 70 years or of 40 to 65 years.

Addressing now the compounds used here in more details, the compound of formula (I) is typically 4-Amino-(6R,S)-5,6,7,8-tetrahydro-L-biopterin having the formula (Ia):

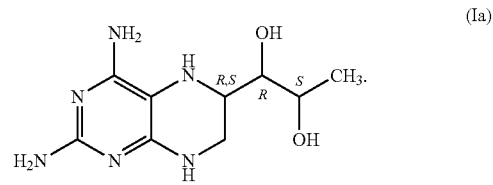

(Ia)

In accordance with the disclosure of, for example, European Patent 2 926 805, the corresponding U.S. Pat. No. 10,016,431 or the corresponding International Patent Application WO 2015/150294, the compound (Ia) may be a diastereomeric mixture that comprises more (6R)-4-Amino-5,6,7,8-tetrahydro-L-biopterin than (6S)-4-Amino-5, 6, 7, 8-tetrahydro-L-biopterin.

Turning now to another (second) aspect of the invention, as disclosed above, it has been surprisingly found herein that compounds of formula (I) (for example, Ronopterin) or formula (II) provide protective activity against the effects of glutamate excitotoxicity.

Accordingly, this aspect provides a method of treating or preventing glutamate excitotoxicity (glutamate storm) in a patient suffering from a condition that has the potential to result in a pathologically high glutamate level in the brain, wherein the method comprises administering to the patient a therapeutically effective amount of a compound of formula (I):

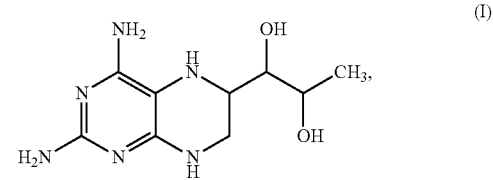 [SMILES: CC(O)C(O)C1CNc2nc(N)nc(N)c2N1]

(I)

and/or a compound of formula (II):

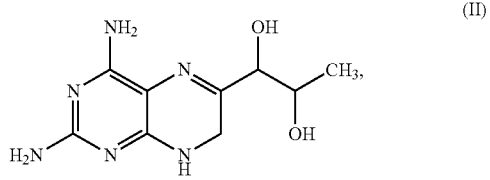 [SMILES: CC(O)C(O)C1=Nc2c(N)nc(N)nc2NC1]

wherein a pathologically high glutamate level in the brain is decreased or prevented by administering the therapeutically effective amount of the compound of formula (I) and/or of formula (II).

It is noted here that the term "excitotoxicity" or "glutamate excitotoxicity" (excitotoxicity (also called a "glutamatergic storm" or "glutamate storm") is used herein in its regular meaning to refer to the damage to nerve cells caused by excessive stimulation of ionotropic glutamate receptors, such as the N-methyl-D-aspartate (NMDA) receptor or the α-amino-3-hydroxy-5-methyl-4-isoxazole propionic acid (AMPA) receptor by glutamate. In more detail, in excitotoxicity, nerve cells suffer damage or death when the levels of otherwise necessary and safe neurotransmitters, such as glutamate, become pathologically high resulting in excessive stimulation of receptors (see, for example, the review articles of Mark et al "Pictorial Review of Glutamate Excitotoxicity: Fundamental Concepts for Neuroimaging" AJNR Am J Neuroradiol 22:1813-1824, November/December 2001, Dong et al "Molecular mechanisms of excitotoxicity and their relevance to pathogenesis of neurodegenerative diseases" Acta Pharmacol Sin 2009 April; 30 (4): 379-387, and Guo & Ma "Calcium Permeable-AMPA Receptors and Excitotoxicity in Neurological Disorders", Front. Neural Circuits, 17 Aug. 2021 and also the respective Wikipedia entry as edited on 16 Feb. 2022, at 15:23 UTC). For example, when glutamate receptors such as the NMDA receptor or AMPA receptor encounter excessive levels of the excitatory neurotransmitter, glutamate, significant neuronal damage might ensue. Excess glutamate allows high levels of calcium ions ($Ca^{2+}$) to enter the cell. $Ca^{2+}$ influx into cells activates a number of enzymes, including phospholipases, endonucleases, and proteases such as calpain. These enzymes go on to damage cell structures such as components of the cytoskeleton, membrane, and DNA. As known to the skilled person excitotoxicity can be involved in cancers, spinal cord injury, stroke, traumatic brain injury, hearing loss (through noise overexposure or ototoxicity), and in neurodegenerative diseases of the central nervous system such as multiple sclerosis, Alzheimer's disease, amyotrophic lateral sclerosis (ALS), Parkinson's disease, alcoholism, alcohol withdrawal or hyperammonemia and especially over-rapid benzodiazepine withdrawal, and also Huntington's disease. A further common condition that may cause excessive glutamate concentrations around neurons is hypoglycemia. Glucose is important to provide enough energy for the removal of glutamate via glutamate transporters from inter-synaptic spaces at the NMDA and AMPA receptor site. Persons in excitotoxic shock must never fall into hypoglycemia. So far, it has been advised that patients be given 5% glucose (dextrose) intravenous infusion during excitotoxic shock to avoid a dangerous build-up of glutamate around NMDA and AMPA neurons.

Thus, in light of the findings of the present invention, a compound such as Ronopterin can also be given by infusion to either prevent the increase of glutamate to a pathologically high level or to decrease such elevated glutamate levels in the brain.

In this context, it is also noted that the term "a condition that has the potential to result in a pathologically high glutamate level in the brain" encompasses not only a condition (a disease) that have the potential to result in a pathologically high glutamate level in the brain itself but also a condition (diseases) that has the potential to result in a systemic glutamate level increase with a secondary increase in the brain glutamate level.

Thus, this aspect includes administering the therapeutically effective amount of the compound of formula (I) and/or of formula (II) reduces or prevents damage to brain cells, including for example, nerve cells, caused by the pathologically high glutamate level in the brain, in particular a pathologically high extracellular glutamate level. In this aspect the pathologically high extracellular glutamate level in the brain may be >10 μmol/l as determined by microdialysis.

In accordance with the above disclosure, the condition to be treated by the compound of formula (I) or (II) that has the potential to result in a pathologically high glutamate level in the brain may be a condition with activated local inflammation within the central nervous system (CNS) (neuroinflammation), a vascular pathology, an infection of the brain, the spinal cord and/or the meninges, traumatic injury of the brain and/or the spinal cord, surgical brain injury, inflammation, seizures, a tumor, a degenerative process, a mood disorder, a mental disorder, alcoholism, drug addiction (for example, opioid addiction, benzodiazepine addiction, ADHD treatment), alcohol addiction and withdrawal, hyperammonemia, hypoglycemia, a metabolic disorder (for example, diabetes, copper accumulation, iron accumulation), radiotherapy or chemotherapy.

Finally, in a third aspect, the invention provides a method of treating a human patient suffering from a disease condition or disorder that is associated with an increased lactate level, wherein the method comprises administering to the patient a therapeutically effective amount of a compound of formula (I):

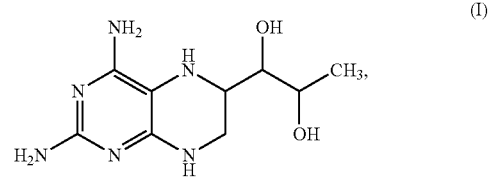

and/or a compound of formula (II):

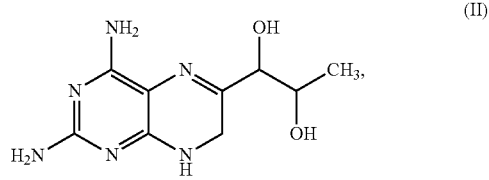 [SMILES: CC(O)C(O)C1=Nc2c(N)nc(N)nc2NC1]

wherein the increased lactate level is decreased by administering the therapeutically effective amount of the compound of formula (I) and/or of formula (II).

The increased lactate level may be an increased intracerebral lactate level, an increased lactate level in an organ and/or an increased systemic lactate level. The increased intracerebral lactate level may be an increased extracellular intracerebral glutamate level or an increased extracellular glutamate level in the cerebrospinal fluid. Administering to the patient a therapeutically effective amount of the compound of the formula (I) and/or formula (II) results in a decrease in the brain lactate level. The so decreased (extracellular) brain lactate level can be ≤2.5 millimol/L) as determined by microdialysis and thus considered a normal lactate level. See Sahuquillo J, Merino M A, Sánchez-Guerrero A, Arikan F, Vidal-Jorge M, Martínez-Valverde T, Rey A, Riveiro M, Poca M A. Lactate and the lactate-to-pyruvate molar ratio cannot be used as independent biomarkers for monitoring brain energetic metabolism: a microdialysis study in patients with traumatic brain injuries. PLoS One. 2014 Jul. 15; 9(7):e.

In case of an increased systemic lactate level, the disease condition or disorder that is associated with this increased systemic lactate level (an increased blood lactate level) can be tissue hypoxia or a metabolic disturbance incl. insufficient amounts of glucose and thiamine (vitamin B1). This metabolic disturbance may be a metabolic disturbance with increased aerobic and anaerobic lactate production. In addition, the metabolic disturbance may also have a decreased lactate clearance. Administering to the patient a therapeutically effective amount of the compound of the formula (I) and/or formula (II) results in a decrease in the systemic (blood) lactate level. The decreased systemic lactate level may be a plasma level of lactate <2 millimol/L.

In this context it is note here that the disease conditions, dosages, administration times and formulations as disclosed for the use of a compound of formula (I) or of formula (II) for treating increased glutamate level in a patient in the first aspect of the invention as defined above equally apply to this second aspect of treating or preventing glutamate excitotoxicity (glutamate storm) in a patient suffering from a condition that has the potential to result in a pathologically high glutamate level in the brain.

Finally, disease conditions with glutamate levels and their associations with increased glutamate level will be discussed in the following to supplement the experimental results of the present application, further demonstrating the ability of the compound of formula (I) and (II) for reducing increased glutamate levels in the disclosed indications.

1. Conditions with Increased Blood (Systemic) Glutamate Levels
I Diseases of the Central Nervous System
Stroke
Aliprandi A, Longoni M, Stanzani L, Tremolizzo L, Vaccaro M, Begni B, Galimberti G, Garofolo R, Ferrarese C. Increased plasma glutamate in stroke patients can be linked to altered platelet release and uptake. J Cereb Blood Flow Metab. 2005 April; 25(4):513-9.
Key Observations
  Plasma glutamate levels
  increased up to 15 days after the ischemic event in stroke patients
  at day 3 inversely correlated with the neurologic improvement between day 3 and 15
  Platelets
  ex vivo platelet glutamate release decreased by 70% in stroke patients
  glutamate uptake decreased by 75% up to 15 days and still reduced 90 days after stroke Castellanos M, Sobrino T, Pedraza S, Moldes O, Pumar J M, Silva Y, Serena J, García-Gil M, Castillo J, Dávalos A. High plasma glutamate concentrations are associated with infarct growth in acute ischemic stroke. Neurology. 2008 Dec. 2; 71(23):1862-8
Key Observations
  Baseline glutamate showed a high and significant correlation with the DWI lesion enlargement
  After adjustment for potential confounders, glutamate levels were the only molecular marker associated with DWI lesion enlargement at 72 hours
  Plasma glutamate concentration is the most powerful and independent predictor biomarker of lesion enlargement in the acute phase of ischemic stroke, and so may well be useful as a signature of tissue at risk of infarction.

Stroke, Acute Lung Injury
Bai W, Li W, Ning Y L, Li P, Zhao Y, Yang N, Jiang Y L, Liang Z P, Jiang D P, Wang Y, Zhang M, Zhou Y G. Blood Glutamate Levels Are Closely Related to Acute Lung Injury and Prognosis after Stroke. Front Neurol. 2018 Jan. 19; 8:755
Key Observations
  Blood glutamate levels
  significantly increased within 7 days of stroke onset
  higher blood glutamate levels in patients with more severe injuries
  closely related to the occurrence and severity of ALI
  closely related to long-term prognosis after stroke
  more accurate predictor of ALI than the more commonly used severity scores Trauma, Acute Lung Injury
Bai W, Zhu W L, Ning Y L, Li P, Zhao Y, Yang N, Chen X, Jiang Y L, Yang W Q, Jiang D P, Chen L Y, Zhou Y G. Dramatic increases in blood glutamate concentrations are closely related to traumatic brain injury-induced acute lung injury. Sci Rep. 2017 Jul. 14; 7(1):5380
Key Observations
  Significantly elevated blood glutamate levels in patients with TBI or multiple peripheral trauma (MPT)
  higher blood glutamate concentrations and longer durations of elevated levels in patients with more severe injuries
  higher blood glutamate levels in the patients with TBI-ALI vs those without ALI
    TBI with ALI: enhanced inflammatory response closely correlated with blood glutamate levels
  blood glutamate concentration: risk factor and better predictor of TBI-ALI than the Glasgow Coma Scale (GCS) score Migraine
Campos F, Sobrino T, Pérez-Mato M, Rodríguez-Osorio X, Leira R, Blanco M, Mirelman D, Castillo J. Glutamate oxaloacetate transaminase: a new key in the dysregulation of glutamate in migraine patients. Cephalalgia. 2013 October; 33(14):1148-54
Key Observations
  higher levels of glutamate during attacks
  correlation between the time elapsed from attack onset and glutamate levels during ictal period Ferrari A, Spaccapelo L, Pinetti D, Tacchi R, Bertolini A. Effective prophylactic treatments of migraine lower plasma glutamate levels. Cephalalgia. 2009 April; 29(4):423-9.
Key Observations
  Plasma levels of glutamate significantly higher in migraine patients compared to controls
  before and after prophylactic treatment After prophylactic treatment, with headache frequency reduced, plasma glutamate levels significantly lower in the same patient compared to prior baseline level
  no differences depending on the kind of prophylactic drug
Effective prophylactic treatments reducing high glutamate plasma levels found in migraine patients could act on the underlying mechanism that contributes to cause migraine
Plasma glutamate level monitoring in migraine patients might serve as a biomarker of response to treatments and as an objective measure of disease status Glioma Dimogerontas G, Polissidis A, Karkalousos P, Konstantinidis E, PapadopoulouDaifoti Z, et al. (2016) Glutamate Concentrations in Plasma and CSF in Patients with Glioma and Meningioma. Int J Pathol Clin Res 2:023

Key Observations
  Significantly higher blood and CSF Glu concentrations in glioma and meningioma patients
  The invasive nature of gliomas, enhanced by Glu release, is one of the most important limitations to an effective treatment
  CSF or plasma Glu concentrations might be an easy and cheap biologic marker for tumor expansion, progression, and response to therapy Depression Inoshita M, Umehara H, Watanabe S Y, Nakataki M, Kinoshita M, Tomioka Y, Tajima A, Numata S, Ohmori T. Elevated peripheral blood glutamate levels in major depressive disorder. Neuropsychiatr Dis Treat. 2018 Apr. 6; 14:945-953

Key observations of systematic review
  Systematic review and meta-analysis of 12 association studies between blood glutamate levels and MDD in a total of 529 MDD patients and 590 controls.
  Subgroup analyses and a meta-regression analysis to examine the sources of potential heterogeneity.
  A random effects model showed that blood glutamate levels were significantly higher in MDD patients than in controls
  Subgroup analyses showed elevated glutamate levels in MDD patients compared with controls in plasma, but not serum studies, and in studies using high-performance liquid chromatography but not with mass spectrometry for glutamate assay
  A meta-regression analysis showed no effects of age, gender, medication use, sample size, and published year on blood glutamate levels Mitani H, Shirayama Y, Yamada T, Maeda K, Ashby C R Jr, Kawahara R. Correlation between plasma levels of glutamate, alanine and serine with severity of depression. Prog Neuropsychopharmacol Biol Psychiatry. 2006 Aug. 30; 30(6):1155-8.

Key Observations
  Plasma levels of glutamate significantly increased in the depressed patients compared to the controls
  positive correlation between glutamate levels and severity of Hamilton Depression Rating Scale (HAM-D) scores Multiple Sclerosis Pampliega O, Domercq M, Villoslada P, Sepulcre J, Rodríguez-Antigüedad A, Matute C. Association of an EAAT2 polymorphism with higher glutamate concentration in relapsing multiple sclerosis. J Neuroimmunol. 2008 March; 195(1-2):194-8

Key Observations
  Significantly increased plasma glutamate levels in MS, especially in relapse and remission
  Higher plasma glutamate levels with EAAT2 polymorphism, suggesting reduced uptake
  Increase glutamate release from stimulated monocytes (not lymphocytes)

Amyotrophic Lateral Sclerosis

Andreadou E, Kapaki E, Kokotis P, Paraskevas G P, Katsaros N, Libitaki G, Petropoulou O, Zis V, Sfagos C, Vassilopoulos D. Plasma glutamate and glycine levels in patients with amyotrophic lateral sclerosis. In Vivo. 2008 January-February; 22(1):137-41.

Key Observations
  Increased plasma Glu levels were observed in ALS correlating with longer disease duration and male gender ($p=0.02$).
  The increase was found in the spinal subtype of the disease Plaitakis A, Caroscio J T. Abnormal glutamate metabolism in amyotrophic lateral sclerosis. Ann Neurol. 1987 November; 22(5):575-9.

Key Observations
  Significant increased plasma glutamate in ALS patients compared with the controls.
  Oral glutamate loading (60 mg of monosodium glutamate per kilogram of body weight, taken orally after overnight fasting) induced significantly greater elevations in the plasma glutamate levels in the ALS patients than in the controls
  Glutamate, a potentially neuroexcitotoxic compound, is thought to be the transmitter of the corticospinal tracts and certain spinal cord interneurons
  A systemic defect in the metabolism of this amino acid may underlie primary ALS Autism Shimmura C, Suda S, Tsuchiya K J, Hashimoto K, Ohno K, Matsuzaki H, Iwata K, Matsumoto K, Wakuda T, Kameno Y, Suzuki K, Tsujii M, Nakamura K, Takei N, Mori N. Alteration of plasma glutamate and glutamine levels in children with high-functioning autism. PLoS One. 2011; 6(10):e25340

Key Observations
  HFA group: higher levels of plasma glutamate compared to controls
  discriminant analysis with logistic regression: plasma glutamate well-differentiate the HFA group from the control group
  Plasma glutamate levels can serve as a diagnostic tool for the early detection of autism, especially normal IQ autism
  Glutamatergic abnormalities in the brain may be associated with pathobiology of autism Cai J, Ding L, Zhang J S, Xue J, Wang L Z. Elevated plasma levels of glutamate in children with autism spectrum disorders. Neuroreport. 2016 Mar. 2; 27(4):272-6

Key Observations
  Mean plasma glutamate levels significantly higher in children with ASD compared with healthy controls and intellectual disability controls
  Levels of glutamate increased with increasing severity of ASD as defined by the Childhood Autism Rating Scale score Chronic Schizophrenia Madeira C, Alheira F V, Calcia M A, Silva T C S, Tannos F M, Vargas-Lopes C, Fisher M, Goldenstein N, Brasil M A, Vinogradov S, Ferreira S T, Panizzutti R. Blood Levels of Glutamate and Glutamine in Recent Onset and Chronic Schizophrenia. Front Psychiatry. 2018 Dec. 19; 9:713

Key Observations
- patients with chronic schizophrenia showed decreased glutamine/glutamate ratio=increased blood glutamate levels
- patients with recent onset schizophrenia showed increased glutamine/glutamate ratio=decreased blood glutamate Psychosis Nagai T, Kirihara K, Tada M, Koshiyama D, Koike S, Suga M, Araki T, Hashimoto K, Kasai K. Reduced Mismatch Negativity is Associated with Increased Plasma Level of Glutamate in First-episode Psychosis. Sci Rep. 2017 May 23; 7(1):2258

Key Observations
- plasma levels of glutamate of first episode psychosis (FEP) were significantly higher than those of healthy controls (HC)
- Higher plasma levels of glutamate were associated with smaller duration of amplitude of mismatch negativity in the FEP and HC groups

ADHD

Sari S A, Ulger D, Ersan S, Bakir D, Uzun Cicek A, Ismailoglu F. Effects of agmatine, glutamate, arginine, and nitric oxide on executive functions in children with attention deficit hyperactivity disorder. J Neural Transm (Vienna). 2020 December; 127(12):1675-1684.

Key Observations
- NO and glutamate levels were also higher in the ADHD group compared to the control group, but these differences did not reach statistical significance.
- Children with ADHD had more difficulties during EF tasks compared to healthy children. The elevated NO and glutamate levels may be related with the impairment during EF tasks
- Significant correlations between glutamate and NO, glutamate and arginine, arginine and NO Alzheimer Disease Nuzzo T, Mancini A, Miroballo M, Casamassa A, Di Maio A, Donati G, Sansone G, Gaetani L, Paoletti F P, Isidori A, Calabresi P, Errico F, Parnetti L, Usiello A. High performance liquid chromatography determination of L-glutamate, L-glutamine and glycine content in brain, cerebrospinal fluid and blood serum of patients affected by Alzheimer's disease. Amino Acids. 2021 March; 53(3):435-449

Key Observations
- serum glutamate levels were significantly higher in patients affected by early AD phases compared to controls HIV Dementia Ferrarese C, Aliprandi A, Tremolizzo L, Stanzani L, De Micheli A, Dolara A, Frattola L. Increased glutamate in CSF and plasma of patients with HIV dementia. Neurology. 2001 Aug. 28; 57(4):671-5

Key Observations
- Plasma levels were also higher in the patients with HIV but did not correlate with either clinical or imaging features Chronic Pain Wesseldijk F, Fekkes D, Huygen F J, van de Heide-Mulder M, Zijlstra F J. Increased plasma glutamate, glycine, and arginine levels in complex regional pain syndrome type 1. Acta Anaesthesiol Scand. 2008 May; 52(5):688-94

Key Observations
- Plasma levels of glutamate, arginine, taurine, and glycine were increased, and plasma levels of glutamine and the ratio of citrulline to arginine were decreased
- pronounced increase in amino acid levels in this chronic pain syndrome. The marked differences in glutamate, glutamine, glycine, taurine and arginine levels between patients and controls suggest the involvement of both the NMDA receptor and the endothelium-dependent arginine-NO system in CRPS1

Hyperthermia, Fever

Zlotnik A, Gurevich B, Artru A A, Gruenbaum S E, Dubilet M, Leibowitz A, Shaked G, Ohayon S, Shapira Y, Teichberg V I. The effect of hyperthermia on blood glutamate levels. Anesth Analg. 2010 December; 111(6):1497-504

Key Observations
- increases in temperature from 40° C. to 42° C. increased the blood glutamate levels II Kidney Renal Failure Rogachev B, Ohayon S, Saad A, Vorobiovsky V, Gruenbaum B F, Leibowitz A, Boyko M, Shapira Y, Shnaider A, Zlotnik M, Azab A N, Zlotnik A. The effects of hemodialysis on blood glutamate levels in chronic renal failure: implementation for neuroprotection. J Crit Care. 2012 December; 27(6):743.e1-7

Key Observations
- Blood glutamate levels significantly higher in patients on HD at baseline compared with healthy controls
- In the first 3 hours after HD: significant decrease in blood glutamate levels compared with baseline levels
- fourth hour: an increase in blood glutamate levels compared with the third hour Kim H J, Seong E Y, Lee W, Kim S, Ahn H S, Yeom J, Kim K, Kwon C H, Song S H. Comparative analysis of therapeutic effects between medium cut-off and high flux dialyzers using metabolomics and proteomics: exploratory, prospective study in hemodialysis. Sci Rep. 2021 Aug. 30; 11(1):17335

Key Observations
- Pre-HD (hemodialysis) levels of glutamate were significantly higher in MCO (medium-cut off dialyzer period) than in the HF (high flux) period Brotfain E, Kutz R, Grinshpun J, Gruenbaum B F, Gruenbaum S E, Frenkel A, Zhumadilov A, Zeldetz V, Bichovsky Y, Boyko M, Klein M, Zlotnik A. Blood Glutamate Reducing Effect of Hemofiltration in Critically Ill Patients. Neurotox Res. 2018 February; 33(2):300-308

Key Observations
- Significant reduction in blood glutamate levels at all time points compared to baseline levels with hemofiltration III Liver Du K, Chitneni S K, Suzuki A, Wang Y, Henao R, Hyun J, Premont R T, Naggie S, Moylan C A, Bashir M R, Abdelmalek M F, Diehl A M. Increased Glutaminolysis Marks Active Scarring in Nonalcoholic Steatohepatitis Progression. Cell Mol Gastroenterol Hepatol. 2020; 10(1):1-21

Key Observation:
- Serum glutamate/glutamine ratio increased and correlated with its hepatic ratio, myofibroblast content, and fibrosis severity.

IV Cardiovascular Diseases

Cardiovascular Disease

Zheng Y, Hu F B, Ruiz-Canela M, et al. Metabolites of Glutamate Metabolism Are Associated With Incident Cardiovascular Events in the PREDIMED PREvención con DIeta MEDiterránea (PREDIMED) Trial. *J Am Heart Assoc.* 2016; 5(9):e003755

Key Observations
  Baseline glutamate associated with increased CVD risk, particularly stroke
  glutamine-to-glutamate ratio associated with decreased risk
  Participants with high glutamate levels may obtain greater benefits from the Mediterranean diet than those with low levels Lehn-Stefan A, Peter A, Machann J, Schick F, Randrianarisoa E, Heni M, Wagner R, Birkenfeld A L, Fritsche A, Häring H U, Staiger H, Stefan N. Elevated Circulating Glutamate Is Associated With Subclinical Atherosclerosis Independently of Established Risk Markers: A Cross-Sectional Study. *J Clin Endocrinol Metab.* 2021 Jan. 23; 106(2):e982-e989

Key Observations
  Plasma glutamate levels, adjusted for age, sex, body fat mass, and visceral fat mass, correlated positively with liver fat content and cIMT and negatively with insulin sensitivity
  Glutamate levels also were associated with cIMT, independently of additional adjustment for liver fat content, insulin sensitivity and BCAAs levels
  Positive association of glutamate and interleukin-6 (IL-6) levels was observed
  Elevated plasma glutamate levels are associated with increased cIMT, independently of established CVD risk factors, and this relationship may in part be explained by IL-6-associated subclinical inflammation V Endocrinology, Metabolic Diseases
Type 2 Diabetes
  Liu X, Zheng Y, Guasch-Ferré M, Ruiz-Canela M, Toledo E, Clish C, Liang L, Razquin C, Corella D, Estruch R, Fito M, Gómez-Gracia E, Arós F, Ros E, Lapetra J, Fiol M, Serra-Majem L, Papandreou C, Martínez-González MA, Hu F B, Salas-Salvadó J. High plasma glutamate and low glutamine-to-glutamate ratio are associated with type 2 diabetes: Case-cohort study within the PREDIMED trial. *Nutr Metab Cardiovasc Dis.* 2019 October; 29(10):1040-1049

Key Observations
  Higher glutamate levels at baseline were associated with increased risk of Type 2 Diabetes Gout
  Pagliara A S, Goodman A D. Elevation of plasma glutamate in gout. Its possible role in the pathogenesis of hyperuricemia. *N Engl J Med.* 1969 Oct. 2; 281(14):767-70

Key Observations
  Fasting plasma glutamate concentration in 36 patients with gout and in 26 normal subjects were analysed. After ingestion of casein (0.5 gm per kilogram of body weight) plasma glutamate reached excessively high levels in the group with gout Yü T F, Adler M, Bobrow E, Gutman A B. Plasma and urinary amino acids in primary gout, with special reference to glutamine. *J Clin Invest.* 1969 May; 48(5):885-94

Key Observations
  Plasma glutamate significantly increased in patients with gout compared to healthy controls Exercise-Induced Glutamate Release and Glutamate-Induced Hemolysis
  Leibowitz A, Klin Y, Gruenbaum B F, Gruenbaum S E, Kuts R, Dubilet M, Ohayon S, Boyko M, Sheiner E, Shapira Y, Zlotnik A. Effects of strong physical exercise on blood glutamate and its metabolite 2-ketoglutarate levels in healthy volunteers. *Acta Neurobiol Exp (Wars).* 2012; 72(4): 385-96

Key Observations
  Blood glutamate levels significantly elevated throughout the exercise session and returned to baseline levels at the cessation of exercise
  2-ketoglutarate, a product of glutamate metabolism, reached significantly elevated levels at 30 minutes from the start of exercise and remained elevated up to 240 minutes post exercise initiation
  Strong physical exercise leads to a significant elevation in blood glutamate, most likely as a result of skeletal muscle damage
  2-ketoglutarate was also found to be elevated for long periods of time, reflecting an ongoing process of glutamate breakdown Makhro A, Haider T, Wang J, Bogdanov N, Steffen P, Wagner C, Meyer T, Gassmann M, Hecksteden A, Kaestner L, Bogdanova A. Comparing the impact of an acute exercise bout on plasma amino acid composition, intraerythrocytic Ca(2+) handling, and red cell function in athletes and untrained subjects. *Cell Calcium.* 2016 October; 60(4):235-44

Key Observations
  Glutamate release from red blood cells with NMDA receptors during exhaustive exercise bouts may acutely facilitate O2 liberation from hemoglobin and improve oxygen delivery to the exercising muscle
  Exercise-induced responses more pronounced in athletes compared to the untrained subjects
  High basal plasma glutamate levels associated with induction of hemolysis and formation of echinocytes upon stimulation with the receptor agonists VI Elevated Glutamate Levels Due to Treatment
Nutrition Intake—MSG
  Stegink L D, Filer L J Jr, Baker G L, Bell E F. Plasma glutamate concentrations in 1-year-old infants and adults ingesting monosodium L-glutamate in consommé. *Pediatr Res.* 1986 January; 20(1):53-8

Key Observations
  Oral glutamate increases plasma glutamate in adults and infants Graham T E, Sgro V, Friars D, Gibala M J. Glutamate ingestion: the plasma and muscle free amino acid pools of resting humans. *Am J Physiol Endocrinol Metab.* 2000 January; 278(1):E83-9

Key Observations
  Oral glutamate increases plasma and muscle glutamate in adults Valencia E, Marin A, Hardy G. Impact of oral L-glutamine on glutathione, glutamine, and glutamate blood levels in volunteers. *Nutrition.* 2002 May; 18(5):367-70

Key Observations
  Oral glutamine significantly increases plasma glutamate

Anesthesia
  Stover J F, Kempski O S. Anesthesia increases circulating glutamate in neurosurgical patients. *Acta Neurochir (Wien).* 2005 August; 147(8):847-53

Key Observations
  Isoflurane and propofol significantly increase plasma glutamate Therapy Side Effect
  Rodrigues D O, Bristot I J, Klamt F, Frizzo M E. Sertraline reduces glutamate uptake in human platelets. *Neurotoxicology.* 2015 December; 51:192-7

Key Observations
- Sertraline dose dependently reduces platelet glutamate uptake Upadhyaya L, Agrawal J K, Dubey G P. Effect of L-thyroxine and carbimazole on blood levels of biogenic amines in rat. Exp Clin Endocrinol. 1993; 101(5):307-10

Key Observations
- L-thyroxine increased blood glutamate levels

Further Indications

I. Neuropathy

Reviews

Diabetic Neuropathy

Vinik A I, Strotmeyer E S, Nakave A A, Patel C V. Diabetic neuropathy in older adults. Clin Geriatr Med. 2008 August; 24(3):407-35

Involvement of iNOS

Neuropathy in Spinal Cord Injury, Cancer, Diabetes, Alcoholism

Carrasco C, Naziroğlu M, Rodríguez A B, Pariente J A. Neuropathic Pain: Delving into the Oxidative Origin and the Possible Implication of Transient Receptor Potential Channels. Front Physiol. 2018 Feb. 14; 9:95.

Key Observations
- neuropathic pain is an underestimated socioeconomic health problem affecting millions of people worldwide, which incidence may increase in the next years due to chronification of several diseases, such as cancer and diabetes
- Growing evidence links neuropathic pain present in several disorders to central sensitization, as a global result of mitochondrial dysfunction induced by oxidative and nitrosative stress
  - spinal cord injury (SCI)
  - cancer
  - diabetes
  - alcoholism
- Additionally, inflammatory signals and the overload in intracellular calcium ion could be also implicated in this complex network
- neuropathic pain could be a consequence of the imbalance between reactive oxygen species and endogen antioxidants, antioxidant supplementation may be a treatment option II. Drug-Induced Neuropathy Iżycki D, Niezgoda A A, Kaźmierczak M, Piorunek T, Iżycka N, Karaszewska B, Nowak-Markwitz E. Chemotherapy-induced peripheral neuropathy—diagnosis, evolution and treatment. Ginekol Pol. 2016; 87(7):516-21.

Key Observations
- Pain management (opioids, tricyclic antidepressants, anticonvulsants, serotonin-norepinephrine reuptake inhibitors, nonsteroid anti-inflammatory agents)
- Antioxidants (alpha-lipoic acid, glutathione, vitamin E)
- Substances influencing ion channels (calcium/magnesium supplementation, pregabaline, carbamazepine)
- Neuroprotectors (*Ginkgo biloba*, glutamine)
- At present, the reduction of chemotherapy (longer neurotoxic drug-free periods) or its withdrawal is regarded as the most efficient effective method of managing CIPN
- Many drugs failed Oxaliplatin and Glutamate Mihara Y, Egashira N, Sada H, Kawashiri T, Ushio S, Yano T, Ikesue H, Oishi R. Involvement of spinal NR2B-containing NMDA receptors in oxaliplatin-induced mechanical allodynia in rats. Mol Pain. 2011 Jan. 20; 7:8

Key Observations
- involvement of nitric oxide synthase (NOS) as a downstream target of NMDA receptor
- L-NAME, a non-selective NOS inhibitor, and 7-nitroindazole, a neuronal NOS (nNOS) inhibitor, significantly suppressed the oxaliplatin-induced pain behavior. The intensity of NADPH diaphorase staining, a histochemical marker for NOS, in the superficial layer of spinal dorsal horn was obviously increased by oxaliplatin, and this increased intensity was reversed by intrathecal injection of Ro25-6981
- spinal NR2B-containing NMDA receptors are involved in the oxaliplatin-induced mechanical allodynia Yamamoto S, Ushio S, Egashira N, Kawashiri T, Mitsuyasu S, Higuchi H, Ozawa N, Masuguchi K, Ono Y, Masuda S. Excessive spinal glutamate transmission is involved in oxaliplatin-induced mechanical allodynia: a possibility for riluzole as a prophylactic drug. Sci Rep. 2017 Aug. 29; 7(1):9661

Key Observations
- oxaliplatin disrupts the extracellular glutamate homeostasis in the spinal cord, which may result in neuropathic symptoms Shnayder N A, Petrova M M, Popova T E, Davidova T K, Bobrova O P, Trefilova V V, Goncharova P S, Balberova O V, Petrov K V, Gavrilyuk O A, Soloveva I A, Medvedev G V, Nasyrova R F. Prospects for the Personalized Multimodal Therapy Approach to Pain Management via Action on NO and NOS. Molecules. 2021 Apr. 22; 26(9):2431.

Key Observations
- The role of NO and NO synthases (NOS) isoforms in peripheral pain development and chronicity was demonstrated primarily from animal models to humans.
- The most studied is the neuronal NOS (nNOS). The role of inducible NOS (iNOS) and endothelial NOS (eNOS) is still under investigation.
- Associative genetic studies have shown that single nucleotide variants (SNVs) of NOS1, NOS2, and NOS3 genes encoding nNOS, iNOS, and eNOS may be associated with acute and chronic peripheral pain.
- Prospects for the use of NOS inhibitors to modulate the effect of drugs used to treat peripheral pain syndrome are discussed. Associative genetic studies of SNVs NOS1, NOS2, and NOS3 genes are important for understanding genetic predictors of peripheral pain chronicity and development of new personalized pharmacotherapy strategies
- It is known that iNOS is activated in inflamed tissue [10] and is involved in the development of hypersensitivity to pain in inflammatory and neuropathic animal models of pain [11]. The use of iNOS inhibitors can block inflammatory and neuropathic pain syndromes
- The importance of the NMDA/NO cascade in opioid tolerance has been extensively studied. The ability of NOS inhibitors to block morphine tolerance has been established; they also directly affect morphine pain relief [58,59]
- Peripheral nerve damage can lead to central sensitization of neurons in the posterior horns of the spinal cord by activating nociceptive afferent cells, followed by activation of NMDA receptors and NO production in spinal cord cells [63-67].

III. Manganese and Glutamate

Manganese

Tinkov A A, Paoliello M M B, Mazilina A N, Skalny A V, Martins A C, Voskresenskaya O N, Aaseth J, Santamaria A, Notova S V, Tsatsakis A, Lee E, Bowman A B, Aschner M.

Molecular Targets of Manganese-Induced Neurotoxicity: A Five-Year Update. Int J Mol Sci. 2021 Apr. 28; 22(9):4646

Key Observations

The impact of manganese overexposure on glutamate-glutamine cycle. Manganese exposure results in a significant increase in glutamate levels through down-regulation of glutamine synthetase (GS) [179] and glutamate dehydrogenase (GDH) [182] along with up-regulation of glutaminase [179]. These effects result in reduced glutamate-to-glutamine conversion as well as glutamate catabolism in Krebs cycle through the formation of ketoglutarate. Mn-induced inhibition of astrocyte glutamate uptake results from inhibition of glutamine transporters (GLT1 and GLAST).

in welders exposed to metal-containing fumes, Mn overload was associated with iNOS gene methylation and parkinsonism In addition, L-NAME pretreatment significantly increased the protective effects of naringerin upon A_1-B and Mn2+ exposure in rats (0.8 mg/kg Mn intranasal for 21 days), indicative of a role for iNOS in the pathogenesis of Mn and amyloid beta neurotoxicity [147]. (Naringenin inhibits TPC2 activity by impairing intracellular calcium signalling)

Szpetnar M, Luchowska-Kocot D, Boguszewska-Czubara A, Kurzepa J. The Influence of Manganese and Glutamine Intake on Antioxidants and Neurotransmitter Amino Acids Levels in Rats' Brain. Neurochem Res. 2016 August; 41(8): 2129-39. doi: 10.1007/s11064-016-1928-7

Key Observations

Manganese increases CSF glutamate and decreases GABA

Glutamine reduces CSF glutamate and increases GABA

Fernsebner K, Zorn J, Kanawati B, Walker A, Michalke B. Manganese leads to an increase in markers of oxidative stress as well as to a shift in the ratio of Fe(II)/(III) in rat brain tissue. Metallomics. 2014 April; 6(4):921-31

Key Observations glutamate concentrations were elevated in brain samples of Mn-supplemented rats, suggesting oxidative stress in the brain tissue substantial evidence that Mn-induced neuroinflammation leads to oxidative stress IV. Fibrosis Lung Fibrosis Jarzebska N, Karetnikova E S, Markov A G, Kasper M, Rodionov R N, Spieth P M. Scarred Lung. An Update on Radiation-Induced Pulmonary Fibrosis. Front Med (Lausanne). 2021 Jan. 15; 7:585756

Key Observations development of lung fibrosis is a dynamic and complex process, involving the release of reactive oxygen species, activation of Toll-like receptors, recruitment of inflammatory cells, excessive production of nitric oxide and production of collagen by activated myofibroblasts V. Arthritis Arthritis Ramage L, Martel M A, Hardingham G E, Salter D M. NMDA receptor expression and activity in osteoarthritic human articular chondrocytes. Osteoarthritis Cartilage. 2008 December; 16(12):1576-84

Key Observations

VI. Pancreas

Di Cairano E S, Davalli A M, Perego L, Sala S, Sacchi V F, La Rosa S, Finzi G, Placidi C, Capella C, Conti P, Centonze V E, Casiraghi F, Bertuzzi F, Folli F, Perego C. The glial glutamate transporter 1 (GLT1) is expressed by pancreatic beta-cells and prevents glutamate-induced beta-cell death. J Biol Chem. 2011 Apr. 22; 286(16):14007-18

Key Observations

Glutamate is present in islet of Langerhans where it is secreted by the α-cells and acts as a signaling molecule to modulate hormone secretion.

Chronic exposure to glutamate exerts a cytotoxic effect in clonal β-cell lines and human islet β-cells but not in α-cells.

In human islets, glutamate-induced β-cell cytotoxicity associated with increased oxidative stress and led to apoptosis and autophagy VII. Iron DeGregorio-Rocasolano et al, (review article) Deciphering the Iron Side of Stroke: Neurodegeneration at the Crossroads Between Iron Dyshomeostasis, Excitotoxicity, and Ferroptosis, Front. Neurosci., 19 Feb. 2019

Maria Daglas and Paul A. Adlard, (review article) The Involvement of Iron in Traumatic Brain Injury and Neurodegenerative Disease, Front. Neurosci., 20 Dec. 2018

VIII. Copper

Kalita J, Kumar V, Misra U K, Ranjan A, Khan H, Konwar R. A study of oxidative stress, cytokines and glutamate in Wilson disease and their asymptomatic siblings. J Neuroimmunol. 2014 Sep. 15; 274(1-2):141-8. doi: 10.1016/j.jneuroim.2014.06.013. Epub 2014 Jun. 24. PMID: 25002079.

Results: In WD patients, glutamate was increased (4.7±0.11 vs. 3.03±0.52 nmol/ml, P<0.001) compared to controls.

Conclusions: In WD patients, glutamate is increased which are more marked in symptomatic neurologic WD than asymptomatic patients.

Medici V, Czlonkowska A, Litwin T, Giulivi C. Diagnosis of Wilson Disease and Its Phenotypes by Using Artificial Intelligence. Biomolecules. 2021 Aug. 20; 11(8):1243. doi: 10.3390/biom11081243. PMID: 34439909; PMCID: PMC8394607.

WD diagnosis was based on plasma levels of glutamate, asparagine, taurine, and Fischer's ratio.

The invention will be further illustrated by the following non-limiting Experimental Examples.

EXAMPLES

The following examples further illustrate the invention. These examples should however not be construed as to limit the scope of this invention. The examples are included for purposes of illustration and the present invention is limited only by the claims.

Example 1: Manufacturing of Ronopterin

Ronopterin (VAS203) is prepared in a multistep synthesis starting from commercially available L-biopterin as described in Example 1 of, for instance, U.S. Pat. No. 10,016,431 or WO 2015/150294.

Example 2: Manufacturing of Solid Ronopterin Containing Composition (Drug Product)

Ronopterin (VAS203) is supplied as a sterile, white to pale red or brown lyophilised powder filled in 50 mL glass vials under nitrogen as a protective atmosphere. Each vial contains 650±60 mg of the free base of 4-Amino-(6R,S)-5,6,7,8-tetrahydro-L-biopterin and 140±30 mg of water of crystallisation. Additionally, the vials contain 350±30 mg sodium chloride (NaCl), 70±7 mg disodium hydrogen phosphate dihydrate (Na$_2$HPO$_4$·2 H$_2$O), and 16.5±2 mg sodium dihydrogen phosphate dihydrate (NaH$_2$PO$_4$·2 H$_2$O). The limits of tolerance of the drug product composition are relatively high (±10%). The reason for this is the variation of the hydrochloride content of Ronopterin. The hydrochloride content of Ronopterin varies from batch to batch up to 10% (from 2.03 HCl to 2.24 HCl). During the preparation of the drug product the hydrochloride was neutralised in the present invention by addition of sodium hydroxide and sodium-phosphate buffer to obtain an isotonic solution with a physiological pH value. Therefore, also the content of the molecules generated during neutralisation (sodium chloride, disodium hydrogen phosphate and sodium dihydrogen phosphate) varies according to the hydrochloride content of the respective Ronopterin batch. The given limits of tolerance are necessary to meet the specifications of the quality relevant parameters pH and osmolality. The qualitative composition of 1 g Ronopterin vials is listed in Table 2.

TABLE 2

| Component | Reference to standards | Function |
|---|---|---|
| 4-Amino-(6R,S)-5,6,7,8-tetrahydro-L-biopterin | In house | Active ingredient |
| Sodium chloride* | Ph. Eur. | Osmolarity |
| Disodium hydrogen phosphate dihydrate | Ph. Eur. | Buffer |
| Sodium dihydrogen phosphate dihydrate | Ph. Eur. | Buffer |
| Water for injection (aqua ad inject.) | Ph. Eur. | Solvent used for reconstitution |
| Nitrogen | Ph. Eur. | Protective atmosphere |

*Sodium chloride is generated during the preparation of the formulation when the hydrochloride of the drug substance reacts with the sodium hydroxide solution. Both ingredients comply with the European Pharmacopoeia.

Pharmaceutical Composition

A solid lyophilised dosage form of Ronopterin as described in U.S. Pat. No. 10,016,431 or WO 2015/150294 was used here for the preparation of the infusion solutions used in the clinical study.

1 g Ronopterin ad 10 g sodium hydroxide/sodium hydrogen phosphate solution buffer with a final pH of 7.4 as described in U.S. Pat. No. 10,016,431 or WO 2015/150294 was selected to be aseptically processed, sterilised by membrane filtration and filled into 50 mL glass vials. Subsequently, this solution was freeze-dried according to a selected lyophilisation program that produced a lyophilised product with excellent stability. In this solid composition, Ronopterin is present as free base 4-Amino-5,6,7,8-tetrahydro-L-biopterin. The vials are closed under nitrogen, sealed with freeze-drying stoppers and closed with white vacuum closures. The excipients are added in order to provide an isotonic solution with physiological pH after reconstitution with 50 mL water ad inject. The pH of the final isotonic solution is 6.5 to 7.6. The final concentration of the drug substance VAS203 (Ronopterin) is 20 mg/mL.

Example 3: ICP-Reducing and Neuroprotective Effects of VAS3384 after Intravenous Infusion of 560 mg/kg Over 6 h in the Controlled Cortical Impact Model in Mice The primary objective of this experiment was the characterization of the intracranial pressure (ICP) reduction by VAS3384 in the controlled cortical impact (CCI) model in mice. The secondary objective was characterization of the neuroprotective effect (reduction of the lesion volume) of VAS3384 in the controlled cortical impact model in mice.

Formulations
  Test compound A
  Denomination: VAS 3384
  Active agent: 4-Amino-4-desoxy-7,8-dihydrobiopterin-dihydrochloride, obtained from Schircks Laboratories, Bauma, Switzerland
  Detailed composition: VAS 3384 dissolved in sodium phosphate buffer (PBS) pH 7.4
  Formulation method: 15 mg of the test compound (VAS 3384) are dissolved in 500 µl PBS, pH 7.4. The solution is neutralized with 72 µl 1 N NaOH and filled up with 428 µl water (check pH).
  Final concentration of active agent: 15 mg/ml
  Appearance: yellow, clear solution
  Storage (solid test compound): −20° C.
  Dose applied: 560 mg/kg or 37.3 ml/kg
  Way of administration: intravenous injection/infusion
  Negative control
  Denomination: sodium phosphate buffer (PBS)
  Active agent: none
  Detailed composition: Na$_2$HPO$_4$, NaH$_2$PO$_4$, 100 mM pH 7.4
  Formulation method: ready for use
  Final concentration of active agent: not applicable
  Appearance: colourless, clear solution
  Expiration date: 3 months after preparation
  Volume applied: 37.3 ml/kg
  Way of administration: intravenous injection/infusion Experimental Procedure The animals (C57 BL/6 mice), under Dormicum/Methidomidin/Fentanyl-narcosis were fixed in a stereo tactical frame and the scalp was opened with a cut along the median. The skull bone was laid open and disinfected with H$_2$O$_2$. A hole of approx. 1.2 mm diameter was then drilled into the skull (Bregma 0.4-0.4 mm). The ICP-probe was introduced through this hole. The V. jugularis was be laid open and a catheter introduced. This catheter was introduced in the neck subcutaneously and fixed on the cap of the cage with a protective spiral of metal. This setup permitted an infusion in awake animals. The skull was opened above of the right cortex and mechanically traumatized (CCI model). The skullcap was then closed with the removed bone.

The animals were allocated into the following groups:

Mice 1-9: 10 minutes after the trauma the animals got an intravenous bolus injection of 20 mg/kg VAS 3384 (=1.33 ml/kg) followed by an infusion of 1.5 mg/kg/min (=100 µl/kg/min) VAS 3384 over six hours to maintain the dose. After six hours, after termination of the infusion, and after 24 hours the ICP of the animals was measured. After 24 hours the animals were sacrificed, the brains dissected and the lesion volume determined by Nissl's method.

Mice 10-18: 10 minutes after the trauma the animals received an intravenous bolus injection of 1.33 ml/kg PBS followed by an infusion of 100 µl/kg/min PBS over six hours. After six hours, after the termination of the infusion, and after 24 hours the ICP of the animals was measured.

At the end of the observation period animals were sacrificed by cervical dislocation in deep halothane anaesthesia. The brains were carefully removed, frozen in powdered dry ice, and stored at −20° C. until further use. Ten µm coronal sections were prepared every 500 µm on a cryostat (CryoStar HM 560, Microm, Walldorf, Germany) and stained with cresyl violet. Sections were photographed with a digital camera system. The contusion area, the area of the non-traumatized tissue of the ipsilateral hemisphere, and the area of the contralateral hemisphere were determined on the digitized images with a standard image analysis software (Optimate 6.51, Media Cybernetics, Silver Spring, MD, USA) by an investigator blinded to the treatment of the animals. In order to correct for the swelling of contused tissue, the contusion area was calculated by subtracting the area of the non-traumatized tissue of the ipsilateral hemisphere from the area of the contralateral hemisphere. Contusion volume was calculated based on the contusion areas corrected for brain edema obtained from 15 sections as following: $0.5 \times (A1+A2+ \ldots +A15)$.

The relevant test parameter was intracranial pressure measured by ICP-probe 6 hours and 24 hours after the start of treatment.

Results

Figure 1A:
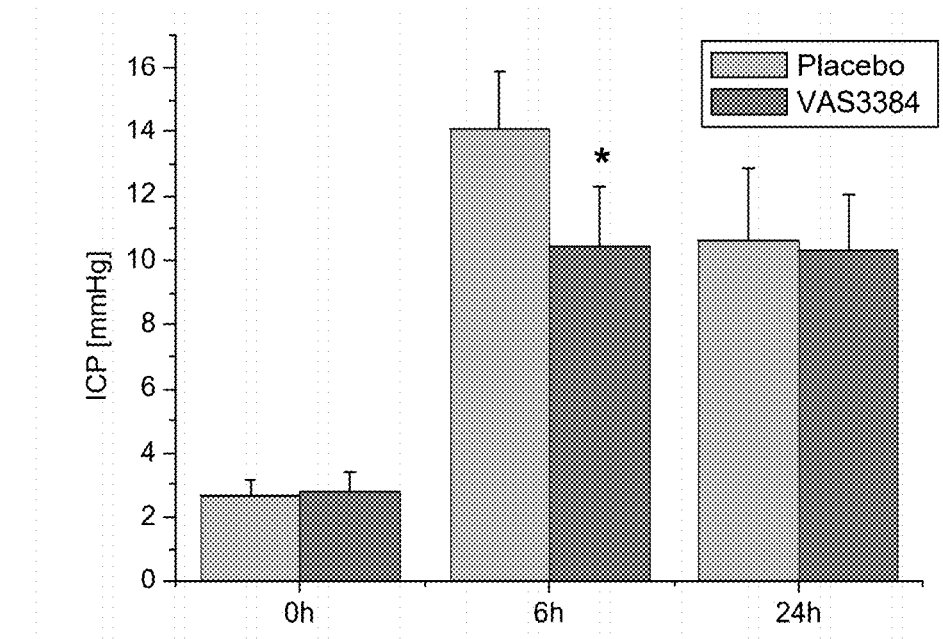
Figure 1B:
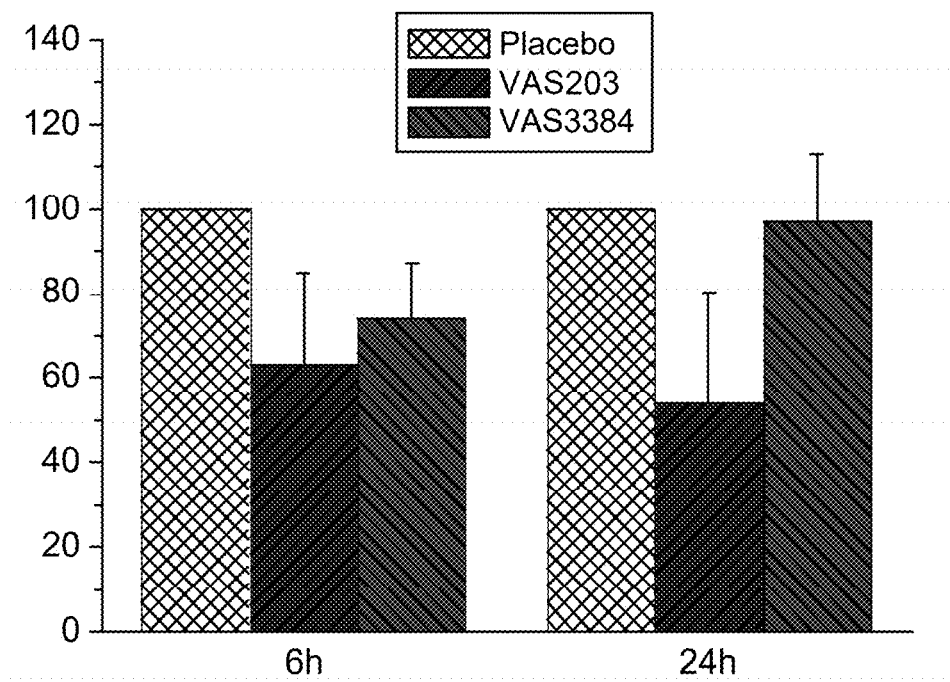
FIG. 1B shows the ICP-reduction (in percent of starting ICP) by treatment with VAS203 and VAS3384 in comparison with placebo over the course of 24 after administration of VAS203 or VAS3384.

FIG. 1A shows the mean ICP of both experimental groups (mice treated with VAS3384 and the placebo group) with standard deviations at the start of the experiment and 6 hours as well as 24 hours after the start of treatment. Treatment with VAS3384 (by infusion of 560 mg/kg VAS3384) significantly lowered the ICP (VAS3384 10.4+/−1.9 vs placebo 14.1+/−1.8; p=0.0005) after 6 hours. FIG. 1B shows the ICP-reduction (in percent of starting ICP) by treatment with VAS203 and VAS3384 in comparison with placebo. As can be seen from FIG. 1B directly at the end of the six-hour infusion of VAS3384 the ICP of the animals was lowered to a similar extent as observed for the analogous treatment with VAS203. This effect could however not be observed after 24 hours (VAS3384 10.3+/−1.7 vs placebo 10.7+/−2.3; non-significant). While the ICP after the treatment with VAS203 remained lowered at least 18 h, after 18 hours ICP of the animals treated with VAS3384 returned to values comparable to those of the placebo group. The finding can be explained as follows. While the first metabolite of VAS203 (VAS3384) is still active, the second metabolite of VAS203 (or the first metabolite of VAS3384, aminobiopterin) exhibits no therapeutic activity. In addition, VAS 3384 has about ten times less potency to inhibit the i-NOS in comparison to VAS203, thus showing also a weaker therapeutic effect.

SUMMARY AND CONCLUSION

Infusion of 560 mg/kg VAS3384 for six hours, starting 10 minutes after setting of the CCI, resulted in a significantly reduction of the increased ICP when compared with the placebo group.

Example 3A: Formulation of VAS 203 as a Suppository and Bioavailability of VAS203 after Rectal Administration in Rabbits In this Example, VAS203 was formulated as a gel at a concentration of 450 mg VAS203/ml for single rectal administration in rabbits. This formulation of VAS203 as a gel (450 mg/ml) was filled in 2 ml syringes pact in foil with an oxygen absorber.

Dosing/Design

Six rabbits were dosed with 1.5 ml of VAS203 gel (corresponding to a dosage of about 200 mg VAS203/kg body weight). Blood collection was carried out at pre-dose, 10 min, 20 min, 40 min, 1 h, 2 h, 3 h, 4 h, 5 h, 6 h, and 20-26 h after rectal administration. The whole blood samples (ca. 1-2 ml sufficient to obtain approx. 0.3 mL EDTA plasma/animal/sampling time), were collected into pre-cooled EDTA vials. To stabilise the blood samples, 1 mg Dithioerythritol (DTE) was added to approx. 1 mL blood. Within 15 minutes of blood collection the samples were centrifuged at 4° C. for 10 minutes. The plasma was transferred to vials and immediately frozen and stored at −80° C. for analysis.

Pharmacokinetics

The plasma concentrations (in µg/L) of VAS203, 7,8-Dihydroaminobiopterin (VAS3384, ABH2, the compound of formula (II) as shown in here) and Aminobiopterin (VAS3382, AB) were measured by liquid chromatography mass spectrometry (LC-MS).

Figure 2A:
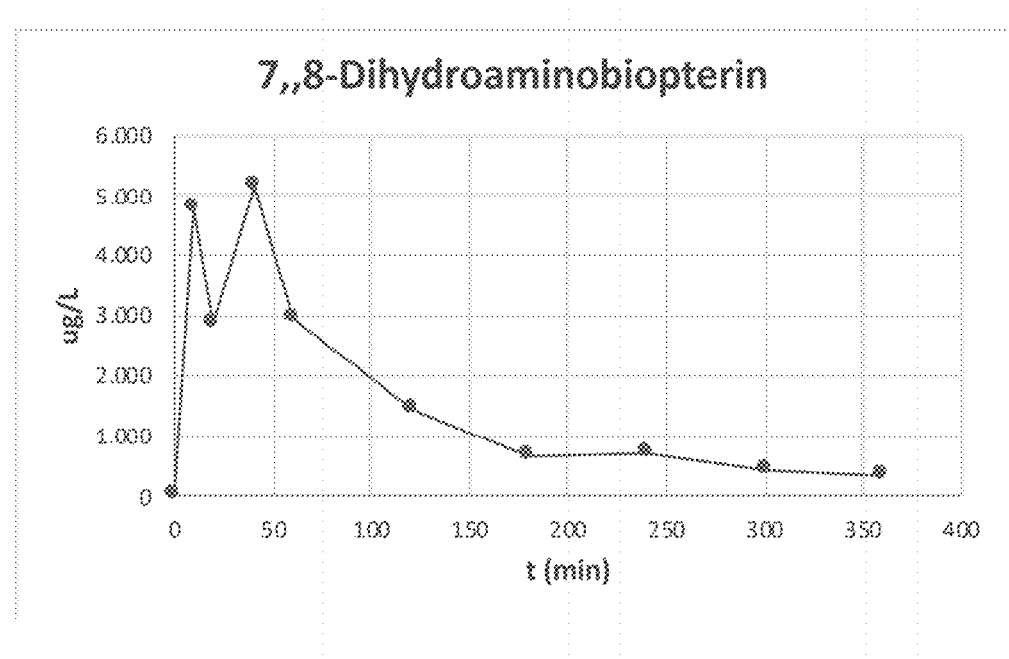
Figure 2B:
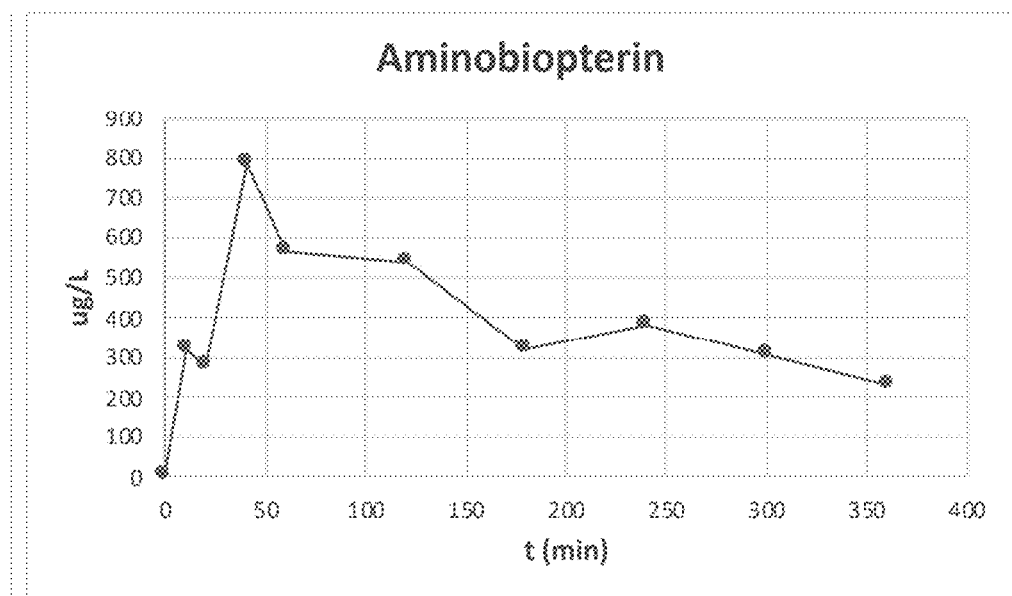
FIG. 2B shows the plasma concentrations of 4-Amino-biopterin in the mice after this single rectal administration of this gel formulation of VAS203.

For VAS203 no reliable data could be obtained due to the fast oxidation of VAS203 in the blood stream. However, since 7,8-dihydroaminobiopterin, the first metabolite is pharmacologically active (see Example 3), this fast oxidation is therapeutically not relevant. The results for 7,8-dihydroaminobiopterin showed a fast increase of plasma concentrations of this first metabolite ABH2 (see FIG. 2A), reaching a plateau of about 4000 µg/L after approx. 15-20 minutes followed by elimination with a half-life ti/2 of approximately 80 min. The second metabolite, aminobiopterin, ABH2, reached a plateau after approx. 50 minutes as expected followed by a slower elimination with an ti/2 of approximately 4 hours (FIG. 2B).

This data shows that VAS203 can be formulated in dosage forms such as suppositories suitable to deliver VAS203 for local or systemic treatment effects.

Example 4: Completed Clinical Trials with Ronopterin

A phase II and a phase III trial of Ronopterin infusion to adult TBI patients (phase II: 18-65 years, phase III: 18-60 years) with acute moderate and severe TBI were performed. Based on the results of the earlier phase II study, the NOSTRA III (NO Synthase in TRAumatic Brain Injury) phase III trial was designed to detect clinically relevant differences in clinical outcome (Extended Glasgow Outcome Score at 6 months after injury) as primary endpoint. In addition, the extracellular intracerebral glutamate levels and lactate levels of these TBI patients were also determined in an exploratory approach to monitor the metabolic state of the patients.

Methods/Design

Trial Design and Participants

NOSTRA III was a multicentre, prospective, two parallel groups, blinded, placebo-controlled, randomised phase III trial of Ronopterin infusion for 48 hours in adult intensive care patients with acute moderate and severe TBI. The primary objective was to demonstrate that the extended Glasgow Outcome Score (eGOS) 6 months after injury is improved following administration of Ronopterin compared to placebo. The detailed study protocol is described by Tegtmeier et al. Efficacy of Ronopterin (VAS203) in Patients with Moderate and Severe Traumatic Brain Injury (NOSTRA phase III trial): study protocol of a confirmatory, placebo-controlled, randomised, double blind, multi-centre study. Trials. 2020. A total of 224 evaluable patients with moderate and severe TBI were enrolled in 32 centres in Austria, France, Germany, Spain, and United Kingdom. The trial started on 24 Aug. 2016 with last-patient last-visit on 17 Jun. 2020.

Eligibility

Patients between 18 and 60 years of age with Glasgow Coma Score ≥3 requiring intracranial pressure (ICP) monitoring were enrolled. Other inclusion criteria were TBI within the last 18 hours but at least 6 hours after the injury, which were expected to survive more than 24 hours after admission. The upper limit of age was set to 60 years for safety reasons, as in the NOSTRA-II trial in particular elderly patients exhibited renal dysfunction.

Key exclusion criteria were penetrating head injury, concurrent spinal cord injury, bilateral fixed and dilated pupils (>4 mm), renal dysfunction (serum creatinine values >1.2 mg/dL), rhabdomyolysis, and decompressive craniectomy planned prior to randomisation.

The inclusion and exclusion criteria were designed to exclude patients with unsurvivable injuries and patients at risk of renal failure. For complete inclusion and exclusion criteria see Tegtmeier et al., Trial 2020, vide supra.

The centres treated the patients according to their established standard of care; all centres were requested to follow the standardised TBI clinical practice according to the current guidelines [Carney].

Randomisation and Blinding

Patients were assigned to receive Ronopterin and placebo in a ratio of 1:1 via a confidential internet-based system with block randomisation. Balance in treatment allocation across the study participants was enhanced through stratification by the age of the included patient (two age groups 18-39 and 40-60 years) per enrolling site.

The trial was conducted as a double blinded trial. Patients, site investigators, site research coordinators, the sponsor, central CT scan assessor and the staff in charge of treating the patients and evaluating the outcome were blinded.

Because the infusion solution of Ronopterin is slightly yellowish, the ready-to-use infusion solution of Ronopterin and placebo (saline) was prepared in an opaque syringe by unblinded staff not involved in the care of trial patients. Depending on the local organisation this was a medical employee from another ward or the central pharmacy.

Trial Interventions

Ronopterin and placebo (0.9% saline) were infused continuously via central venous catheter at a constant rate. A total dose of 17 mg/kg body weight of Ronopterin was infused for 48 hours (daily dose 8.5 mg/kg body weight).

The dose for each patient was calculated automatically based on the individual body weight, resulting in an individual infusion rate for each patient.

Sample Size Estimation

The main primary and secondary analyses followed a modified intention-to-treat approach to define the full analysis patient set, based on all randomly assigned patients except those withdrawing consent for use of all trial data and those not fulfilling inclusion criteria and never receiving the intervention.

Measurement of Glutamate and Lactate Levels

To monitor the metabolic condition of the patients, extracellular brain glutamate and lactate levels were measured. In more detail, the extracellular intracerebral glutamate and lactate levels measured here is the glutamate or lactate level in brain extracellular fluid (ECF). It is noted here that measurement of the respective level in the cerebrospinal fluid (CSF), as an alternative way to measure extracellular intracerebral glutamate or lactate levels, would yield comparable results. The measurements of the glutamate and lactate levels was carried out using established brain microdialysis (MD) methodology as described, for example, by Chamoun et al, example. Role of extracellular glutamate measured by cerebral microdialysis in severe traumatic brain injury. J Neurosurg. 2010 September; 113(3): 564-570.

The microdialysis (MD) equipment was obtained from M Dialysis AB, Stockholm, Sweden, see www.mdialysis.com. The following equipment was used.

Cerebral MD catheters: CMA 70
CMA 70 bolt catheter
CMA 71 high cut-off cerebral catheter
Pumps: CMA106=fixed flow rate, CMA107=flexible flow rate
Perfusion solution: Cerebral: Perfusion fluid CNS
Analyzers: CMA 600, ISCUS, ISCUSflex Time Point of MD Catheter Insertion
Aim: Obtain stable baseline values before infusing study drug
Ideal: By 14 hours after TBI or 4 hours before study drug infusion to allow for tissue adaptation, usually lasting 1-4 hours
Compromise: As soon as possible, within 4 hours after beginning study drug infusion Site of Cerebral MD Catheter Insertion
Aim: Monitor metabolic changes close to structural damage visible on routine CT scan
Contusion: Close to the contusion
Mixed lesions: Predominantly injured hemisphere
With bolt system: Right or left frontal lobe
Without bolt system: Right or left frontal/temporal/parietal area
If possible cerebral MD catheter should be placed ipsilateral to the ICP probe
Special care should be taken to avoid inducing injury to pre- and postcentral cortex
The position of the MD probe and the position of the ICP probe in the eCRF should be indicated.

The cerebral glutamate and lactate levels were recorded every 1 h up to 5 days after the start of the infusion. Absolute values were be summarized per treatment group and for each time point by means of descriptive statistics. The 95% confidence intervals for the mean were calculated (normal approximation).

Study Objectives and Endpoints

The primary outcome was the difference between eGOS in Ronopterin and placebo treated patients at 6 months after trauma. The eGOS was determined by a face to face meeting by trained assessors.

The prognostic factor according to Steyerberg et al. (Steyerberg et al. Predicting outcome after traumatic brain injury. PLoS Med 2008 5(8)) predicts the probability of 6 months mortality or probability of 6 months unfavorable outcome. The prognostic factor was analyzed by a t-test on a two-sided alpha level of 0.05. The mean difference of the score under Ronopterin and Placebo with its 95%-confidence interval were summarized for comparability at baseline.

Endpoints for Glutamate and Lactate Levels

No particular end point was set for extracellular brain levels of glutamate and lactate since the primary purpose of these measurements were to monitor the metabolic state of the patients in an exploratory approach.

For the analysis of the metabolic state, it was considered that under normal (physiological) conditions glutamate is maintained at low levels (micromolar) in the extracellular space (<2 µmol/L) and in plasma (50-100 µmol/L) to avoid excessive glutamate receptor activation. Within the different intracellular compartments glutamate is present in higher amounts (5-15 millimolar). In brain microdialysis, glutamate levels exceeding 10 µmol/L are considered elevated, higher glutamate levels are associated with worse outcome. In addition to the absolute levels, dynamic changes are also important in interpreting underlying pathology. In brain microdialysis and blood, lactate levels exceeding 2.5 millimol/L are considered pathologically elevated, reflecting insufficient metabolic/energetic stability which is further aggravated by insufficient oxygen supply.

Statistical Analysis

Based on the results of the NOSTRA II trial, sample size estimation of the current NOSTRA Phase III study was based on an assumed odds ratio of 2.3.

The NOSTRA phase III trial was designed to detect a treatment effect as statistically significant on an alpha level of 0.05 with a statistical power of 92%, 220 evaluable patients were needed for the full analysis set. To account for patients lost for follow up and withdrawals, number of recruited patients was increased by 5% to 232 patients. However, as number of withdrawals and lost-to-follow up was very low, the study was successfully completed after recruitment of evaluable 224 patients.

The null-hypothesis of no shift across the 8 ordered categories of eGOS for the two treatment groups was tested after six months based on a proportional odds model stratified by age (18-39 years and 40-60 years). The treatment effect was estimated using ordinal Logistic regression model as the (proportional) odds ratio of Ronopterin versus Placebo. Treatment and age (18-39 years and 40-60 years) were included in the model. The proportional odds assumption was tested using a Chi-Square Score Test.

As secondary efficacy endpoint the eGOS at 3 months was analysed using the same statistics.

Data Monitoring and Interim Analyses

An independent Data and Safety Monitoring Committee (DMC) reviewed the safety data on an on-going basis. Three safety interim analyses were scheduled after inclusion of 40, 80, and 110 patients, respectively. After enrolment of 110 FAS-evaluable patients an unblinded interim analysis was conducted. The result of this interim analysis was the recommendation to continue and finalize the study as planned, Safety and Adverse Event Analyses Safety analyses was performed using standard descriptive methods.

The total number of treatment-emergent adverse events (TEAE) and the total number of patients with TEAEs, the total number of TEAEs related to the study drug (certain, probable, possible), the total number of patients with TEAEs related to the study drug, the total number of TEAEs and the total number of patients with serious TEAEs, the total number of patients with TEAEs leading to discontinuation of study treatment and the total number of patients with TEAEs leading to death were summarised by treatment arm.

Ethical Approval

This trial was conducted in patients unable to consent with patient's legal representatives providing consent for the patient according to local regulations. All patients who recovered were asked to re-consent. Approval for this protocol was obtained from competent regulatory authorities and ethics committees according to local regulations.

Description of the Post Hoc Analysis

The main objective of the post hoc analyses was to estimate the effect size of VAS203 compared with placebo for the primary endpoint eGOS-I (eGOS-Interview) in the subgroups time to infusion ≤12 hours and >12 hours. Supportive analyses were conducted by age group (<40 years, ≥40 years) because age group was used as a stratification factor in the study. Comparability between treatment groups regarding demographics as well as severity and location of disease was investigated using similar methods as in the main CSR.

The proportions of patients per eGOS-I level at 3 months and at 6 months were calculated. For the change in eGOS-I over time, the proportion of patients with changes from 3 to 6 months were calculated by eGOS-I level, and in addition categorised as decreased (i.e. any decrease in eGOS-I level from 3 to 6 months), unchanged (i.e. no change in eGOS-I level from 3 to 6 months), and increased (i.e. any increase in eGOS-I level from 3 to 6 months).

Ordinal logistic regression was used for the analysis of eGOS-I at 3 months and at 6 months, including treatment group and age group (<40 years, ≥40 years) as factors in the model. Estimated odds ratios for the comparison of the VAS203 and placebo groups of >1 mean that eGOS-I was higher in the VAS203 group than in the placebo group across the 8 levels, whereas odds ratios of <1 mean that eGOS-I was lower in the VAS203 group than in the placebo group. Odds ratios together with their 95% CIs were used to estimate and assess the size of the treatment effect of VAS203 compared to placebo. Proportional hazards were assumed as valid for all these analyses because ordinal logistic regression analysis is known to be robust against deviations from this assumption; also, the power of assumption checking would be low for small subgroups.

The binary variable eGOS-I increase was defined as "yes" if there was an increase of at least 1 level from 3 to 6 months. If there was no change or a decrease of at least 1 level from 3 to 6 months, the variable was defined as "no". For the analysis of eGOS-I increase, nominal logistic regression was used, including treatment group and age group (<40 years, ≥40 years) as factors and eGOS-I at 3 months as covariate to adjust for potential differences at 3 months. Obtained odds ratios for the comparison of the VAS203 and placebo groups of >1 mean that the eGOS-I increase occurred more often in the VAS203 group than in the placebo group, whereas odds ratios of <1 mean that the eGOS-I increase occurred less often in the VAS203 group than in the placebo group.

The analyses were done for all patients in the full analysis set (FAS) and for the subgroups defined by time to infusion (≤12 h, >12 h) and age group (<40 years, ≥40 years).

The analyses were based on the Analysis Dateset Model (ADaM) datasets produced for the main clinical study report (CSR) in 2020. For the eGOS-I dataset, 4 missing values for time to infusion were imputed in collaboration with the Sponsor based on calculation from related variables. Four eGOS-I values were missing at 3 months; the respective patients were excluded from analyses of this variable.

A corrected value for time to admission to study centre (for 1 patient, the date for admission to study centre had been incorrectly captured in the CRF). This value was changed via hard coding following authorisation of a post-lock database change by the Sponsor.

Consistent with the rounding applied for the main CSR, the variables "time from injury to admission [hours]" and "time from injury to infusion [hours] were rounded to 1 decimal place (i.e. 6-minute intervals). Sensitivity analyses based on the exact times for both variables yielded consistent results; specifically, patient allocation to the subgroups defined by time to infusion (≤12 h, >12 h) was not affected. Thus, rounding had no impact on the post hoc analyses of eGOS-I.

An interim analysis with possible sample size increase had been planned and conducted for the study; the resulting 2 study stages were not considered in the post hoc analyses. All statistical analyses were done using SAS Version 9.4 (SAS Institute Inc., Cary, NC, USA).

Results

Demographics

Between August 2017 and December 2020, a total of 1940 patients were screened for eligibility. Of these patients, 228 were randomized and assigned to receive Ronopterin (115) or placebo (113). Major reasons for exclusion were age of the patients, no informed consent and early allocation to craniectomy. Four randomized patients did not receive treatment because of withdrawal of consent and because the IMP could not be prepared in time. In total, 224 (98.2%) patients received treatment and were considered part of the Safety Analysis Set. One patient was lost to follow-up. Thus, 223 (97.8%) patients were part of the Full Analysis Set and 208 (91.2%) patients were considered part of the Per Protocol Set.

The majority of patients were male (180 [80.4%] patients) and caucasian (211 [94.2%] patients). The mean age was 39.3 years (SD+/−13.2) the mean body mass index was 25.5 kg/m$^2$ (SD+/−3.9).

The demographic parameters (age, body weight) and baseline characteristics (injury severity, prognostic factor, time from injury to randomisation) were well balanced between the two treatment arms, indicating the populations were comparable at baseline.

Efficacy Results:

No difference was seen between the Ronopterin and placebo groups for overall eGOS-I rating at 6 months (using the ordinal logistic regression inverse-normal approach) and, therefore, the primary efficacy endpoint was not met.

A difference was seen when comparing age groups in the entire patient population independent of treatment (age ≥40 group vs. age <40 group) with an odds ratio of 0.270 (95% CI: 0.134, 0.547; p<0.001), indicating a difference in recovery in favour of patients aged <40 years of age.

Patient overall eGOS-I rating at 6 months was controlled for country and centre, country, age and additional covariates. Differences between Ronopterin and placebo were seen in some centres, however, caution must be taken when interpreting the results, due to the low patient numbers in each centre. No difference was seen when controlling by country, however, a marginal effect in favour of Ronopterin was seen for France (odds-ratio: 3.640 [95% CI: 0.979, 13.535]; p=0.054). No difference was seen when controlling for age as a continuous variable.

Based on the time-dependent activation of pathologic cascades during the early phase after TBI and the benefits observed with an infusion of VAS203 during the initial 12 hours after TBI in the Phase IIa trial [Stover], a post-hoc-analysis was performed to determine whether patients in whom VAS203 was infused ≤12 hours after TBI, show better clinical improvement compared to patients in whom infusion was started >12 hours after TBI.

In patients with time to infusion ≤12 hours, eGOS was higher by 1 eGOS level in the Ronopterin compared to placebo treated patients (median 6 vs 5; not significant); in patients with time to infusion >12 hours, eGOS was similar in both treatment groups at 6 months (median 5 vs 5).

In patients with time to infusion <12 hours, the proportion of patients with Good Recovery (eGOS 7 and 8) was higher in the Ronopterin compared to placebo treated patients (37 vs 23%; ns; NNT=8). In the Ronopterin-treated group the proportion of patients with a Good Recovery at 6 months was increased by 61% compared to the Placebo group. In patients with time to infusion >12 hours, the proportion of patients with Good Recovery was similar in both treatment groups at 6 months (25 vs 28%). In the patients aged 18-39 years, early infusion of Ronopterin ≤12 hours was associated with a higher proportion of patients with Good Recovery (45% vs 32%); in the patients aged 40-60 years, early infusion of Ronopterin showed a higher proportion of patients with Good Recovery (27% vs 8%). With late infusion of Ronopterin >12 hours, the proportion of patients with Good Recovery was similar compared to the Placebo-treated patients (18-39 years: 30% vs 38%; 40-60 years: 20% vs 19%).

Measurement of Extracellular Cerebral Levels of Glutamate and Lactate

With reference to FIG. 3 to FIG. 9 the results of the measurement of extracellular cerebral level of glutamate and lactate present study are as follows.

FIG. 3A shows the extracellular brain glutamate levels of a 59 year old male patient who was diagnosed with traumatic brain injury after starting administration of Ronopterin by infusion of a total daily dose of 17 mg/kg body weight over 48 hours. The extracellular brain glutamate levels were measured by microdialysis. FIG. 3A shows the glutamate levels measured over a period of 108 hours after the start of the administration of Ronopterin.

FIG. 3B shows the extracellular brain lactate levels of the same patient after start of the Ronopterin infusion. The extracellular brain lactate levels were also measured by microdialysis. FIG. 3B shows the lactate levels measured over the same period of 108 hours after the start of the Ronopterin administration.

Figures 4, 4A, 4B:
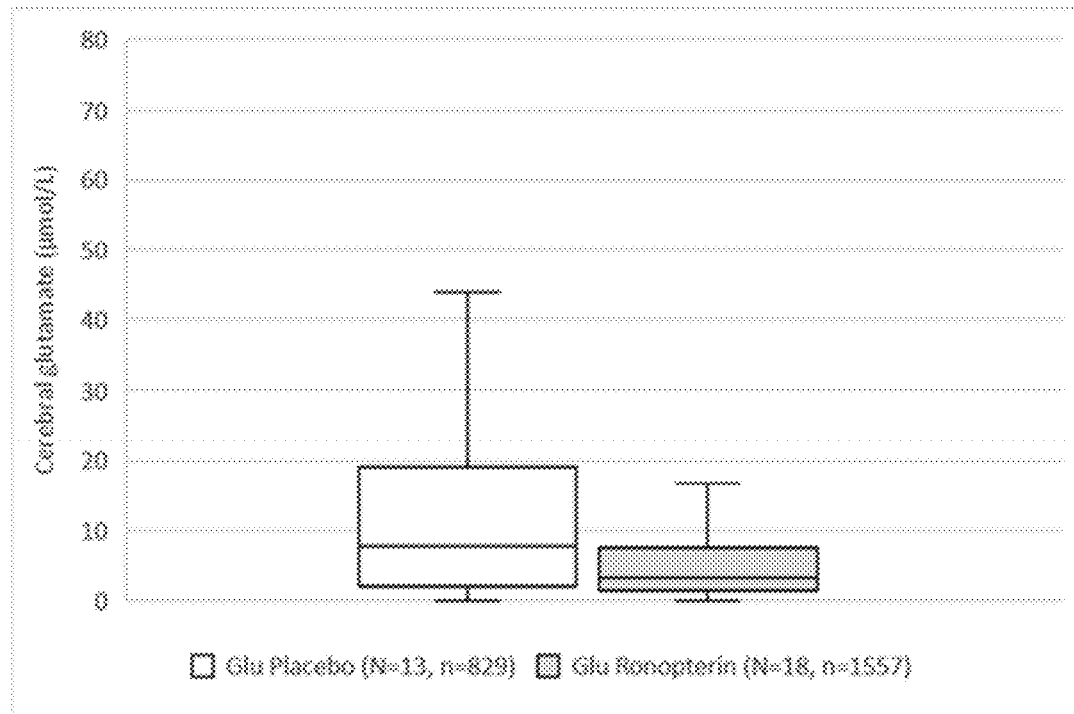
FIG. 4 shows the age-dependent effects of the Ronopterin administration (infusion) on the glutamate levels for TBI patients of an age of either 18-39 years or 40-60 years with all times to infusion, i.e. both early infusion (infusion within a time of 6 to ≤12 hours after occurrence of trauma) and late infusion (infusion within >12 to 18 hours after occurrence of the trauma) as defined herein. The total daily dose of 17 mg/kg body weight was infused over 48 hours.
FIG. 4A shows the number of patients aged 18-39 years who were treated with Ronopterin or placebo.
FIG. 4B shows the extracellular cerebral glutamate levels (μmol/l) of patients aged 18 to 39 years after administration of Ronopterin (18 patients, 1557 individual measurements taken in a time of up 108 hours after administration) compared to the placebo group (13 patients, 829 individual measurements). The brain glutamate levels were determined by microdialysis as described herein. As evident from FIG. 4B, the patients receiving Ronopterin show significantly lower brain glutamate levels, with all patients having a glutamate level of <10 μmol/L, i.e. a physiologically "normal" glutamate level.

FIG. 4 shows the age-dependent effects of the Ronopterin administration (infusion) on the glutamate levels for TBI patients of an age of either 18-39 years or 40-60 years with all times to infusion, i.e. both early infusion (infusion within a time of 6 to ≤12 hours after occurrence of trauma) and late infusion (infusion within >12 to 18 hours after occurrence of the trauma) as defined herein. The total daily dose of 17 mg/kg body weight was infused over 48 hours.

FIG. 4A shows the number of patients aged 18-39 years who were treated with Ronopterin or placebo.

FIG. 4B shows the extracellular cerebral glutamate levels (μmol/l) of patients aged 18 to 39 years after administration of Ronopterin (18 patients, 1557 individual measurements taken in a time of up 108 hours after administration) compared to the placebo group (13 patients, 829 individual measurements). The brain glutamate levels were determined by microdialysis as described herein. As evident from FIG. 4B, the patients receiving Ronopterin show significantly lower brain glutamate levels, with all patients having a glutamate level of <10 μmol/L, i.e. a physiologically "normal" glutamate level.

Figures 4C, 4D:
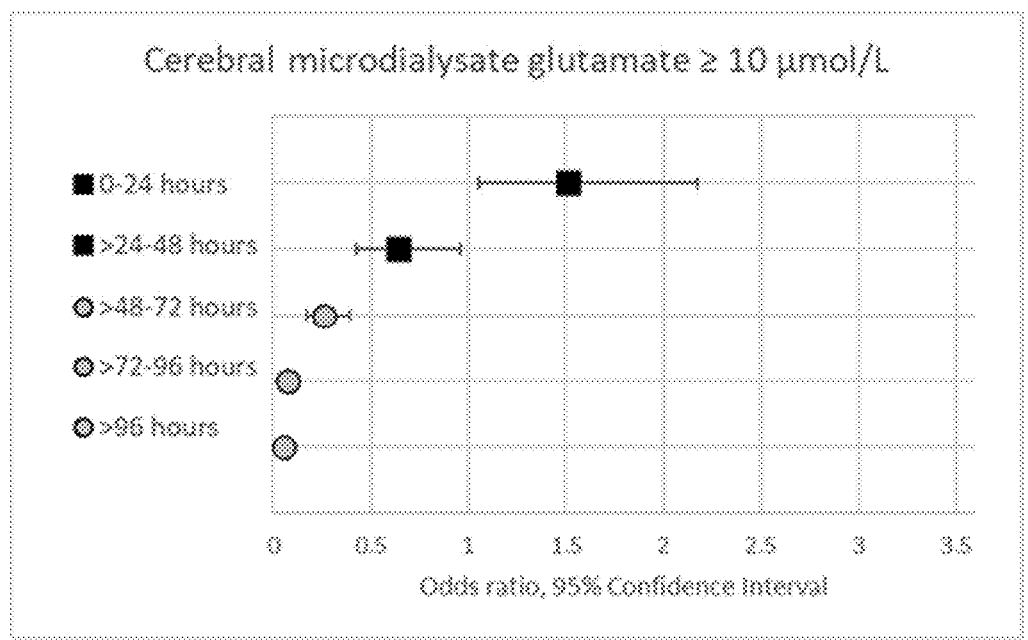
FIG. 4C shows the glutamate level of this patient group over the course of administration of Ronopterin expressed in terms of the odds ratio of patients having an extracellular brain glutamate level ≥10 μmol/L (exceeding 10 μmol). In brain microdialysis, glutamate levels exceeding 10 μmol/L are considered elevated and pathologically high glutamate (see in this respect Chamoun et al, "Role of extracellular glutamate measured by cerebral microdialysis in severe traumatic brain injury" J Neurosurg. 2010 September; 113 (3): 564-570, reporting a clear trend of a higher mortality rate among TBI patients with an average brain glutamate level >20 μmol/L compared with patients having a brain glutamate level ≤20 μmol/L) and compared to patients with brain glutamate levels between 10 and 20 μmol/L. Addressing in this context the odds ratio, generally speaking, the odds ratio is a measure of the strength of association with an exposure and an outcome. An OR>1 means greater odds of association with the exposure and outcome. An OR=1 means there is no association between exposure and outcome. In the present context of comparing two groups such a first group of patients that are being treated with Ronopterin and a second group of patients that are being treated with a placebo, an odds ratio of 1 means that there no difference between the odds in both groups, while an odds ratio of >1 means that the odds of the first group are higher and an odds ratio of <1 means, that the odds of the first group are lower. In the present context of determining the odds ratio for patients having a brain glutamate level of ≥10 µmol/L (i.e. elevated, pathologically high) over the course of time after administration means the following. An odds ratio of >1 means that the odds (probability) are higher in the patient group receiving Ronopterin that the brain glutamate level is ≥10 µmol/L, while an odds ratio of <1 means that the odds of the patients receiving Ronopterin of having a brain glutamate level of ≥10 µmol/L is lower. Or put differently, an odds ratio of 0 (zero) means that all patients in the group will have a brain glutamate level of <10 µmol/L, i.e. a physiologically normal glutamate level.
FIG. 4D shows the number of patients aged 40-60 years who were treated with Ronopterin or placebo.

FIG. 4C shows the glutamate level of this patient group over the course of administration of Ronopterin expressed in terms of the odds ratio of patients having an extracellular brain glutamate level ≥10 μmol/L (exceeding 10 μmol). In brain microdialysis, glutamate levels exceeding 10 μmol/L are considered elevated and pathologically high glutamate (see in this respect Chamoun et al, "Role of extracellular glutamate measured by cerebral microdialysis in severe traumatic brain injury" J Neurosurg. 2010 September; 113 (3): 564-570, reporting a clear trend of a higher mortality rate among TBI patients with an average brain glutamate level >20 μmol/L compared with patients having a brain glutamate level ≤20 μmol/L) and compared to patients with brain glutamate levels between 10 and 20 μmol/L. Addressing in this context the odds ratio, generally speaking, the odds ratio is a measure of the strength of association with an exposure and an outcome. An OR >1 means greater odds of association with the exposure and outcome. An OR=1 means there is no association between exposure and outcome. In the present context of comparing two groups such a first group of patients that are being treated with Ronopterin and a second group of patients that are being treated with a placebo, an odds ratio of 1 means that there no difference between the odds in both groups, while an odds ratio of >1 means that the odds of the first group are higher and an odds ratio of <1 means, that the odds of the first group are lower. In the present context of determining the odds ratio for patients having a brain glutamate level of ≥10 μmol/L (i.e. elevated, pathologically high) over the course of time after administration means the following. An odds ratio of >1 means that the odds (probability) are higher in the patient group receiving Ronopterin that the brain glutamate level is ≥10 μmol/L, while an odds ratio of <1 means that the odds of the patients receiving Ronopterin of having a brain glutamate level of ≥10 μmol/L is lower. Or put differently, an odds ratio of 0 (zero) means that all patients in the group will have a brain glutamate level of <10 μmol/L, i.e. a physiologically normal glutamate level. FIG. 4C shows that the odds ratio decreases to about 0.6 after 24 to 48 hours of administration of Ronopterin and approaches 0 (zero) 72 hours after administration of Ronopterin. Thus, it can be taken from FIG. 4C that the brain glutamate level will reach a physiologically normal level of less than 10 μmol/L in all TBI patients of age 18 to 39 years who receive Ronopterin. This result unambiguously demonstrates the efficacy of Ronopterin to lower elevated (pathologically high) glutamate levels in patients suffering from a disease or condition that is associated with an increased glutamate level.

FIG. 4D shows the number of patients aged 40-60 years who were treated with Ronopterin or placebo.

Figure 4E:
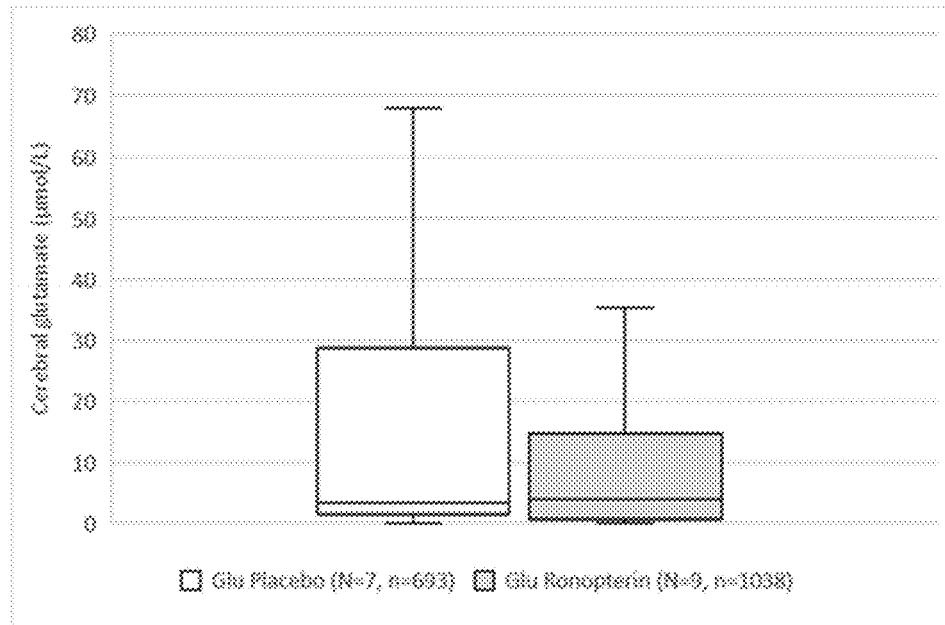
FIG. 4E shows the extracellular cerebral glutamate levels (µmol/L) of patients aged 40 to 60 years old after administration of Ronopterin (9 patients, 1083 individual measurements taken in a time of up 108 hours after administration) compared to the placebo group (7 patients, 693 individual measurements). The brain glutamate levels were determined by microdialysis as described herein. As evident from FIG. 4E, the patients receiving Ronopterin show significantly lower brain glutamate levels, with the majority of patients reaching a glutamate level of <10 µmol/L, i.e. a physiologically "normal" glutamate level than the placebo group.

FIG. 4E shows the extracellular cerebral glutamate levels (μmol/L) of patients aged 40 to 60 years old after administration of Ronopterin (9 patients, 1083 individual measurements taken in a time of up 108 hours after administration) compared to the placebo group (7 patients, 693 individual measurements). The brain glutamate levels were determined by microdialysis as described herein. As evident from FIG. 4E, the patients receiving Ronopterin show significantly lower brain glutamate levels, with the majority of patients reaching a glutamate level of <10 μmol/L, i.e. a physiologically "normal" glutamate level than the placebo group.

Figure 4F:
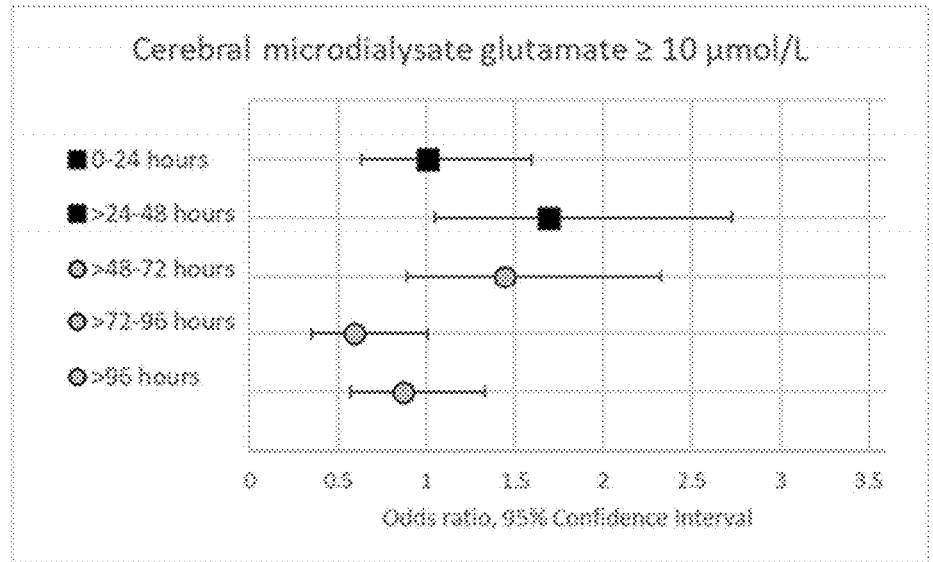
FIG. 4F shows the glutamate level of this patient group (age 40-60 years) over the course of administration of Ronopterin expressed in terms of the odds ratio of patients having an extracellular brain glutamate level ≥10 µmol/L (exceeding 10 µmol).

FIG. 4F shows the glutamate level of this patient group (age 40-60 years) over the course of administration of Ronopterin expressed in terms of the odds ratio of patients having an extracellular brain glutamate level ≥10 μmol/L (exceeding 10 μmol). FIG. 4F shows that the odds ratio decreases to below 1.0 after 72 hours of administration of Ronopterin. However, compared to the group of patients of an age of 18-39 years, the decrease in brain glutamate levels to a physiologically normal level of less than 10 μmol/L in less pronounced in TBI patients of an age of 40 to 60 years, or expressed differently, Ronopterin provides a stronger reduction in brain microdialysate glutamate levels in patients aged 18-39 vs. patients aged 40-60 years.

FIG. 5 shows the results of the brain glutamate levels in the patient group of 18-39 years, depending on the time to infusion, i.e. infusion within 12 hours (early infusion) or after more than 12 hours (late infusion) after occurrence of traumatic brain injury.

FIG. 5A shows the number of patients aged 18-39 years who were treated either with Ronopterin or placebo.

FIG. 5B shows the extracellular cerebral glutamate levels (μmol/l) of patients aged 18 to 39 years who were administered with Ronopterin within a time of ≤12 after occurrence of trauma brain injury (9 patients, 927 individual measurements taken in a time of up 108 hours after administration) compared to the placebo group (4 patients, 380 individual measurements). The brain glutamate levels were determined by microdialysis as described herein. As evident from FIG. 5B, the patients receiving Ronopterin within a time of ≤12 after occurrence of trauma brain injury show significantly lower brain glutamate levels, with all patients having a glutamate level of <10 μmol/L, i.e. a physiologically "normal" glutamate level.

FIG. 5C shows the glutamate level of this patient group over the course of administration of Ronopterin expressed in terms of the odds ratio of patients having an extracellular brain glutamate level ≥10 μmol/L (exceeding 10 μmol). FIG. 5C shows that the odds ratio decreases to less than 0.5 after only 24 hours of administration of Ronopterin and reaches essentially 0 (zero) 48 hours after administration of Ronopterin. Thus, it can be taken from FIG. 5C that the brain glutamate level will reach a physiologically normal level of less than 10 μmol/L in all TBI patients of age 18 to 39 years who receive Ronopterin within a time of ≤12 hours after occurrence of trauma brain injury. Also this result demonstrates the efficacy of Ronopterin to lower elevated (pathologically high) glutamate levels in patients suffering from a disease or condition that is associated with an increased glutamate level.

FIG. 5D shows the number of patients aged 18-39 years who were treated (infused) with Ronopterin or placebo within a time of >12 hours after occurrence of trauma brain injury. FIG. 5E shows the extracellular cerebral glutamate levels (μmol/l) of this patient group after administration of Ronopterin within a time of >12 hours after occurrence of trauma brain injury (9 patients, 630 individual measurements taken in a time of up 108 hours after administration) compared to the placebo group (9 patients, 449 individual measurements). The brain glutamate levels were determined by microdialysis as described herein. As evident from FIG. 5E, patients receiving Ronopterin show essentially the same lower brain glutamate levels with the majority of patients reaching a glutamate level of <10 μmol/L, i.e. a physiologically "normal" glutamate level as the placebo group.

Figure 5F:
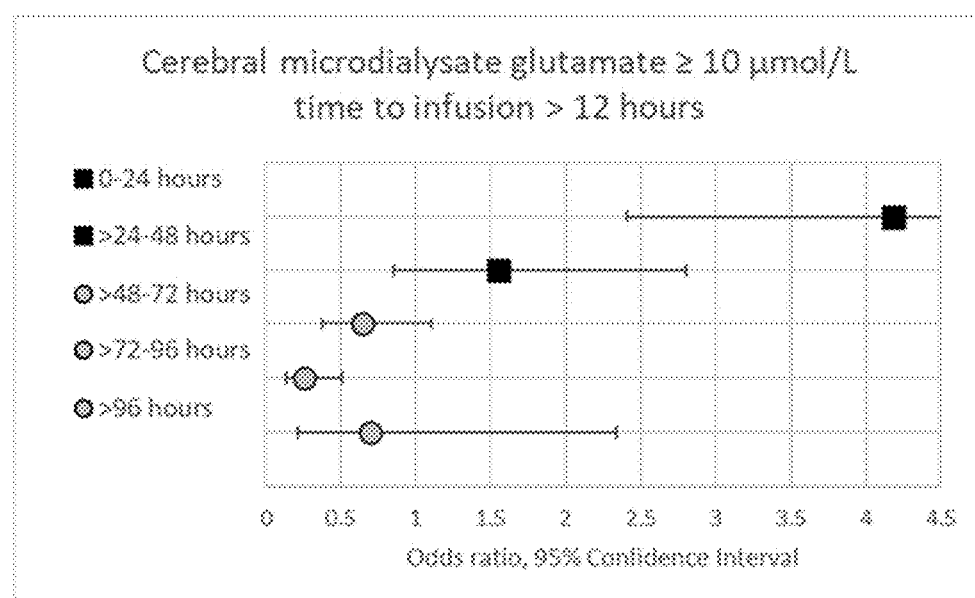
FIG. 5F shows the glutamate level of this patient group (age 18-39 years) over the course of administration of Ronopterin expressed in terms of the odds ratio of patients having an extracellular brain glutamate level ≥10 µmol/L (exceeding 10 µmol).

FIG. 5F shows the glutamate level of this patient group (age 18-39 years) over the course of administration of Ronopterin expressed in terms of the odds ratio of patients having an extracellular brain glutamate level ≥10 μmol/L (exceeding 10 μmol). FIG. 5F shows that the odds ratio decreases to below 1.0 48 hours after administration of Ronopterin. However, compared to the group of patients of an age of 18-39 years receiving early infusion, the decrease in brain glutamate levels to a physiologically normal level of less than 10 μmol/L in less pronounced in TBI patients aged 18 to 39 years receiving late infusion. Or expressed differently, Ronopterin provides a stronger reduction in brain microdialysate glutamate levels in patients aged 18 to 39 years with early infusion.

FIG. 6 shows the results of the brain glutamate levels in the patient group of 40-60 years, depending on the time to infusion within 12 hours (early infusion) or after more than 12 hours (late infusion) after occurrence of traumatic brain injury.

FIG. 6A shows the extracellular cerebral glutamate levels (μmol/L) of patients aged 40 to 60 years who were administered with Ronopterin within a time of ≤12 after occurrence of trauma brain injury (3 patients, 423 individual measurements taken in a time of up 108 hours after administration). There was no placebo group for this patient group. As evident from FIG. 6A, the patients receiving Ronopterin within a time of ≤12 after occurrence of trauma brain injury show partially lowered brain glutamate levels, with not all patients reaching a glutamate level of <10 μmol/L.

FIG. 6B shows the extracellular cerebral glutamate levels (μmol/L) of patients aged 40 to 60 years who were administered with Ronopterin within a time of >12 hours after occurrence of trauma brain injury (6 patients, 615 individual measurements taken in a time of up 108 hours after administration) compared to the placebo group (7 patients, 693 individual measurements). As evident from FIG. 6B, the patients receiving Ronopterin within a time of >12 hours after occurrence of trauma brain injury show significantly lowered brain glutamate levels, with the majority of the patients reaching a glutamate level of <10 µmol/L.

FIG. 6C shows the glutamate level of this patient group over the course of administration of Ronopterin expressed in terms of the odds ratio of patients having an extracellular brain glutamate level ≥10 µmol/L (exceeding 10 µmol). FIG. 6C shows that the odds ratio decreases to about 0.7 after 72 hours of administration of Ronopterin and reaches a value of about 0.2 96 hours after administration of Ronopterin. Thus, it can be taken from FIG. 6C that the brain glutamate level will reach a physiologically normal level of less than 10 µmol/L in most TBI patients of age 40 to 60 years who receive Ronopterin within a time of >12 hours (late infusion) after occurrence of trauma brain injury. Also this result demonstrates the efficacy of Ronopterin to lower elevated (pathologically high) glutamate levels in patients suffering from a disease or condition that is associated with an increased glutamate level.

FIG. 7 shows the age-dependent effects of the Ronopterin administration (infusion) on the brain lactate levels for TBI patients of an age of either 18-39 years or 40-60 years with all times to infusion, i.e. for both early infusion (infusion within a time of 6 to ≤12 hours after occurrence of trauma) and late infusion (infusion within >12 to 18 hours after occurrence of the trauma).

FIG. 7A shows the extracellular cerebral lactate levels (millimol/L) of patients aged 18 to 39 years after administration of Ronopterin (23 patients, 2124 individual measurements taken in a time of up 108 hours after administration) compared to the placebo group (18 patients, 1458 individual measurements). The brain lactate levels were determined by microdialysis as described herein. In brain microdialysis and blood, lactate levels exceeding 2.5 millimol/L are considered pathologically elevated. As evident from FIG. 7A, the patients receiving Ronopterin show lower brain lactate levels compared to the placebo group, with patients reaching lactate levels of <2.5 millimol/L, i.e. a physiologically "normal" lactate levels.

FIG. 7B shows the lactate level of this patient group (age 18-39 years) over the course of administration of Ronopterin expressed in terms of the odds ratio of patients having an extracellular brain lactate level ≥2.5 millimol/L (exceeding 2.5 millimol/L). FIG. 7B shows that the odds ratio remains at about 1.0 for the first 48 hours after administration of Ronopterin and then continuously decreases to about 0.22 within 96 hours after Ronopterin administration. As explained herein, as increased extracellular glutamate and lactate levels reflect the extent of underlying tissue injury, a decrease in both glutamate and lactate levels upon administration of Ronopterin indicates the protective activity of Ronopterin against the effects of glutamate excitotoxicity, also known as "glutamate storm". Thus, FIG. 7B shows the ability of Ronopterin to provide protective activity against the effects of glutamate excitotoxicity.

Figure 7C:
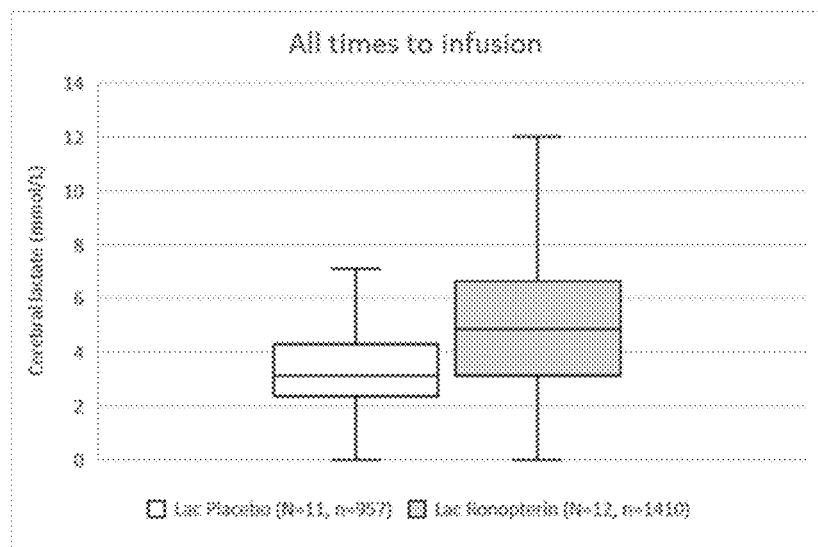
FIG. 7C shows the extracellular cerebral lactate levels (millimol/l) of patients aged 40 to 60 years after administration of Ronopterin (12 patients, 1410 individual measurements taken in a time of up 120 hours after administration) compared to the placebo group (11 patients, 957 individual measurements). As evident from FIG. 7C, the patients receiving Ronopterin show higher brain lactate levels compared to the placebo group, with all patients having lactate levels of ≥2.5 millimol/L.

FIG. 7C shows the extracellular cerebral lactate levels (millimol/L) of patients aged 40 to 60 years after administration of Ronopterin (12 patients, 1410 individual measurements taken in a time of up 120 hours after administration) compared to the placebo group (11 patients, 957 individual measurements). As evident from FIG. 7C, the patients receiving Ronopterin show higher brain lactate levels compared to the placebo group, with all patients having lactate levels of ≥2.5 millimol/L.

Figure 7D:
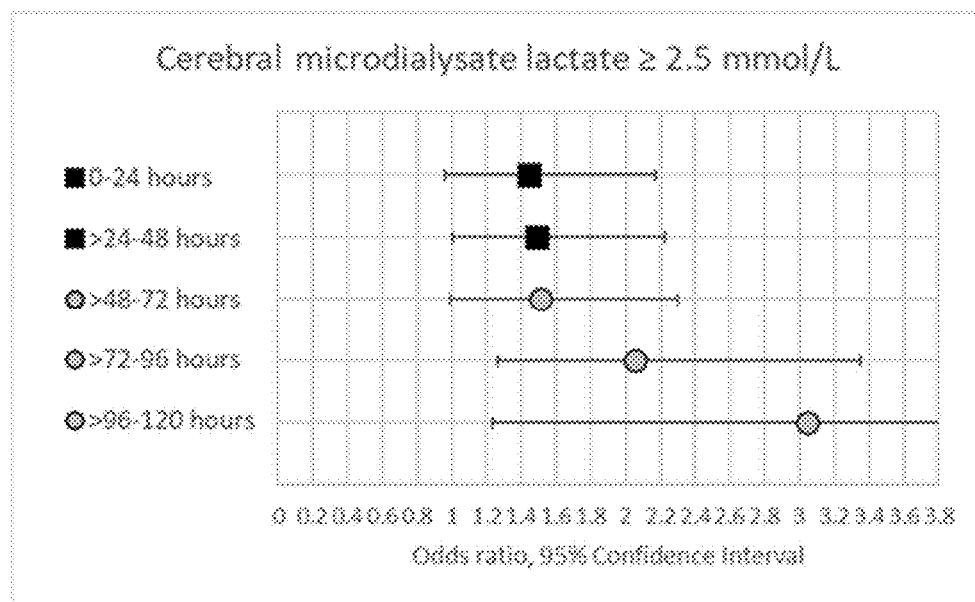
FIG. 7D shows the lactate level of this patient group (age 40-60 years) over the course of administration of Ronopterin expressed in terms of the odds ratio of patients having an extracellular brain lactate level ≥2.5 millimol/L (exceeding 2.5 millimol/L).

FIG. 7D shows the lactate level of this patient group (age 40-60 years) over the course of administration of Ronopterin expressed in terms of the odds ratio of patients having an extracellular brain lactate level ≥2.5 millimol/L (exceeding 2.5 millimol/L). FIG. 7D shows that the odds ratio remains over 1.0 for the entire time period after administration of Ronopterin and even continuously increases over the course of the time. Thus, the results of FIG. 7 show that a stronger reduction in brain microdialysate lactate occurs in patients of 18-39 years compared to patients of 40-60 years.

FIG. 8 shows the results of the brain lactate levels in the patient group of 18-39 years, depending on the time to infusion, i.e. infusion within 12 hours (early infusion) or after more than 12 hours (late infusion) after occurrence of traumatic brain injury.

FIG. 8A shows the extracellular cerebral lactate levels (millimol/L) of patients aged 18 to 39 years who were administered with Ronopterin within a time of ≤12 hours after occurrence of trauma brain injury (10 patients, 948 individual measurements taken in a time of up 120 hours after administration) compared to the placebo group (4 patients, 427 individual measurements). The brain lactate levels were determined by microdialysis as described herein. As evident from FIG. 8A, the patients receiving Ronopterin within a time of ≤12 after occurrence of trauma brain injury showed lower brain lactate levels than the placebo group, with a number of patients having a brain lactate level of <2.5 millimol/L, i.e. a physiologically "normal" lactate level.

Figure 8C:
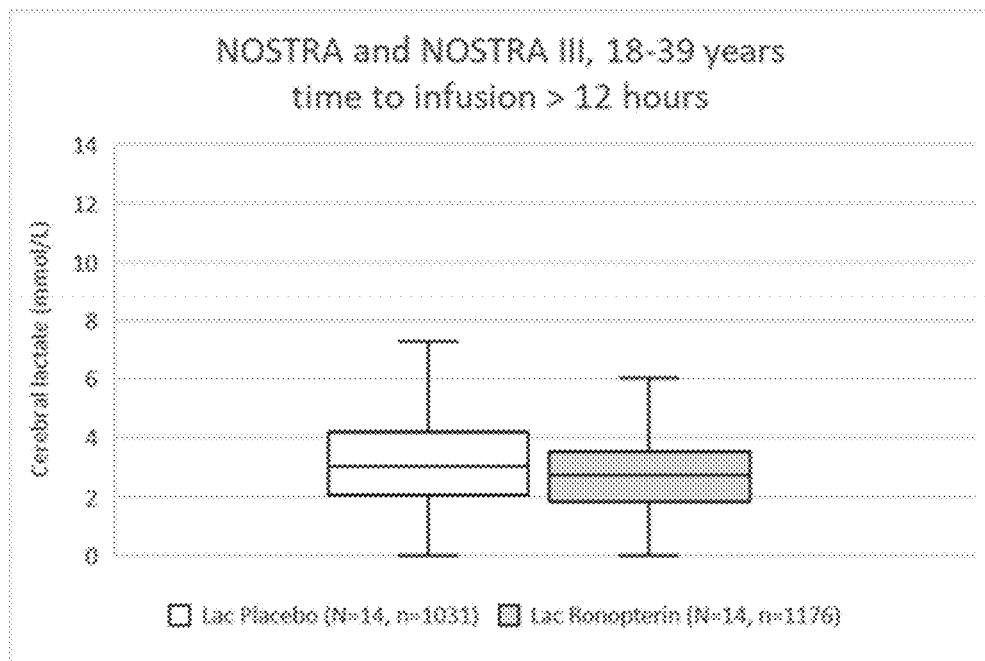
FIG. 8C shows the extracellular cerebral lactate levels (millimol/l) of patients aged 18 to 39 years who were administered with Ronopterin within a time of >12 hours after occurrence of trauma brain injury (14 patients, 1176 individual measurements taken in a time of up 120 hours after administration) compared to the placebo group (14 patients, 1031 individual measurements). The brain lactate levels were determined by microdialysis as described herein. As evident from FIG. 8C, the patients receiving Ronopterin within a time of ≤12 after occurrence of trauma brain injury showed lower brain lactate levels than the placebo group, with a number of patients having a brain lactate level of <2.5 millimol/L, i.e. a physiologically "normal" lactate level.

FIG. 8B shows the lactate level of this patient group (age 18-39 years) over the course of administration of Ronopterin expressed in terms of the odds ratio of patients having an extracellular brain lactate level ≥2.5 millimol/L (exceeding 2.5 millimol/L). FIG. 8B shows that the odds ratio was below 0.6 for the entire 120 hours after administration of Ronopterin and even decreased within this time period. Thus, FIG. 8B shows the ability of Ronopterin to provide protective activity against the effects of glutamate excitotoxicity. FIG. 8C shows the extracellular cerebral lactate levels (millimol/l) of patients aged 18 to 39 years who were administered with Ronopterin within a time of >12 hours after occurrence of trauma brain injury (14 patients, 1176 individual measurements taken in a time of up 120 hours after administration) compared to the placebo group (14 patients, 1031 individual measurements). The brain lactate levels were determined by microdialysis as described herein. As evident from FIG. 8C, the patients receiving Ronopterin within a time of ≤12 after occurrence of trauma brain injury showed lower brain lactate levels than the placebo group, with a number of patients having a brain lactate level of <2.5 millimol/L, i.e. a physiologically "normal" lactate level.

Figure 8D:
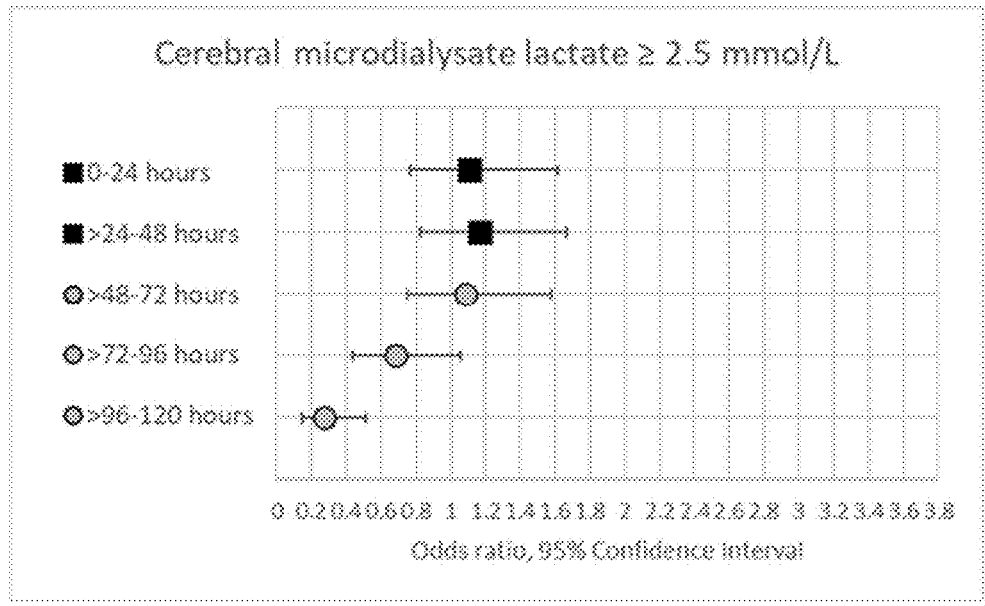
FIG. 8D shows the lactate level of this patient group (age 18-39 years) remained over the course of administration of Ronopterin expressed in terms of the odds ratio of patients having an extracellular brain lactate level ≥2.5 millimol/L (exceeding 2.5 μmol/L).

FIG. 8D shows the lactate level of this patient group (age 18-39 years) remained over the course of administration of Ronopterin expressed in terms of the odds ratio of patients having an extracellular brain lactate level ≥2.5 millimol/L (exceeding 2.5 µmol/L). FIG. 8D shows that the odds ratio remained above 1.0 for the first 72 hours after administration of Ronopterin and then decreased to an value of about 0.22 after 120 hours. Thus, while also FIG. 8D shows the ability of Ronopterin to provide protective activity against the effects of glutamate excitotoxicity for this patient group after late infusion, FIG. 8D also demonstrate that Ronopterin provides a stronger reduction in brain microdialysis lactate levels in patients 18-39 years with early infusion.

FIG. 9 shows the results of the brain lactate levels in the patient group of 39-60 years, depending on the time to infusion, i.e. infusion within 12 hours (early infusion) or after more than 12 hours (late infusion) after occurrence of traumatic brain injury.

FIG. 9A shows the extracellular cerebral lactate levels (millimol/l) of patients aged 40 to 60 years who were administered with Ronopterin within a time of ≤12 hours after occurrence of trauma brain injury (7 patients, 795 individual measurements taken in a time of up 120 hours after administration) compared to the placebo group (6 patients, 351 individual measurements). The brain lactate levels were determined by microdialysis as described herein. As evident from FIG. 9A, the patients receiving Ronopterin within a time of ≤12 after occurrence of trauma brain injury show higher brain lactate levels compared to the placebo group, with all patients having lactate levels of ≥2.5 millimol/L.

FIG. 9B shows the lactate level of this patient group (age 40-60 years) over the course of administration of Ronopterin expressed in terms of the odds ratio of patients having an extracellular brain lactate level ≥2.5 millimol/L (exceeding 2.5 millimol/L). FIG. 9B shows that the odds ratio remains over 1.0 for the entire time period after administration of Ronopterin and even continuously increases over the course of the time.

Figure 9C:
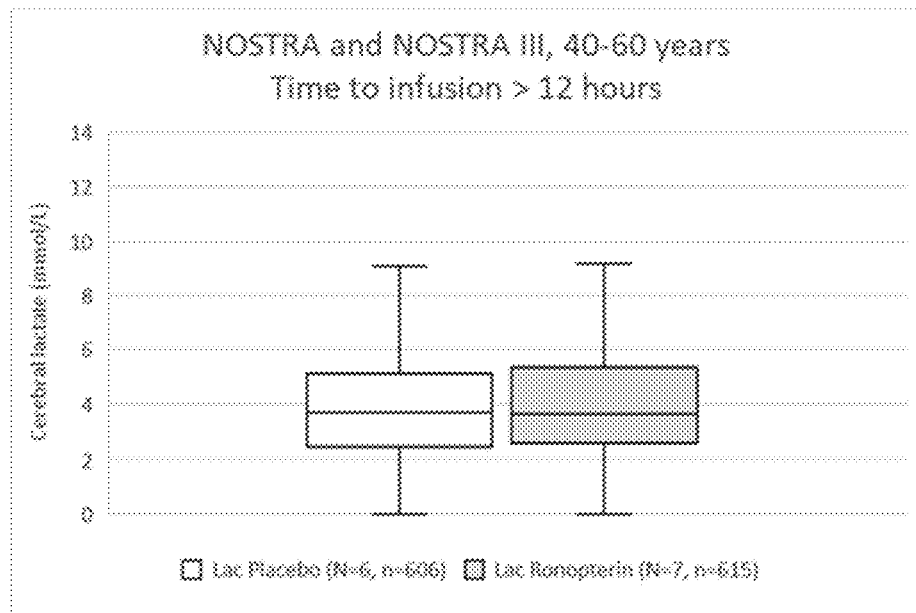
FIG. 9C shows the extracellular cerebral lactate levels (millimol/l) of patients aged 40 to 60 years after late administration of Ronopterin (7 patients, 615 individual measurements taken in a time of up 120 hours after administration) compared to the placebo group (6 patients, 606 individual measurements). As evident from FIG. 9C, the patients receiving Ronopterin show similar brain lactate levels compared to the placebo group, with several patients having lactate levels of ≥2.5 millimol/L.

FIG. 9C shows the extracellular cerebral lactate levels (millimol/l) of patients aged 40 to 60 years after late administration of Ronopterin (7 patients, 615 individual measurements taken in a time of up 120 hours after administration) compared to the placebo group (6 patients, 606 individual measurements). As evident from FIG. 9C, the patients receiving Ronopterin show similar brain lactate levels compared to the placebo group, with several patients having lactate levels of ≥2.5 millimol/L.

Figure 9D:
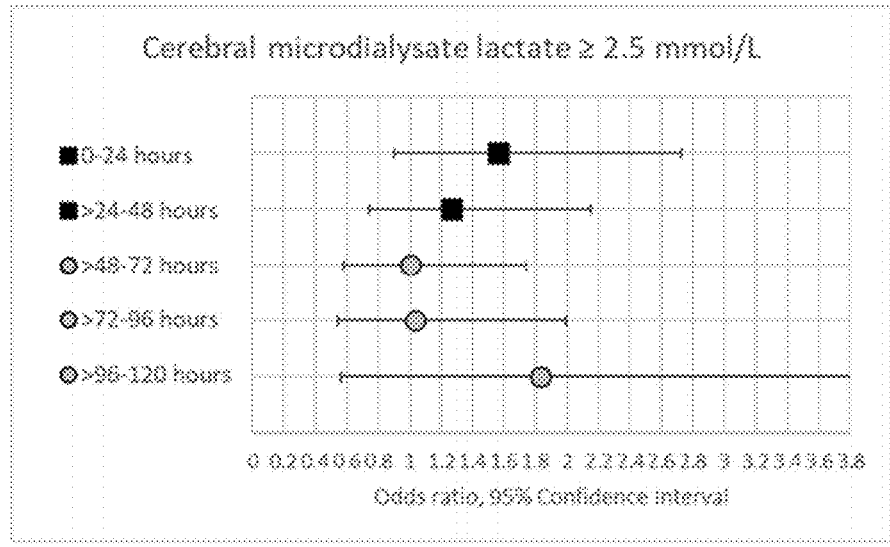
FIG. 9D shows the lactate level of this patient group (age 40-60 years) over the course of administration of Ronopterin expressed in terms of the odds ratio of patients having an extracellular brain lactate level ≥2.5 millimol/L (exceeding 2.5 millimol/L).

FIG. 9D shows the lactate level of this patient group (age 40-60 years) over the course of administration of Ronopterin expressed in terms of the odds ratio of patients having an extracellular brain lactate level ≥2.5 millimol/L (exceeding 2.5 millimol/L). FIG. 9D shows that the odds ratio decreased from about 1.6 to about 1.0 within 96 hours after administration of Ronopterin, before increasing again till the end of the observation period of 120 hours. Thus, the results of FIG. 9 show that a stronger increase in brain microdialysate lactate in patients of 40-60 years occurs with early infusion of Ronopterin.

Pharmacokinetic Results:

An exposure control was performed with samples collected after end of infusion and 12 hours after end of infusion. Due to the high sensibility of Ronopterin to oxidation, no utilisable values could be obtained for Ronopterin and, therefore, the first metabolite, 4-amino-dihydrobiopterin, was used as a surrogate. The mean absolute concentration for the first metabolite of Ronopterin was 1071 ng/mL at the end of the infusion and 476 ng/mL 12 hours later (56% elimination). The mean absolute value for the second Ronopterin metabolite was 52 ng/mL at the end of the infusion and 37 ng/mL 12 hours after end of infusion.

Safety and Tolerability Results:

Overall, the Ronopterin study treatment was well-tolerated and no significant new safety findings were seen in the study. A slightly higher number of adverse events (AEs) and serious adverse events (SAEs) were seen in the Ronopterin group compared to the placebo groups. However, the number of related AE/SAEs were low and comparable between the groups.

The observed SAEs/AEs were expected for the patient population.

An increased ICP or e.g., intracerebral haematoma are normally classified as an AE or SAE. However, after TBI this and other pathophysiological responses of the brain can typically be expected and, thus, were recommended not to be considered as AE or SAE. The apparent increase in ICP increased compared to placebo (27 [23.9%] patients vs. 13 [11.7%] patients) may be due to the over-reporting of some centres.

A higher number of renal AEs (11:3) and SAEs were observed in the Ronopterin group compared to the placebo groups; however, this was not unexpected for pharmacodynamics of Ronopterin and the population under study.

Figure 12:
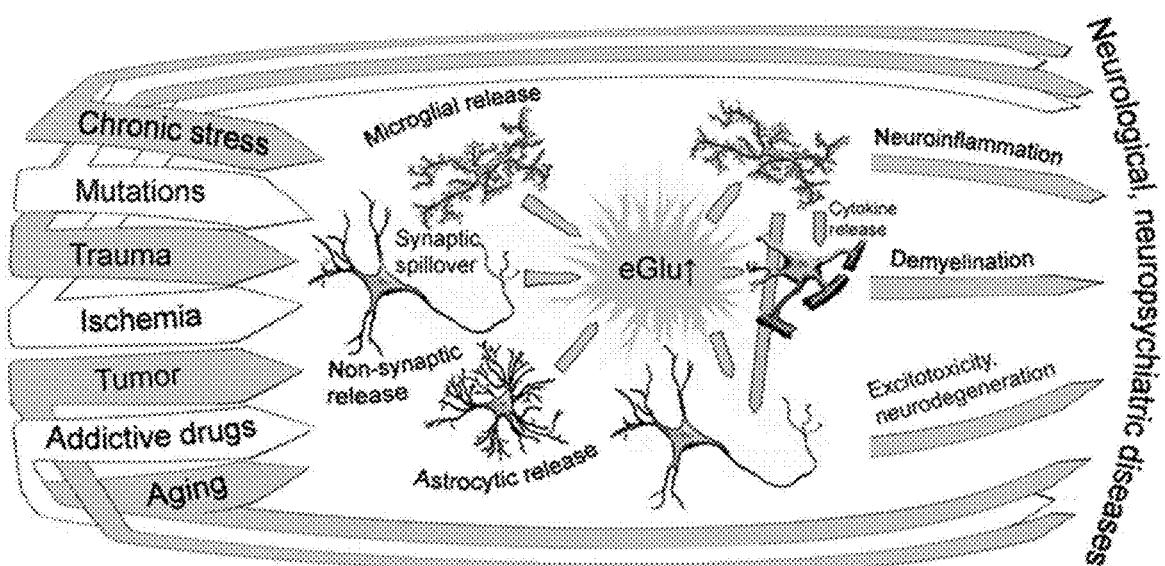
FIG. 12 is a schematic drawing taken from Pál, B. Involvement of extrasynaptic glutamate in physiological and pathophysiological changes of neuronal excitability. Cell. Mol. Life Sci. 2018; 75, 2917-29 showing that elevated extracellular glutamate is a common pathway in diseases or disorders of the central nervous system (CNS) such as chronic stress, trauma, ischemia, tumors, additive drugs or aging.

Example 5: In Vitro Reverse Microdialysis as a Model for Local Administration of Ronopterin Example 4 shows that Ronopterin passes the human blood brain barrier and is able, through inhibition of iNOS active in brain tissue to reduce increased extracellular brain glutamate levels in patients suffering from TBI to physiologically normal extracellular brain glutamate level <10 μmol/L. As explained herein (see FIG. 10), increased glutamate levels inter alia a) damage neurons, astrocytes, endothelial cells, leaky vessels, swelling, increased metabolism and oxygen consumption, impaired perfusion, leading ultimately cell death and b) excessive glutamate massively activates iNOS with NO-induced mitochondrial damage and glutamate release from neurons and astrocytes. As also explained herein (see FIG. 11) traumatic brain injury leads to up-regulation of iNOS which in turn leads to (further) release of glutamate, resulting in the drastically increased concentration of glutamate in the extracellular fluid. Finally, as explained here (see FIG. 12) elevated extracellular glutamate is a common pathway in diseases or disorders of the central nervous system (CNS) such as chronic stress, trauma, ischemia, tumors, additive drugs or aging. Notably, all these diseases also involve up-regulation of iNOS and increased brain glutamate levels as iNOS-derived radicals inhibit glutamate uptake transporters and cause cell damage with subsequent glutamate release from neurons and astrocytes.

Thus, in light of the above, it is clear that inhibition of iNOS by Ronopterin and the subsequent reduction of increased glutamate levels will also be effective in all those diseases which are all associated with increased either systemic or extracellular brain glutamate levels as part of a stereotypical response of the brain to any form of acute and chronic injury.

To further corroborate this view, reverse microdialysis as a model for local administration of Ronopterin was carried out as follows, using the methodology described in Zoerner et al, Peripheral endocannabinoid microdialysis: In vitro characterization and proof-of-concept in human subjects, Anal Bioanal Chem (2012) 402:2727-2735.

Ronopterin as the molecule of interest is dissolved in a perfusion fluid and delivered by means of microdialysis catheter and put into contract with an immersion fluid/matrix fluid, to allow Ronopterin to diffuse into the immersion fluid. The concentrations of Ronopterin (ABH4), its first metabolite (ABH2) and its second metabolite (AB) are then measured in the perfusion fluid, the immersion fluid and the microdialysate. This experiment was carried out using the following conditions.

Figure 13A:
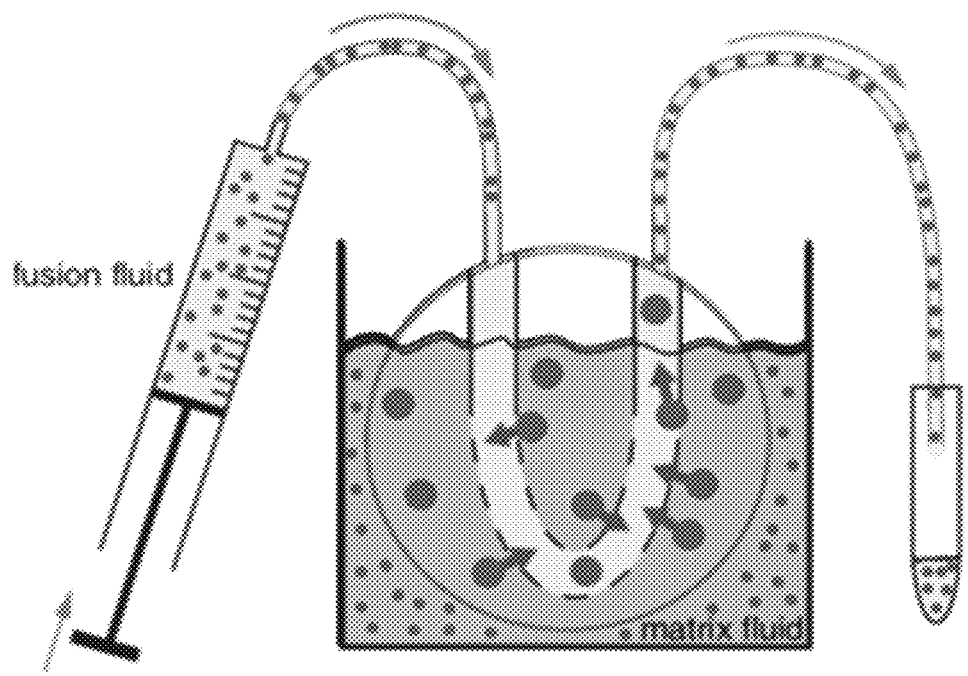
FIGS. 13A-D show the experimental setup and the results of the in vitro reverse microdialysis experiment described in Example 5 for local administration of Ronopterin.
Figure 13B:
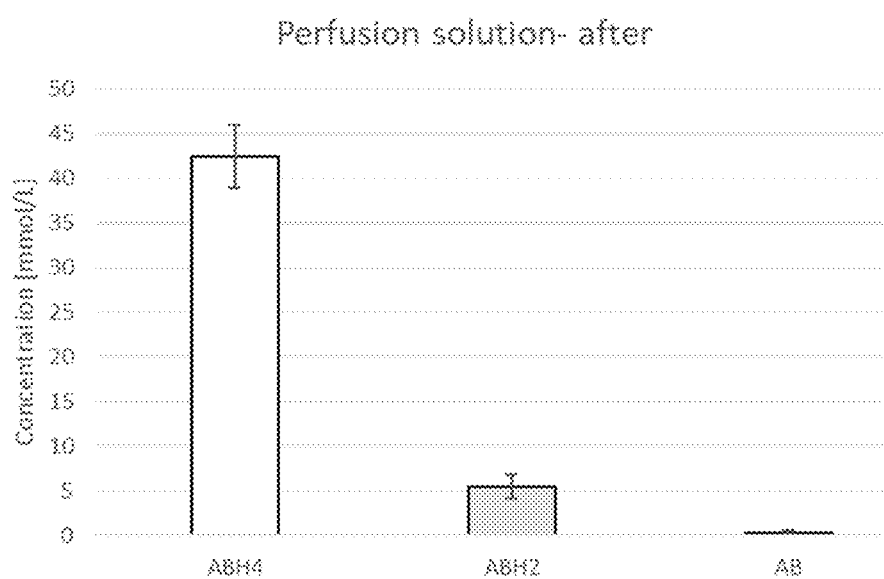
Figure 13C:
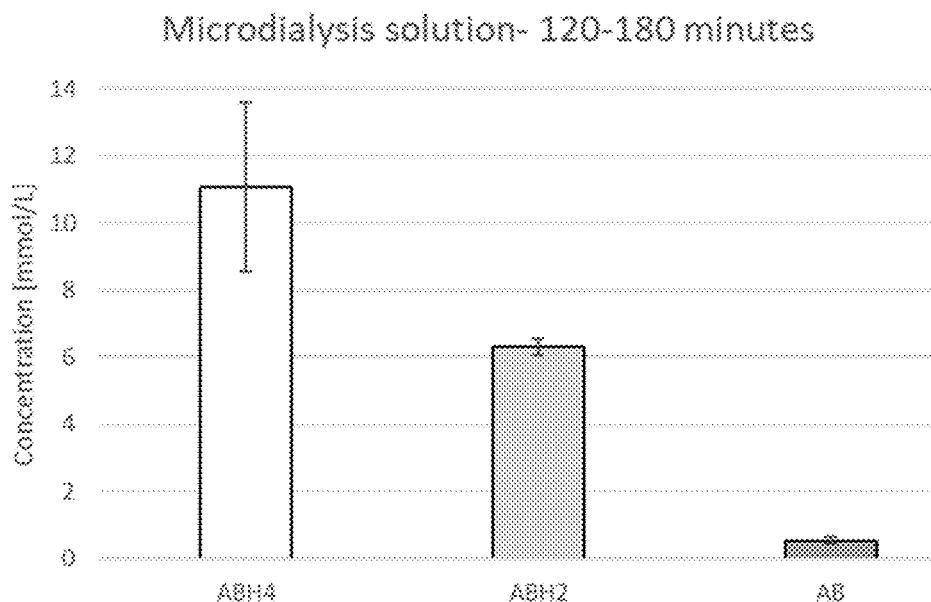
Figure 13D:
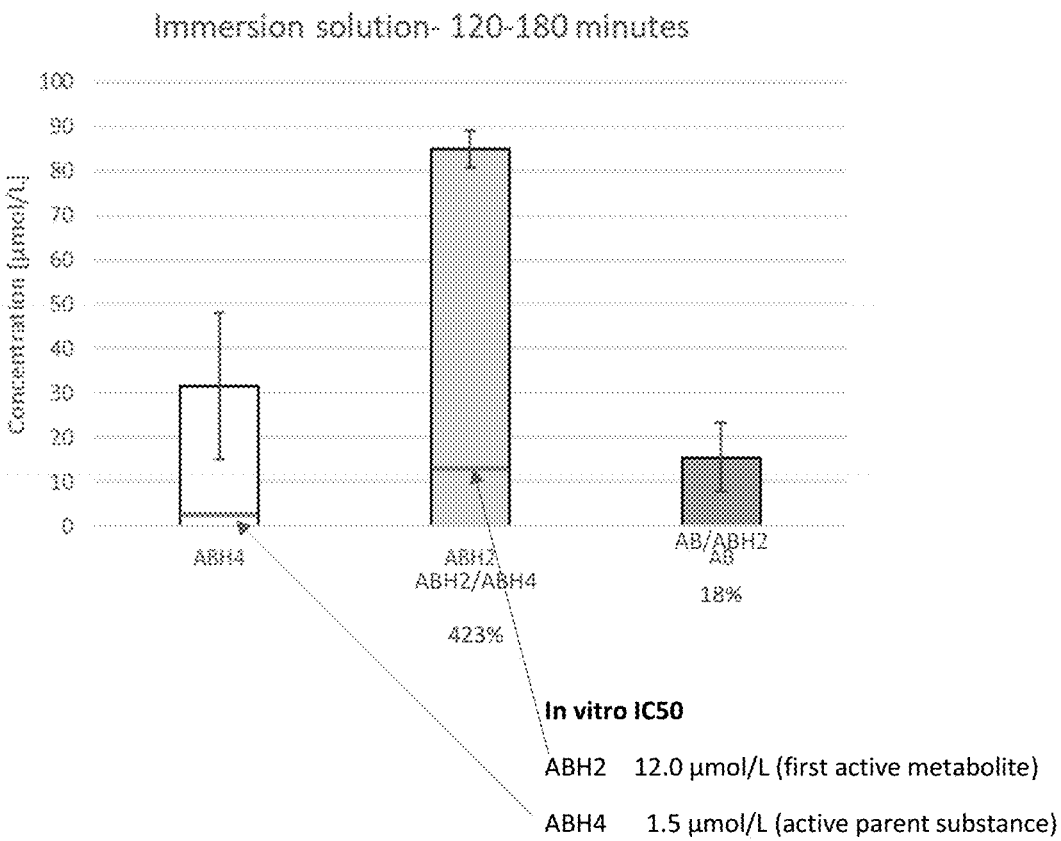

Perfusion Solution
 Ronopterin 20 mg/mL in NaCl 120 mmol/L, phosphate buffer 11 mmol/L
Immersion Solution
 Perfusion CNS fluid
 NaCl 147 mmol/L, KCl 2.7 mmol/L
 $CaCl_2$ 1.2 mmol/L, $MgCl_2$ 0.85 mmol/L
Microdialysis Catheter
 Mdialysis 70 catheter
 20 kDa cut-off, length 10 mm
Flow Rate
 1 μl/min
Duration
 180 minutes The results of this experiment are shown in FIG. 13B to FIG. 13D. As evident from FIG. 13B and FIG. 13C that show the concentrations (mmol/l) of Ronopterin (ABH4), its first metabolite (ABH2,) and the second metabolite of Ronopterin (AB) at the end of the experiment, Ronopterin can be found both in the perfusion solution and the microdialyste at the end (after 180 minutes) of the experiment. Notably, FIG. 13D shows that Ronopterin and its first metabolite (which both are inhibitors of iNOS and thus pharmaceutically active) are present in a concentration of more than 30 μmol/l and 80 μmol/l), respectively in the immersion solution. In FIG. 13D also the in vitro IC 50 values of Ronopterin and ABH2 are shown and included as a bar (highlighted by the respective arrow) in the column depicting the concentration of Ronopterin and ABH2 measured in the immersion solution. As evident from the FIG. 13D, the measured concentrations of Ronopterin and ABH2 are almost 30 times higher (Ronopterin) or about 4 times higher (ABH2) than the IC50 value of 1.5 μmol/L (Ronopterin) and 12.0 μmol/L (ABH2), respectively. This means that in this model the concentration of Ronopterin and ABH2 are so high that quantitative inhibition of iNOS would occur in the CNS fluid. This means that under these conditions, by inhibition of iNOS, also the glutamate levels would be decreased. Thus, this model shows that Ronopterin will be effective in reducing elevated glutamate levels when administered locally. This result and the fact that Ronopterin was able to pass the blood brain barrier and reduce elevated glutamate levels in human patients suffering from TBI fully support the assumption that Ronopterin is able to pass cellular membranes and thus will be effective in decreasing elevated glutamate levels in conditions and disorders that are associated with increased glutamate levels.

Example 6: Further Clinical Trials with Ronopterin

In light of the results of Examples 4 and 5 that show the efficacy of Ronopterin in reducing glutamate levels and thus the ability of Ronopterin to treat a disease condition or disorder that is associated with an increased glutamate level, the suitability of Ronopterin is planned to be further studied in further clinical trials that are outlined in the following.

6.1. Traumatic Brain Injury

| | |
|---|---|
| Title | Ronopterin reduces elevated brain glutamate levels in critically ill patients with moderate and severe traumatic brain injury |
| Background | Traumatic Brain Injury (TBI) is associated with increased brain glutamate levels.<br>Following TBI glutamate, the most abundant excitatory neurotransmitter, is a marker and mediator of underlying brain damage.<br> As a marker of brain tissue damage, brain glutamate levels are increased as a consequence of traumatic cell damage with excessive release from neurons and glia and inhibited uptake.<br> As a mediator of brain tissue damage, elevated brain glutamate levels excessively activate neurons and glia with subsequent cell damage and further release of glutamate. Glutamate upregulates expression and activity of inducible nitric oxide synthase (iNOS) with subsequent release of cell-damaging radicals.<br>Elevated brain microdialysis glutamate levels exceeding 20 μmol/L associated with worse outcome after TBI.<br>TBI induces upregulation and activity of iNOS which increases the production of oxygen and nitrate radicals known to damage brain cells. The radical-induced brain damage causes excessive glutamate release and inhibits glutamate uptake, thereby promoting a vicious cycle between glutamate and iNOS.<br>Currently, there is no specific treatment available to treat patients with moderate and severe TBI. Standard of Care is does not target specific pathways and is considered insufficient.<br>Treatment efficacy<br> Own results from previous phase 2a and phase 3a trials show significantly reduced brain citrulline-to-arginine ratio (sign of iNOS inhibition) and brain glutamate levels in critically ill TBI patients with the use of Ronopterin.<br> Experimental data show that pharmacologic inhibition of iNOS significantly reduces brain and blood glutamate levels in models of induced brain damage.<br> Experimental data show that pharmacologic inhibition of glutamate significantly reduces brain damage. |
| Main objectives | 1) Reduce elevated brain microdialysis glutamate levels and increase proportion of patients with brain microdialysis glutamate levels below the threshold of 20 μmol/L.<br>2) Improve neurologic outcome and Quality of Life at 6 months after TBI |
| Primary endpoint | Brain microdialysis glutamate during drug infusion and up to 4 days after drug infusion; evaluated by independent scientist blinded to treatment group |

| | |
|---|---|
| Title | Ronopterin reduces elevated brain glutamate levels in critically ill patients with moderate and severe traumatic brain injury |
| Main secondary endpoints | Extended Glasgow Outcome Scale (eGOS) at 3 and 6 months- evaluated by independent physician blinded to treatment group<br>Quality of Life (QOLIBRI) at 6 months - evaluated by independent physician blinded to treatment group<br>Microdialysis parameters of brain metabolism (lactate, lactate-to-pyruvate ratio, glucose) during and after drug infusion<br>Biomarkers of cell damage (e.g. Neurofilament Light) during and after drug infusion<br>Pharmacokinetic profile of Ronopterin and metabolites during and after drug infusion<br>Therapy Intensity Level up to 14 days after TBI (Intensive Care Unit)<br>Safety and side effect profile |
| Trial Phase | Phase 2b - Dose ranging study |
| Study Design | Dose Ranging Study, Randomized, Placebo-controlled, Double Blind Trial |
| Treatment | Ronopterin administration via pump-driven continuous intravenous infusion using central venous catheter<br>Start of infusion between 4 and 12 hours after TBI |
| Dose | Dose 1: 10 mg/kg/24 hours<br>Dose 2: 20 mg/kg/48 hours<br>Dose 3: 30 mg/kg/72 hours |
| Duration of drug infusion | 24 hours (dose 1)<br>48 hours (dose 2)<br>72 hours (dose 3) |
| Comparator | Control group receiving physiologic saline solution (same volume) together with Standard of Care |
| Number of patients | 84<br>Placebo vs Ronopterin<br>Dose 1: 14 vs 14<br>Dose 2: 14 vs 14<br>Dose 3: 14 vs 14 |
| Main inclusion criteria | Moderate and severe TBI requiring intensive care with intracranial pressure monitoring and microdialysis for monitoring of brain metabolism<br>Female and male adults<br>18-64 years<br>Consent to participate in trial |
| Main exclusion criteria | Penetrating brain injuries<br>Blast injuries/military injuries<br>Anticipated death within 48 hours<br>Underlying brain and spinal cord injury (present and past)<br>Kidney impairment at admission<br>Extensive muscle damage with rhabdomyolysis and kidney impairment<br>Pregnancy |
| Next trial | Phase 3 - Randomized, Placebo-Controlled, Double Blind Trial with one Ronopterin dose determined by Phase 2b trial to improve neurologic outcome at 6 months after TBI |

6.2. Neuro-Oncology—Glioblastoma

| | |
|---|---|
| Title | Ronopterin reduces presurgical peritumoral brain edema in patients with treatment-naïve glioblastoma |
| Background | Glioblastoma induces peritumoral edema formation which causes neurological impairment and may be life-threatening due to increased intracranial pressure.<br>Malignant cell growth in glioblastoma is associated with elevated brain glutamate levels and increased expression and activity of inducible nitric oxide synthase (iNOS).<br>  Glutamate and iNOS with subsequent release of oxygen and nitrate radicals contribute to evolving cell damage which promote infiltrative tumor growth, vessel growth, and blood brain barrier breakdown.<br>Insufficient surgical removal of peritumoral edema is associated with recurrence of more aggressive tumor growth.<br>Current treatment of peritumoral edema is limited to the use of synthetic steroids which are restricted by many clinical side effects (eg diabetes, hypertension, mood disorders, obesity), including the upregulation of iNOS expression. Steroid-induced increase in iNOS activity is associated with aggravated recurrence of edema and tumor growth.<br>In view of these debilitating side effects, the current Standard of Care is considered as an area of underserved medical need.<br>Treatment efficacy<br>  Own results from previous experimental studies show a reduction in trauma-induced brain edema. |

| | |
|---|---|
| Title | Ronopterin reduces presurgical peritumoral brain edema in patients with treatment-naïve glioblastoma |
| | Own results from previous phase 2a and phase 3a trials show significantly reduced brain citrulline-to-arginine ratio (sign of iNOS inhibition) and brain glutamate levels in critically ill TBI patients with the use of Ronopterin.<br>Experimental data show that pharmacologic inhibition of iNOS and glutamate significantly reduce brain tumor growth. |
| Main objectives | 1) Reduce peritumoral brain edema before neurosurgical resection and anti-cancer therapy (radiotherapy/chemotherapy)<br>2) Determine clinical profile including recurrence as basis for phase 2 trial |
| Primary endpoint | Peritumoral brain edema determined by magnetic resonance imaging; evaluated by independent neuroradiologist blinded to treatment group |
| Main secondary endpoints | Parameters of brain metabolism (glutamate, lactate, lactate-to-pyruvate ratio, glucose) measured in jugular venous blood<br>Biomarkers of cell damage (e.g. Neurofilament Light)<br>Pharmacokinetic profile of Ronopterin and metabolites during and after infusion<br>Safety and side effect profile |
| Trial Phase | Phase 1- Dose finding study |
| Study Design | Dose Finding Study, Randomized, Placebo-controlled, Double Blind Trial |
| Treatment | Ronopterin administration via pump-driven continuous intravenous infusion via peripheral venous catheter<br>Peripheral venous catheter will be replaced daily to new infusion site (different peripheral vein) to avoid development of phlebitis |
| Dose | Step 1- different cumulative dose<br>Dose 1: 10 mg/kg/24 hours = 0.42 mg/kg/h<br>Dose 2: 20 mg/kg/48 hours<br>Dose 3: 30 mg/kg/72 hours<br>Step 2- same cumulative dose with different hourly infusion rates<br>Dose 1a: 10 mg/kg/18 hours = 0.56 mg/kg/h<br>Dose 1b: 10 mg/kg/12 hours = 0.83 mg/kg/h<br>Dose 1c: 10 mg/kg/6 hours = 1.67 mg/kg/h |
| Duration | Step 1               Step 2<br>24 hours (dose 1)    18 hours<br>48 hours (dose 2)    12 hours<br>72 hours (dose 3)    6 hours |
| Comparator | Control group receiving intravenous synthetic steroids together with Standard of Care |
| Number of patients | 72- Placebo vs Ronopterin<br>Step 1 = 36 patients           Step 2 = 36 patients<br>Dose 1: 6 vs 6                Dose 1a: 6 vs 6<br>Dose 2: 6 vs 6                Dose 1b: 6 vs 6<br>Dose 3: 6 vs 6                Dose 1c: 6 vs 6 |
| Main inclusion criteria | Initial diagnosis of glioblastoma with indication to reduce peritumoral edema<br>Treatment-naïve patients<br>Female and male adults<br>18-64 years<br>Consent to participate in trial |
| Main exclusion criteria | Recurrence of edema and tumor growth<br>Previous surgical and non-surgical treatment<br>Kidney impairment at admission<br>Pregnancy |
| Next trials | Phase 2- Randomized, Placebo-Controlled, Double Blind Trial with one Ronopterin dose determined by Phase 1 trial to reduce peritumoral brain edema (intravenous infusion)<br>Phase 1b- same as initial Phase 1 trial except that Ronopterin will be administered subcutaneously instead of intravenous infusion to avoid hospitalization for edema-reducing treatment<br>Phase 1- same as initial Phase 1 trials except that patients will present with recurrent brain edema formation (tumor growth) and persisting treatment-refractory edema formation |

6.3. Neuro-Oncology—Brain Metastases

| | |
|---|---|
| Title | Ronopterin reduces peritumoral brain edema in patients with treatment-naïve Brain Metastases |
| Background | Brain metastases induce peritumoral edema formation which causes neurological impairment and may be life-threatening due to increased intracranial pressure.<br>Malignant cell growth in brain metastases is associated with elevated brain glutamate levels and increased expression and activity of inducible nitric oxide synthase (iNOS). |

| | |
|---|---|
| Title | Ronopterin reduces peritumoral brain edema in patients with treatment-naïve Brain Metastases |
| | Glutamate and iNOS with subsequent release of oxygen and nitrate radicals contribute to evolving cell damage which promote infiltrative tumor growth, vessel growth, and blood brain barrier breakdown.<br>Insufficient surgical removal of peritumoral edema is associated with recurrence of more aggressive tumor growth.<br>Current treatment of peritumoral edema is limited to the use of synthetic steroids which are restricted by many clinical side effects (e.g, diabetes, hypertension, mood disorders, obesity), including the upregulation of iNOS expression. Steroid-induced increase in iNOS activity is associated with aggravated recurrence of edema and tumor growth.<br>In view of these debilitating side effects, the current Standard of Care is considered as an area of underserved medical need.<br>Treatment efficacy<br>    Own results from previous experimental studies show a reduction in trauma-induced brain edema.<br>    Own results from previous phase 2a and phase 3a trials show significantly reduced brain citrulline-to-arginine ratio (sign of iNOS inhibition) and brain glutamate levels in critically ill TBI patients with the use of Ronopterin.<br>    Experimental data show that pharmacologic inhibition of iNOS and glutamate significantly reduce brain tumor growth. |
| Main objectives | 1) Reduce peritumoral brain edema before neurosurgical resection and anti-cancer therapy (radiotherapy/chemotherapy)<br>2) Determine clinical profile including recurrence as basis for phase 2 trial |
| Primary endpoint | Peritumoral brain edema determined by magnetic resonance imaging; evaluated by independent neuroradiologist blinded to treatment group |
| Main secondary endpoints | Parameters of brain metabolism (glutamate, lactate, lactate-to-pyruvate ratio, glucose) measured in jugular venous blood<br>Biomarkers of cell damage (e.g. Neurofilament Light)<br>Pharmacokinetic profile of Ronopterin and metabolites during and after infusion<br>Safety and differences in side effect profile |
| Trial Phase | Phase 1- Dose finding study |
| Study Design | Dose Finding Study, Placebo-controlled, Double Blind, Randomized, Controlled Trial |
| Treatment | Ronopterin administration via pump-driven continuous intravenous infusion via peripheral venous catheter<br>Peripheral venous catheter will be replaced daily to new infusion site (different peripheral vein) to avoid development of phlebitis |
| Dose | Step 1- different cumulative dose<br>Dose 1: 10 mg/kg/24 hours = 0.42 mg/kg/h<br>Dose 2: 20 mg/kg/48 hours<br>Dose 3: 30 mg/kg/72 hours<br>Step 2- same cumulative dose with different hourly infusion rates<br>Dose 1a: 10 mg/kg/18 hours = 0.56 mg/kg/h<br>Dose 1b: 10 mg/kg/12 hours = 0.83 mg/kg/h<br>Dose 1c: 10 mg/kg/6 hours = 1.67 mg/kg/h |
| Duration | Step 1                    Step 2<br>24 hours (dose 1)     18 hours<br>48 hours (dose 2)     12 hours<br>72 hours (dose 3)     6 hours |
| Comparator | Control group receiving intravenous synthetic steroids together with Standard of Care |
| Number of patients | 72- Placebo vs Ronopterin<br>Step 1 = 36 patients          Step 2 = 36 patients<br>Dose 1: 6 vs 6                Dose 1a: 6 vs 6<br>Dose 2: 6 vs 6                Dose 1b: 6 vs 6<br>Dose 3: 6 vs 6                Dose 1c: 6 vs 6 |
| Main inclusion criteria | Initial diagnosis of brain metastases with indication to reduce peritumoral edema with known primary cancer (breast cancer and lung cancer with known iNOS expression profile determined in tissue biopsy)<br>Treatment-naïve patients<br>Female and male adults<br>18-64 years<br>Consent to participate in trial |
| Main exclusion criteria | Recurrence of edema and tumor growth<br>Previous surgical and non-surgical treatment<br>Kidney impairment at admission<br>Pregnancy |
| Next trials | Phase 2- Randomized, Placebo-Controlled, Double Blind Trial with one Ronopterin dose determined by Phase 1 trial to reduce peritumoral brain edema (intravenous infusion)<br>Phase 1b- same as initial Phase 1 trial except that Ronopterin will be administered subcutaneously instead of intravenous infusion to avoid hospitalization for edema-reducing treatment |

| | |
|---|---|
| Title | Ronopterin reduces peritumoral brain edema in patients with treatment-naïve Brain Metastases |
| | Phase 1- same as initial Phase 1 trials except that patients will present with recurrent brain edema formation (tumor growth) and persisting treatment-refractory edema formation |

6.4. Diabetic Retinopathy

| | |
|---|---|
| Title | Ronopterin reduces macular edema in patients with treatment-naïve diabetic retinopathy |
| Background | Diabetic retinopathy includes macular edema formation which impairs vision and may induce progressive vessel growth.<br>Local inflammation is associated with elevated retina glutamate levels and increased expression and activity of inducible nitric oxide synthase (iNOS).<br>   Glutamate and iNOS with subsequent release of oxygen and nitrate radicals contribute to evolving cell damage which promote edema formation, vessel growth, and blood retina barrier breakdown.<br>Current treatment of retina edema is limited to the use of synthetic steroids and inhibitors of vascular endothelial growth factor- driven vessel growth (anti-VEGF). These treatment options require intravitreal injection or implantation which are restricted by many clinical side effects (e.g. infection, cataract formation, increased intraocular pressure), including the upregulation of iNOS expression. Steroid-induced increase in iNOS activity is associated with aggravated recurrence of edema and vessel growth.<br>In view of these debilitating side effects, the current Standard of Care is considered as an area of underserved medical need.<br>Treatment efficacy<br>   Own results from previous experimental studies show a reduction in trauma-induced retina edema and brain edema.<br>   Own results from previous phase 2a and phase 3a trials show significantly reduced brain citrulline-to-arginine ratio (sign of iNOS inhibition) and brain glutamate levels in critically ill TBI patients with the use of Ronopterin.<br>   Experimental data show that pharmacologic inhibition of iNOS and glutamate significantly reduce retina damage and vessel proliferation. |
| Main objectives | 1) Reduce macular edema<br>2) Determine clinical profile including recurrence as basis for phase 2 trial |
| Primary endpoint | Macular edema determined by optical coherence tomography (OCT); evaluated by independent ophthalmologist blinded to treatment group |
| Main secondary endpoints | Pharmacokinetic profile of Ronopterin and metabolites during and after infusion<br>Visual acuity<br>Safety and differences in side effect profile |
| Trial Phase | Phase 1- Dose finding study |
| Study Design | Dose Finding Study, Placebo-controlled, Double Blind, Randomized, Controlled Trial |
| Treatment | Ronopterin administration via pump-driven continuous intravenous infusion via peripheral venous catheter<br>Peripheral venous catheter will be replaced daily to new infusion site (different peripheral vein) to avoid development of phlebitis |
| Dose | Step 1- different cumulative dose<br>Dose 1: 10 mg/kg/24 hours = 0.42 mg/kg/h<br>Dose 2: 20 mg/kg/48 hours<br>Dose 3: 30 mg/kg/72 hours<br>Step 2- same cumulative dose with different hourly infusion rates<br>Dose 1a: 10 mg/kg/18 hours = 0.56 mg/kg/h<br>Dose 1b: 10 mg/kg/12 hours = 0.83 mg/kg/h<br>Dose 1c: 10 mg/kg/6 hours = 1.67 mg/kg/h |
| Duration | Step 1                    Step 2<br>24 hours (dose 1)        18 hours<br>48 hours (dose 2)        12 hours<br>72 hours (dose 3)        6 hours |
| Comparator | Control group receiving intravitreal synthetic steroids together with Standard of Care |
| Number of patients | 72- Placebo vs Ronopterin<br>Step 1 = 36 patients        Step 2 = 36 patients<br>Dose 1: 6 vs 6               Dose 1a: 6 vs 6<br>Dose 2: 6 vs 6               Dose 1b: 6 vs 6<br>Dose 3: 6 vs 6               Dose 1c: 6 vs 6 |

| Title | Ronopterin reduces macular edema in patients with treatment-naïve diabetic retinopathy |
|---|---|
| Main inclusion criteria | Initial diagnosis of non-proliferative diabetic retinopathy with indication to reduce macular edema and improve vision<br>Treatment-naïve patients<br>Female and male adults<br>18-64 years<br>Consent to participate in trial |
| Main exclusion criteria | Recurrence of macular edema and angiogenesis (proliferative diabetic retinopathy<br>Previous treatment<br>Contraindications against<br>Kidney impairment at admission<br>Pregnancy |
| Next trials | Phase 2- Randomized, Placebo-Controlled, Double Blind Trial with one Ronopterin dose determined by Phase 1 trial to reduce retina edema and improve vision (intravenous infusion)<br>Phase 1- same as initial Phase 1 trial except that Ronopterin will be administered subcutaneously instead of intravenous infusion to avoid hospitalization for edema-reducing treatment<br>Phase 1- same as initial Phase 1 trial except that the control group will receive anti-VEGF treatment<br>Phase 1- same as initial Phase 1 trials with steroids or anti-VEGF except that patients will present with recurrent macular edema formation and persisting treatment-refractory edema formation |

It will be readily apparent to a person skilled in the art that varying substitutions and modifications may be made to the invention disclosed herein without departing from the scope and spirit of the invention.

As used herein, the singular forms "a" "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention. The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein. In addition, where features or aspects of the invention are described in terms of Markush groups, those skilled in the art will recognize that the invention is also thereby described in terms of any individual member or subgroup of members of the Markush group. Further embodiments of the invention will become apparent from the following claims.

The invention is also directed to the following items:

1. A method of treating a human patient suffering from a disease condition or disorder that is associated with an increased glutamate level, wherein the method comprises administering to the patient a therapeutically effective amount of a compound of formula (I):

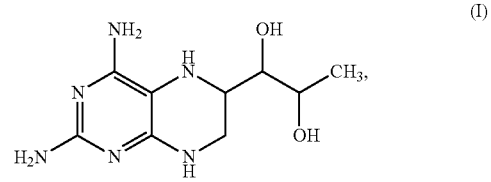

and/or a compound of formula (II):

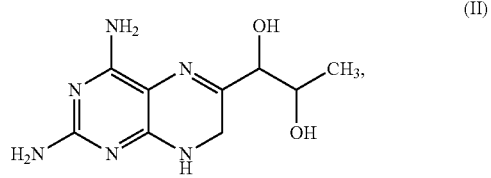 [SMILES: CC(O)C(O)C1=Nc2c(N)nc(N)nc2NC1]

wherein the increased glutamate level is decreased by administering the therapeutically effective amount of the compound of formula (I) and/or of formula (II).

2. The method of item 1, wherein increased the glutamate level is an increased intracerebral glutamate level, an increased glutamate level in an organ and/or a systemic glutamate level.

3. The method of item 2, wherein the increased glutamate level is an increased extracellular intracerebral glutamate level or an increased extracellular glutamate level in the cerebrospinal fluid.

4. The method of item 2 or 3, wherein the disease condition or disorder that is associated with an increased intracerebral glutamate level is a disease of the central nervous system.

5. The method of item 3 or 4, wherein the disease is selected from the group consisting of brain trauma and/or the spinal cord trauma, headache, a degenerative process, a mood disorder, and a mental disorder, metabolic diseases (diabetes, copper accumulation, iron accumulation), drug/alcohol dependence and withdrawal.

6. The method of item 5, wherein the brain trauma is brain injury, preferably acute or chronic brain injury.

7. The method of item 6, wherein the brain injury is selected from the group consisting of traumatic brain injury, surgical brain injury, non-traumatic brain injury, elevated intracranial pressure, and secondary brain injury.

8. The method of item 7, wherein the secondary brain injury comprises a condition selected from the group consisting of edema formation, preferably edema formation from local or global hypoxia, from insufficient local or global perfusion leading to ischemia related to low perfusion pressure or vasoconstriction, from excessive perfusion due to higher perfusion pressure or vasodilation with hyperemia, from inflammation with and without infection, from neoplasms, or from and side effects of a therapeutic treatment.

9. The method of item 8, wherein the neoplasm is selected from the group consisting of benign neoplasms, malignant neoplasms and metastases of such neoplasms, wherein the malignant neoplasm is preferably a brain tumor such as a glioblastoma.

10. The method of item 7, wherein the non-traumatic brain injury is selected from the group consisting of ischemic/hypoxic/hemorrhagic brain injury (e.g. stroke, hypertension, vessel occlusion), post-resuscitation (after e.g. cardiac arrest), subarachnoid haemorrhage, anticoagulation-induced haemorrhage, hydrocephalus or wherein the non-traumatic brain injury is caused by inflammation and infection.

11. The method of item 10, wherein the inflammation is Systemic Inflammatory Response Syndrome (SIRS) or wherein the infection is selected from meningitis, ventriculitis, encephalitis, or choroid plexus infection.

12. The method of item 7, wherein the brain injury is traumatic brain injury, preferably blunt and penetrating traumatic brain injury.

13. The method of item 12, wherein the patient to be treated has been diagnosed with mild, complicated mild, moderate, or severe traumatic brain injury.

14. The method of item 13, wherein the patient to be treated has been diagnosed with traumatic brain injury of a Glasgow Coma Score (GCS) ≥3.

15. The method of item 2, wherein the disease associated with an increased systemic glutamate level is selected from the group consisting of a disease of the central nervous system, a kidney disease, a liver disease, a lung disease, a cardiovascular disease, an endocrinology disease (metabolic disease), bone and joint-related disease (e.g. arthritis), cancer, neuropathy, pancreatitis, exercise-induced glutamate release, treatment-associated increase in systemic glutamate levels (due to chemotherapy, radiotherapy, or serotonin uptake inhibitors), addiction, or by nutrition intake-induced increase of glutamate levels (eg, intake of mono sodium glutamate), toxic effects of pollutants (e.g. particulate matter, metals, black carbon and gases such as ozone ($O_3$), nitrogen dioxide ($NO_2$) and carbon monoxide (CO)), or trace elements (e.g. manganese, copper, iron) leading to increased systemic glutamate level.

16. The method of item 15, wherein the disease of the central nervous system is selected from the group consisting of stroke, trauma, migraine, glioma, multiple sclerosis, amyotrophic lateral sclerosis, depression, autism, chronic schizophrenia, psychosis, attention deficit hyperactivity disorder (ADHD), Alzheimer disease, Parkinson disease, Huntington's disease, Wilson disease, HIV dementia, chronic pain, neuropathy in spinal cord injury, infections, hyperthermia, and fever.

17. The method of item 15, wherein the lung disease is selected from the group consisting of lung fibrosis, liver fibrosis, lung cancer, lung inflammation, and lung infection.

18. The method of item 15, wherein the kidney disease is renal failure or renal ischemia/reperfusion.

19. The method of item 15, wherein the liver disease is selected from the group consisting of liver fibrosis, liver cancer, liver inflammation, and liver infection.

20. The method of item 15, wherein the endocrinology disease (metabolic disease) is selected from the group consisting of diabetes type 1, diabetes type 2, gout, copper accumulation and iron accumulation, wherein the disease is preferably diabetic retinopathy, more preferably diabetic macular edema.

21. The method of item 15, wherein the cancer is selected from the group consisting of acute myeloid leukemia, chronic myeloid leukemia, colorectal cancer, liver cancer, lung cancer, skin cancer, breast cancer, prostate cancer, head and neck squamous cell cancer, bladder urothelial cancer, and metastasis.

22. The method of item 15, wherein the neuropathy is drug-induced neuropathy, diabetic neuropathy, neuropathy in cancer, neuropathy in alcoholism, 23. The method of item 15, wherein the therapeutic treatment is anesthesia leading to increased systemic glutamate levels, or side effects of drug therapy leading to increased systemic glutamate levels.

24. The method of item 1 or 2, wherein the disease condition or disorder that is associated with an increased glutamate level is selected from the group consisting of a condition with activated local inflammation within the central nervous system (CNS) (neuroinflammation), a vascular pathology, an infection of the brain, the spinal cord and/or the meninges, traumatic injury of the brain and/or the spinal cord, inflammation, seizures, a tumor, headache, degenerative processes, mood disorder, and mental disorder, metabolic changes (diabetes, trace element accumulation), radiotherapy, chemotherapy, and antidepressants.

25. The method of item 24, wherein the condition with activated inflammation (neuroinflammation) is an acute inflammation or a chronic inflammation.

26. The method of item 25, wherein the condition with activated inflammation (neuroinflammation) is a chronic inflammation.

27. The method of item 26, wherein the chronic inflammation is associated with/caused by a disease or condition selected from the group consisting of a neuroimmune response, a peripheral immune response, a neurodegenerative disease, an autoimmune disease, traumatic brain injury, a viral infection, a bacterial infection, a fungal infection and a parasitic infection, (for example, by a protozoa, or a by single-celled protists).

28. The method of item 24, wherein the condition with activated local inflammation within the central nervous system (CNS) (neuroinflammation) is an inflammation of the retina, leading to retinal degeneration, including retinitis, macular degeneration and/or IL-1-induced rod degeneration.

29. The method of item 24, wherein the condition with activated local inflammation within the central nervous system (CNS) (neuroinflammation) is related to a systemic inflammation with a spillover effect on the brain, contributing to acute and progressive structural and functional impairment of the CNS.

30. The method of item 24, wherein the infection of the brain, the spinal cord and/or the meninges is a viral infection, a bacterial infection, a fungal infection or an infection caused by a parasite (for example, by a protozoa, or a by single-celled protists).

31. The method of item 24, wherein the vascular pathology is a thrombus, an embolus, a vasospasm, a vasodilation, a vasculitis or arteriosclerosis found in a condition selected from the group consisting of inflammation, infection, stroke, hemorrhages, and trauma.

32. The method of item 24, wherein the degenerative process is selected from the group consisting of a neuro-degenerative disease, an autoimmune reaction, and a metabolic disturbance (for example, hepatic encephalopathy, uremic encephalopathy).

33. The method of item 32, wherein the neuro-degenerative disease is selected from Parkinson's disease, multiple sclerosis, amyotrophic lateral sclerosis, dementia, Huntington's disease, and Wilson disease.

34. The method of item 24, wherein the mood disorder is selected from the group consisting of depression, bipolar disorder, and drug-induced disorders (alcohol addiction, benzodiazepine addiction)

35. The method of item 34, wherein the depression is depressive behavior induced by (unpredictable) chronic mild stress.

36. The method of item 24, wherein the mental disorder is selected from the group consisting of schizophrenia, bipolar disorder, psychosis, autism, and attention deficit hyperactivity disorder (ADHD).

37. The method of any of items 1 to 36, wherein the disease condition or disorder that is associated with an increased glutamate level is caused by an acute injury (acute encephalopathy) or by a chronic encephalopathy (chronic inflammation).

38. The method of item 37, wherein the disease condition is trauma or seizure.

39. The method of item 38, wherein the trauma is brain injury.

40. The method of item 39, wherein the brain injury is selected from the group consisting of traumatic brain injury, surgical brain injury, non-traumatic brain injury, elevated intracranial pressure, and secondary brain injury.

41. The method of item 40, wherein the secondary brain injury comprises a condition selected from the group consisting of edema formation from local or global hypoxia, ischemia, inflammation with and without infection, and neoplasms.

42. The method of item 41, wherein the neoplasm is selected from the group consisting of benign neoplasms, and malignant neoplasms, including metastasis.

43. The method of item 40, wherein the non-traumatic brain injury is selected from the group consisting of ischemic/hypoxic/hemorrhagic brain injury (e.g. stroke), post-resuscitation (after e.g. cardiac arrest), subarachnoid haemorrhage, anticoagulation-induced haemorrhage or wherein the non-traumatic brain injury is caused by inflammation and infection.

44. The method of any of items 37 to 43, comprising starting administering to the patient a therapeutically effective amount of the compound of the formula (I) and/or formula (II) within a time period of ≤12 hours (for example, within a time period of between 6 to 12 hours) after the occurrence of the acute injury or acute (spontaneously occurring) event, preferably within a time period of between 6 to 12 hours after the occurrence of the brain injury.

45. The method of item 44, wherein the compound of the formula (I) and/or the formula (II) is administered by infusion.

46. The method of any of items 37 to 45, wherein the compound of the formula (I) and/or the formula (II) is administered at a maximal daily dose in the range of 2.5 mg/kg body weight to 30.0 mg/kg body weight.

47. The method of item 46, wherein the compound of the formula (I) or the formula (II) is administered at a total dose of 2.5, 5.0, 7.5, 10.0, 12.5, 15.0, 17.0, 20.0, or 30.0 mg/kg body weight.

48. The method of any of items 46 or 47, wherein the compound of the formula (I) or the formula (II) is administered over a period of 12 to 96 hours.

49. The method of item 48, wherein the compound of the formula (I) or the formula (II) is administered over a period of 24 to 48 hours or over a period of 24 to 72 hours.

50. The method of item 49, wherein the compound of the formula (I) or the formula (II) is administered by infusion in a total dose of 17 mg/kg body weight over 48 hours, corresponding to a daily dose of 8.5 mg/kg body weight.

51. The method of item 49, wherein the compound of the formula (I) or the formula (II) is administered by infusion in a total dose of 30.0 mg/kg body weight over 72 hours, corresponding to a daily dose of 10.0 mg/kg body weight.

52. The method of any of the forgoing items 37 to 51, wherein administering to the patient a therapeutically effective amount of the compound of the formula (I) and/or formula (II) results in a decrease in the brain glutamate levels.

53. The method of item 52, wherein the decreased (extracellular) brain glutamate level is ≤10 µmol/l as determined by microdialysis.

54. The method of any of the forgoing items 37 to 53 wherein the patient is up to 39 years old or is 40 years or older.

55. The method of item 54, wherein the patient has an age in the range of 18 to 39 years and wherein administering to the patient a therapeutically effective amount of the compound of the formula (I) and/or formula (II) is started within a time period of between 6 to 12 hours after the occurrence of the acute injury or acute (spontaneously occurring) event.

56. The method of item 54, wherein the patent is 40 years or older and wherein administering to the patient a therapeutically effective amount of the compound of the formula (I) and/or formula (II) is started within a time period of >12 hours after the occurrence of the acute injury or acute (spontaneously occurring) event.

57. The method of item 56, wherein the patient has an age in the range of 40 to 90 years, 40 to 80 years, 40 to 70 years or 40 to 65 years.

58. The method of any of the items 1 to 57, wherein the compound of formula (I) is 4-Amino-(6R,S)-5,6,7,8-tetrahydro-L-biopterin of formula (Ia):

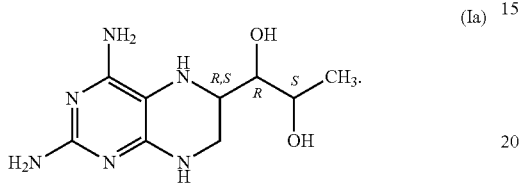

(Ia)

59. The method of item 58, wherein the compound (Ia) is a diastereomeric mixture that comprises more (6R)-4-Amino-5, 6, 7, 8-tetrahydro-L-biopterin than (6S)-4-Amino-5, 6, 7, 8-tetrahydro-L-biopterin.

60. The method of any of items 58 to 59, wherein infusion of the compound of formula (I) is carried out with a reconstituted solid composition of the compound of formula (I), wherein a unit dosage of the solid composition contains 650±60 mg of the free base of 4-Amino-(6R,S)-5,6,7,8-tetrahydro-L-biopterin, 140±30 mg of water of crystallization, 70±7 mg Na$_2$HPO$_4$·2 H$_2$O, 16.5±2 mg NaH$_2$PO$_4$·2 H$_2$O, and 350±30 mg NaCl or wherein a unit dosage of the composition contains 650±60 mg of the free base of 4-Amino-(6R,S)-5,6,7,8-tetrahydro-L-biopterin, 60±50 mg of water of crystallization, 70±7 mg Na$_2$HPO$_4$·2H$_2$O, 12±2.5 mg NaH$_2$PO$_4$·2 H$_2$O, and 350±30 mg NaCl.

61. The method of item 60, wherein reconstitution comprises providing a vial containing 1 g of the unit dosage and adding 50 ml water to 1 g of the unit dosage.

62. The method of any of items 1 to 61, wherein the compound (II) is 4-Amino-(6R,S)-7,8-dihydro-L-biopterin of the formula (IIa):

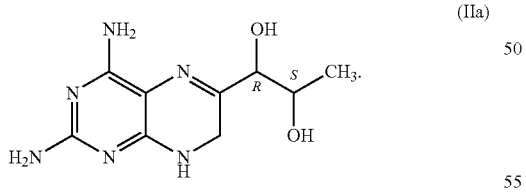

(IIa)

63. The method of any of items 1 to 36, wherein the disease condition or disorder that is associated with an increased glutamate level is a chronic disease or disorder.

64. The method of item 63, wherein the chronic disease or disorder is selected from the group consisting of chronic systemic inflammation, local neuroinflammation, headache, a degenerative process, a mood disorder and a mental disorder.

65. The method of item 64, wherein the chronic inflammation is associated with/caused by a disease or condition selected from the group consisting of a neuroimmune response, a peripheral immune response, a neurodegenerative disease, an autoimmune disease, traumatic brain injury, a viral infection, a bacterial infection, a fungal infection, and a parasite infection 66. The method of item 65, wherein the chronic neuroinflammation is an inflammation of the retina, leading to retinal degeneration, including retinitis, macular degeneration and/or IL-10-induced rod degeneration.

67. The method of item 64, wherein the degenerative process is selected from the group consisting of a neuro-degenerative disease, an autoimmune reaction, and a local and systemic metabolic disturbance, copper overload (hereditary, induced), and iron overload (hereditary, induced).

68. The method of item 67, wherein the neuro-degenerative disease is selected from Parkinson's disease, multiple sclerosis, amyotrophic lateral sclerosis, dementia, Wilson disease, and Huntington's disease.

69. The method of item 64, wherein the mood disorder is selected from the group consisting of depression, bipolar disorder, and drug-induced disorders (alcohol addiction, benzodiazepine addiction).

70. The method of item 69, wherein the depression is depressive behavior induced by (unpredictable) chronic mild stress.

71. The method of item 64, wherein the mental disorder is selected from the group consisting of schizophrenia, bipolar disorder psychosis, autism, and attention deficit hyperactivity disorder (ADHD).

72. The method of any of items 63 to 71, wherein the compound of formula (I) and/or of formula (II) is administered in a modified release formulation.

73. The method of any of items 63 to 72, wherein the compound of formula (I) and/or formula (II) is administered by an administration route selected from the group of oral administration, rectal administration, local intracerebral administration (for example, via microdialysis catheter) and topical administration.

74. The method of any of items 63 to 73, wherein the compound of the formula (I) or the formula (II) is administered at a total daily dose in the range of 2.5 to 30 mg/kg body weight, preferably at a total daily dose in the range of 2.5 to 10.0 mg/kg body weight.

75. A method of treating or preventing glutamate excitotoxicity (glutamate storm) in a patient suffering from a condition that has the potential to result in a pathologically high glutamate level in the brain, wherein the method comprises administering to the patient a therapeutically effective amount of a compound of formula (I):

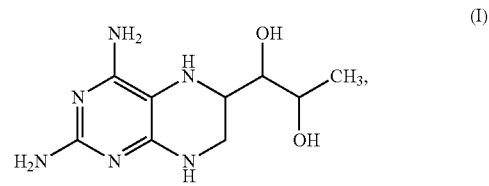

(I)

and/or a compound of formula (II):

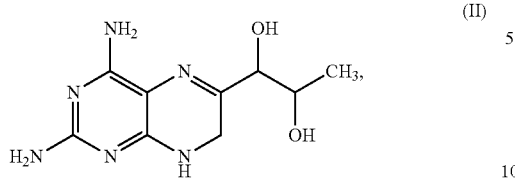

wherein a pathologically high glutamate level in the brain is decreased or prevented by administering the therapeutically effective amount of the compound of formula (I) and/or of formula (II).

76. The method of item 75, wherein administering the therapeutically effective amount of the compound of formula (I) and/or of formula (II) reduces or prevents damage to nerve cells caused by the pathologically high glutamate level in the brain.

77. The method of item 76, wherein the pathologically high glutamate level in the brain is an extracellular glutamate level.

78. The method of item 77, wherein the pathologically high extracellular glutamate level in the brain is >10 µmol/l (as determined by microdialysis).

79. The method of any of items 75 to 78, wherein the condition that has the potential to result in a pathologically high glutamate level in the brain is selected from the group of a condition with activated local inflammation within the central nervous system (CNS) (neuroinflammation), a vascular pathology, an infection of the brain, the spinal cord and/or the meninges, traumatic injury of the brain and/or the spinal cord, surgical brain injury, inflammation, seizures, a tumor, a degenerative process, a mood disorder, a mental disorder, alcoholism, drug addiction (for example, opioid addiction, benzodiazepine addiction, ADHD treatment), alcohol addiction and withdrawal, hyperammonemia, hypoglycemia, a metabolic disorder (for example, diabetes, copper accumulation, iron accumulation), radiotherapy, and chemotherapy.

80. The method of item 79, wherein the neuroinflammation is associated with/caused by a disease or condition selected from the group consisting of a neuroimmune response, a peripheral immune response, a neurodegenerative disease, an autoimmune disease, a viral infection, a fungal infection, a bacterial infection and a parasitic infection.

81. The method of item 79, wherein the infection of the brain, the spinal cord and/or the meninges is a viral infection, a bacterial infection, a fungal infection or an infection caused by a parasite (for example, a protozoa, or a single-celled protists).

82. The method of item 79, wherein the vascular pathology is a vascular pathology is a thrombus, an embolus, a vasospasm, a vasodilation, a vasculitis or arteriosclerosis found in a condition selected from the group consisting of inflammation, infection stroke, hemorrhages, trauma, and a metabolic disorder (diabetes, copper accumulation, iron accumulation).

83. The method of any of items 75 to 78, wherein the condition is brain injury.

84. The method of item 83, wherein the brain injury is selected from the group consisting of traumatic brain injury, surgical brain injury, non-traumatic brain injury, elevated intracranial pressure, and secondary brain injury.

85. The method of item 84, wherein the secondary brain injury comprises a condition selected from the group consisting of edema formation from local or global hypoxia, ischemia, inflammation with and without infection, and neoplasms.

86. The method of item 85, wherein the neoplasm is selected from the group consisting of benign neoplasms, and malignant neoplasms, including metastasis.

87. The method of item 84, wherein the non-traumatic brain injury is selected from the group consisting of ischemic/hypoxic/hemorrhagic brain injury (e.g. stroke), post-resuscitation (after e.g. cardiac arrest), subarachnoid haemorrhage, anticoagulation-induced haemorrhage or wherein the non-traumatic brain injury is caused by inflammation and infection.

88. The method of any of items 75 to 87, wherein the condition itself results in a pathologically high glutamate level in the brain or wherein the condition leads to systemic increase of glutamate levels with a secondary increase in the brain.

89. The method of any of items 75 to 88, comprising starting administering to the patient a therapeutically effective amount of the compound of the formula (I) and/or formula (II) within a time period of between 6 to 12 hours after the occurrence of the acute injury or acute (spontaneously occurring) event, preferably within a time period of between 6 to 12 hours after the occurrence of the brain injury.

90. The method of item 89, wherein the compound of the formula (I) and/or the formula (II) is administered by infusion.

91. The method of any of items 75 to 90, wherein the compound of the formula (I) and/or the formula (II) is administered at a maximal daily dose in the range of 2.5 mg/kg body weight to 30.0 mg/kg body weight.

92. The method of item 91, wherein the compound of the formula (I) or the formula (II) is administered at a total dose of 2.5, 5.0, 7.5, 10.0, 12.5, 15.0, 17.0, 20.0, or 30.0 mg/kg body weight.

93. The method of any of items 91 or 92, wherein the compound of the formula (I) or the formula (II) is administered over a period of 12 to 96 hours.

94. The method of item 93, wherein the compound of the formula (I) or the formula (II) is administered over a period of 24 to 48 hours or over a period of 24 to 72 hours.

95. The method of item 94, wherein the compound of the formula (I) or the formula (II) is administered by infusion in a total dose of 17 mg/kg body weight over 48 hours, corresponding to a daily dose of 8.5 mg/kg body weight.

96. The method of item 94, wherein the compound of the formula (I) or the formula (II) is administered by infusion in a total dose of 30.0 mg/kg body weight over 72 hours, corresponding to a daily dose of 10.0 mg/kg body weight.

97. A method of treating a human patient suffering from a disease condition or disorder that is associated with an increased lactate level, wherein the method comprises administering to the patient a therapeutically effective amount of a compound of formula (I):

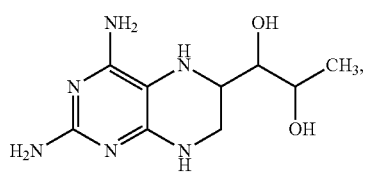

and/or a compound of formula (II):

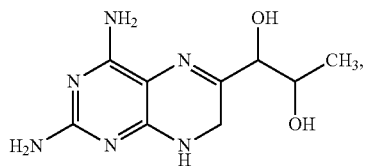

wherein the increased lactate level is decreased by administering the therapeutically effective amount of the compound of formula (I) and/or of formula (II).
98. The method of item 97, wherein the increased lactate level is an increased intracerebral lactate level, an increased lactate level in an organ and/or an increased systemic lactate level.
99. The method of item 98, wherein the increased intracerebral lactate level is an increased extracellular intracerebral lactate level or an increased extracellular lactate level in the cerebrospinal fluid.
100. The method of item 98 or 99, wherein the disease condition or disorder that is associated with an increased intracerebral lactate level is a disease of the central nervous system.
101. The method of item 99 or 100, wherein the disease is selected from the group consisting of brain trauma and/or the spinal cord trauma, headache, a degenerative process, a mood disorder, and a mental disorder, metabolic diseases (diabetes, copper accumulation, iron accumulation), drug/alcohol dependence and withdrawal.
102. The method of any of items 99 to 101, wherein administering to the patient a therapeutically effective amount of the compound of the formula (I) and/or formula (II) results in a decrease in the brain lactate level.
103. The method of item 102, wherein the decreased (extracellular) brain glutamate level is <2.5 millimol/L) as determined by microdialysis
104. The method of item 98, wherein the disease condition or disorder that is associated with an increased systemic lactate level (an increased blood lactate level) is tissue hypoxia or metabolic disturbance.
105. The method of item 102, wherein the metabolic disturbance is a metabolic disturbance with increased aerobic and anaerobic lactate production and, optionally, with decreased lactate clearance.
106. The method of item 103 or 104, wherein administering to the patient a therapeutically effective amount of the compound of the formula (I) and/or formula (II) results in a decrease in the systemic (blood) lactate level.
107. The method of item 106, wherein the decreased systemic lactate level is a plasma level of lactate in the range of about 0.5-2.0 millimol/L).

What is claimed is:
1. A method of treating a human patient suffering from a brain injury that is associated with an injury-induced extracellular brain glutamate level >10 μmol/L, wherein the method comprises:
  selecting the human patient on the basis of a patient age of 18-39 years and a time from injury of ≤12 hours; and
  intravenously administering to the patient a therapeutically effective amount of a compound of formula (I):

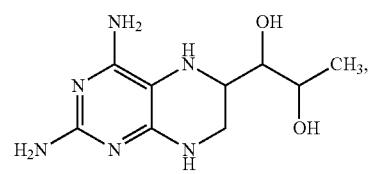

and/or a compound of formula (II):

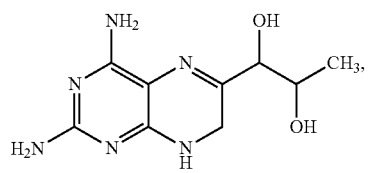

for a period of 48 hours, wherein administering the therapeutically effective amount of the compound of formula (I) and/or of formula (II) results in an odds ratio for having an extracellular brain glutamate level >10 μmol/L that remains less than 1 for a period beginning at 24 hours after the start of the administration and extending to 96 hours after the start of the administration, wherein the odds ratio is determined by measuring an extracellular brain glutamate level by microdialysis of cerebrospinal fluid or brain extracellular fluid in a corresponding treatment patient population.
2. The method of claim 1, wherein the extracellular brain glutamate level is measured by microdialysis of cerebrospinal fluid.
3. The method of claim 1, wherein the brain injury is acute brain injury.
4. The method of claim 1, wherein the brain injury is selected from the group consisting of traumatic brain injury, surgical brain injury, non-traumatic brain injury, elevated intracranial pressure, and secondary brain injury.
5. The method of claim 4, wherein the secondary brain injury comprises a condition selected from the group consisting of edema formation from local or global hypoxia, from insufficient local or global perfusion leading to ischemia related to low perfusion pressure or vasoconstriction, from excessive perfusion due to higher perfusion pressure or vasodilation with hyperemia, from inflammation with infection, inflammation without infection, from neoplasms and side effects of a therapeutic treatment.
6. The method of claim 5, wherein the neoplasm is selected from the group consisting of benign neoplasms, and malignant neoplasms and metastases of such neoplasms.

* * * * *